(12) United States Patent
Fujishiro et al.

(10) Patent No.: US 11,115,888 B2
(45) Date of Patent: Sep. 7, 2021

(54) COMMUNICATION METHOD, USER TERMINAL AND PROCESSOR

(71) Applicant: KYOCERA Corporation, Kyoto (JP)

(72) Inventors: Masato Fujishiro, Yokohama (JP); Noriyoshi Fukuta, Inagi (JP); Yushi Nagasaka, Ritto (JP); Henry Chang, San Diego, CA (US); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/712,602

(22) Filed: Dec. 12, 2019

(65) Prior Publication Data
US 2020/0162983 A1    May 21, 2020

Related U.S. Application Data

(63) Continuation of application No. 16/263,820, filed on Jan. 31, 2019, now Pat. No. 10,536,888, which is a
(Continued)

(51) Int. Cl.
*H04M 1/66* (2006.01)
*H04M 1/68* (2006.01)
(Continued)

(52) U.S. Cl.
CPC .......... *H04W 36/16* (2013.01); *H04W 16/32* (2013.01); *H04W 36/0085* (2018.08);
(Continued)

(58) Field of Classification Search
CPC ......... H04W 12/0602; H04W 12/0609; H04W 12/0017; H04W 12/00514; H04W 8/08; H04W 84/042; H04L 63/30; H04L 63/08
(Continued)

(56) References Cited

U.S. PATENT DOCUMENTS 6,223,037 B1   4/2001   Parkkila
7,877,098 B2   1/2011   Ryu et al.
(Continued)

FOREIGN PATENT DOCUMENTS

GB       2504698 A       2/2014
JP   2010-273381 A      12/2010
(Continued)

OTHER PUBLICATIONS

International Search Report issued in PCT/JP2016/061616; dated Jul. 5, 2016.
(Continued)

*Primary Examiner* — Marceau Milord
(74) *Attorney, Agent, or Firm* — Studebaker & Brackett PC

(57) ABSTRACT

A user equipment, a method performed by user equipment, and a chipset provided in a user equipment each encompass receiving a paging message including an indication from a current serving cell of the user equipment, the indication triggering a frequency redistribution procedure in which the user equipment reselects a target cell belonging to a frequency different from a frequency of the current serving cell, to be used as a serving cell, and performing the frequency redistribution procedure in response to receiving the paging message including the indication.

4 Claims, 18 Drawing Sheets

Related U.S. Application Data continuation of application No. 15/727,401, filed on Oct. 6, 2017, now Pat. No. 10,244,449, which is a continuation of application No. PCT/JP2016/061616, filed on Apr. 8, 2016.

(60) Provisional application No. 62/281,446, filed on Jan. 21, 2016, provisional application No. 62/247,948, filed on Oct. 29, 2015, provisional application No. 62/218,689, filed on Sep. 15, 2015, provisional application No. 62/188,873, filed on Jul. 6, 2015, provisional application No. 62/165,315, filed on May 22, 2015, provisional application No. 62/145,869, filed on Apr. 10, 2015.

(51) Int. Cl.
| | | |
|---|---|---|
| *H04M 3/16* | (2006.01) | |
| *H04W 36/16* | (2009.01) | |
| *H04W 16/32* | (2009.01) | |
| *H04W 48/16* | (2009.01) | |
| *H04W 36/00* | (2009.01) | |
| *H04W 36/24* | (2009.01) | |

(52) U.S. Cl.
CPC ..... *H04W 36/00837* (2018.08); *H04W 36/24* (2013.01); *H04W 48/16* (2013.01)

(58) Field of Classification Search
USPC ............... 455/411, 433, 435.1, 432.3, 435.2
See application file for complete search history.

(56) References Cited

U.S. PATENT DOCUMENTS

| | | | |
|---|---|---|---|
| 8,532,660 B2 | 9/2013 | Zou et al. | |
| 9,357,461 B2 | 5/2016 | Jung et al. | |
| 9,363,799 B2 * | 6/2016 | Park ...................... | H04L 5/0058 |
| 9,480,012 B2 * | 10/2016 | Wang ................ | H04W 36/0094 |
| 9,781,685 B2 | 10/2017 | Tsui et al. | |
| 9,794,876 B2 * | 10/2017 | Choi ...................... | H04W 76/28 |
| 9,826,526 B2 * | 11/2017 | Oizumi ................. | H04L 1/1825 |
| 9,843,986 B2 | 12/2017 | Poitau et al. | |
| 9,854,513 B2 | 12/2017 | Wang et al. | |
| 9,936,469 B2 * | 4/2018 | Ji ........................... | H04W 72/04 |
| 10,244,449 B2 * | 3/2019 | Fujishiro ........... | H04W 36/0085 |
| 10,536,888 B2 * | 1/2020 | Fujishiro ............... | H04W 16/32 |
| 10,548,017 B2 * | 1/2020 | Ku ......................... | H04W 48/04 |
| 2007/0015530 A1 | 1/2007 | Ding | |
| 2010/0035615 A1 * | 2/2010 | Kitazoe ................. | H04W 48/02 |
| | | | 455/436 |
| 2011/0110254 A1 * | 5/2011 | Ji ......................... | H04W 36/0066 |
| | | | 370/252 |
| 2011/0250891 A1 | 10/2011 | Zou et al. | |
| 2012/0082051 A1 * | 4/2012 | Kim ...................... | H04W 24/10 |
| | | | 370/252 |
| 2012/0155307 A1 * | 6/2012 | Turk .................. | H04W 52/0238 |
| | | | 370/252 |
| 2013/0242774 A1 | 9/2013 | Wang et al. | |
| 2013/0244647 A1 * | 9/2013 | Makh ................... | H04W 48/16 |
| | | | 455/434 |
| 2013/0244657 A1 * | 9/2013 | Wang ................... | H04W 36/14 |
| | | | 455/436 |
| 2013/0281090 A1 | 10/2013 | Maeda et al. | |
| 2013/0330642 A1 * | 12/2013 | Fujita ................ | H01M 8/04228 |
| | | | 429/413 |
| 2014/0004862 A1 * | 1/2014 | Ekemark ............... | H04W 36/22 |
| | | | 455/443 |
| 2014/0119258 A1 * | 5/2014 | Takano ............. | H04W 52/0229 |
| | | | 370/311 |
| 2014/0161103 A1 * | 6/2014 | Sirotkin ................ | H04W 48/18 |
| | | | 370/332 |
| 2014/0200975 A1 * | 7/2014 | Agashe .............. | G06Q 30/0601 |
| | | | 705/14.19 |
| 2014/0213256 A1 * | 7/2014 | Meylan ................. | H04W 48/18 |
| | | | 455/436 |
| 2014/0220975 A1 | 8/2014 | Makharia et al. | |
| 2014/0228030 A1 * | 8/2014 | Jung ................. | H04W 36/0083 |
| | | | 455/436 |
| 2014/0248878 A1 | 9/2014 | Wong et al. | |
| 2014/0314046 A1 | 10/2014 | Jung et al. | |
| 2014/0329529 A1 * | 11/2014 | Jung ..................... | H04W 48/18 |
| | | | 455/436 |
| 2015/0065138 A1 * | 3/2015 | Chen ................. | H04W 36/0094 |
| | | | 455/436 |
| 2015/0094114 A1 * | 4/2015 | Rao ...................... | H04W 52/245 |
| | | | 455/522 |
| 2015/0119037 A1 * | 4/2015 | Gopal ............... | H04W 36/0066 |
| | | | 455/436 |
| 2015/0173011 A1 * | 6/2015 | Das ....................... | H04W 24/02 |
| | | | 370/328 |
| 2015/0208303 A1 * | 7/2015 | Jung ...................... | H04J 11/00 |
| | | | 455/436 |
| 2015/0230141 A1 * | 8/2015 | Zou ...................... | H04W 48/06 |
| | | | 455/437 |
| 2015/0265115 A1 * | 9/2015 | Gray ..................... | A47L 9/0666 |
| | | | 15/415.1 |
| 2015/0327312 A1 * | 11/2015 | Burbidge .............. | H04W 76/14 |
| | | | 370/329 |
| 2016/0119863 A1 | 4/2016 | Takano | |
| 2016/0269953 A1 | 9/2016 | Jung et al. | |
| 2017/0094628 A1 * | 3/2017 | Miao .................... | H04W 36/08 |
| 2018/0352508 A1 * | 12/2018 | Fujishiro .............. | H04W 24/10 |
| 2019/0021009 A1 * | 1/2019 | Ku ........................ | H04W 28/08 |

FOREIGN PATENT DOCUMENTS

| | | |
|---|---|---|
| JP | 2011-061456 A | 3/2011 |
| JP | 2013-524725 A | 6/2013 |
| JP | 2013-542678 A | 11/2013 |
| JP | 2014-529928 A | 11/2014 |
| JP | 2014-535237 A | 12/2014 |
| WO | 2012/093583 A1 | 7/2012 |
| WO | 2014/014859 A1 | 1/2014 |
| WO | 2014/203630 A1 | 12/2014 |
| WO | 2015/065106 A1 | 5/2015 |

OTHER PUBLICATIONS

3rd Generation Partnership Project; Technical Specification Group Radio Access Network; Evolved Universal Terrestrial Radio Access (E-UTRA); User Equipment (UE) Procedures in Idle Mode; 3GPP TS 36.304 V12.4.0; Mar. 2015; pp. 1-38; Release 12; 3GPP Organizational Partners.

JP Office Action dated Nov. 7, 2017, from corresponding JP Appl No. 2017-511109, with English statement of relevance, 5 pp.

An Office Action issued by the Japanese Patent Office dated Mar. 6, 2018, which corresponds to Japanese Patent Application No. 2017-511109 and is related to U.S. Appl. No. 15/727,401; with English language Concise Explanation.

* cited by examiner

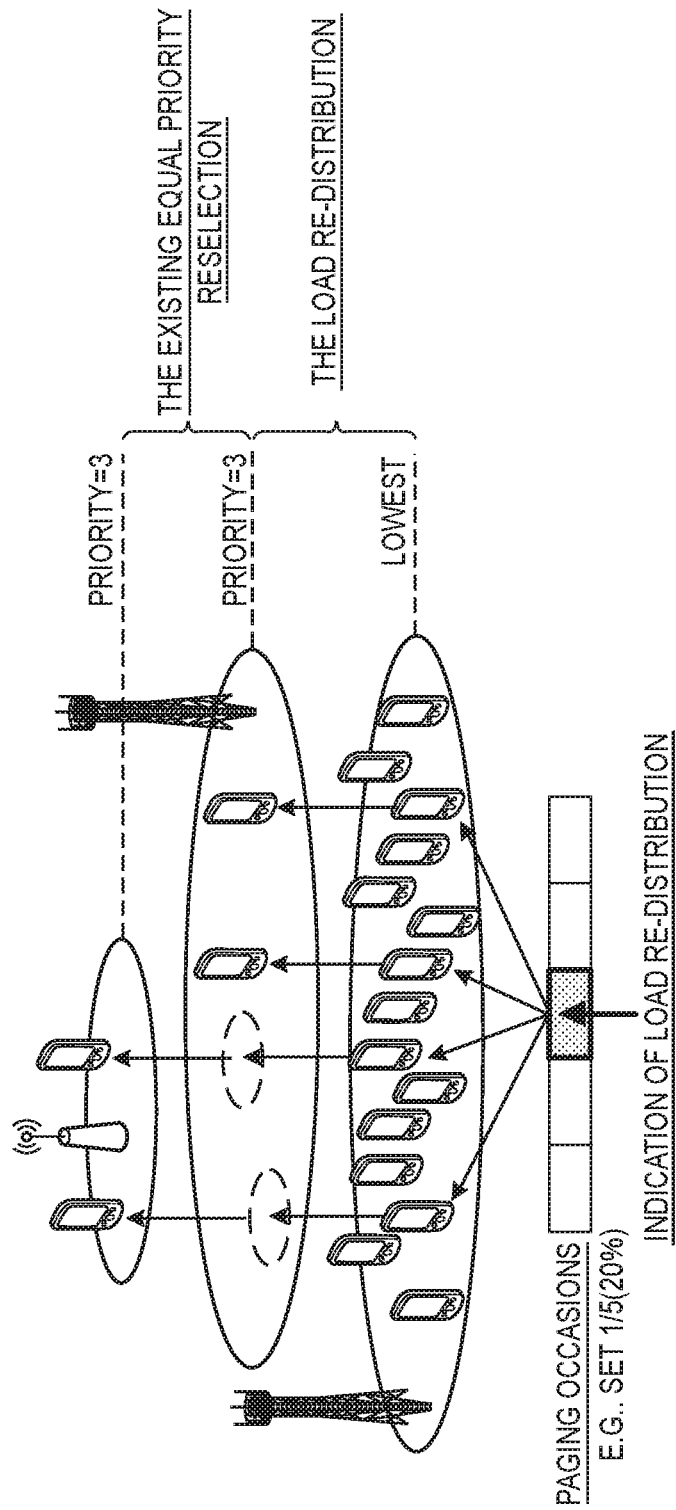

COMMUNICATION METHOD, USER TERMINAL AND PROCESSOR

CROSS-REFERENCE TO RELATED APPLICATIONS

This application is a continuation of U.S. patent application Ser. No. 16/263,820 filed on Jan. 31, 2019, which is a continuation of U.S. patent application Ser. No. 15/727,401 filed on Oct. 6, 2017, which is a continuation of International Application No. PCT/JP2016/061616 filed on Apr. 8, 2016, which claims benefit of U.S. Provisional Application No. 62/145,869 filed on Apr. 10, 2015, U.S. Provisional Application No. 62/165,315 filed on May 22, 2015, U.S. Provisional Application No. 62/188,873 filed on Jul. 6, 2015, U.S. Provisional Application No. 62/218,689 filed on Sep. 15, 2015, U.S. Provisional Application No. 62/247,948 filed on Oct. 29, 2015, and U.S. Provisional Application No. 62/281,446 filed on Jan. 21, 2016, the entirety of all applications hereby expressly incorporated by reference.

TECHNICAL FIELD

The present disclosure relates to technology for selecting a target cell used as a serving cell from a plurality of cells operated at different frequencies.

BACKGROUND ART

In 3GPP (3rd Generation Partnership Project), which is a project aiming to standardize a mobile communication system, a technology for selecting a target cell used as a serving cell from a plurality of cells operated at different frequencies is proposed.

Specifically, a user terminal measures, if a start condition is satisfied, a quality of a neighboring cell adjacent to the current serving cell, and selects, from the cells that satisfy selection conditions, the target cell used as the serving cell.

SUMMARY

A user equipment according to this disclosure comprises a memory and one or more processors. The one or more processors are operatively coupled to the memory and configured to receive a paging message including an indication from a current serving cell of the user equipment, the indication triggering a frequency redistribution procedure in which the user equipment reselects a target cell belonging to a frequency different from a frequency of the current serving cell, to be used as a serving cell, and perform the frequency redistribution procedure in response to receiving the paging message including the indication.

A method performed by a user equipment according to this disclosure comprises receiving a paging message including an indication from a current serving cell of the user equipment, the indication triggering a frequency redistribution procedure in which the user equipment reselects a target cell belonging to a frequency different from a frequency of the current serving cell, to be used as a serving cell, and performing the frequency redistribution procedure in response to receiving the paging message including the indication.

A chipset provided in a user equipment comprises a memory and one or more processors operatively coupled to the memory. The one or more processors are configured to receive a paging message including an indication from a current serving cell of the user equipment, the indication triggering a frequency redistribution procedure in which the user equipment reselects a target cell belonging to a frequency different from a frequency of the current serving cell, to be used as a serving cell, and perform the frequency redistribution procedure in response to receiving the paging message including the indication.

BRIEF DESCRIPTION OF THE DRAWINGS

FIG. 20 is a diagram according to the additional remark of the embodiment.

DESCRIPTION OF THE EMBODIMENT

Figure 1:
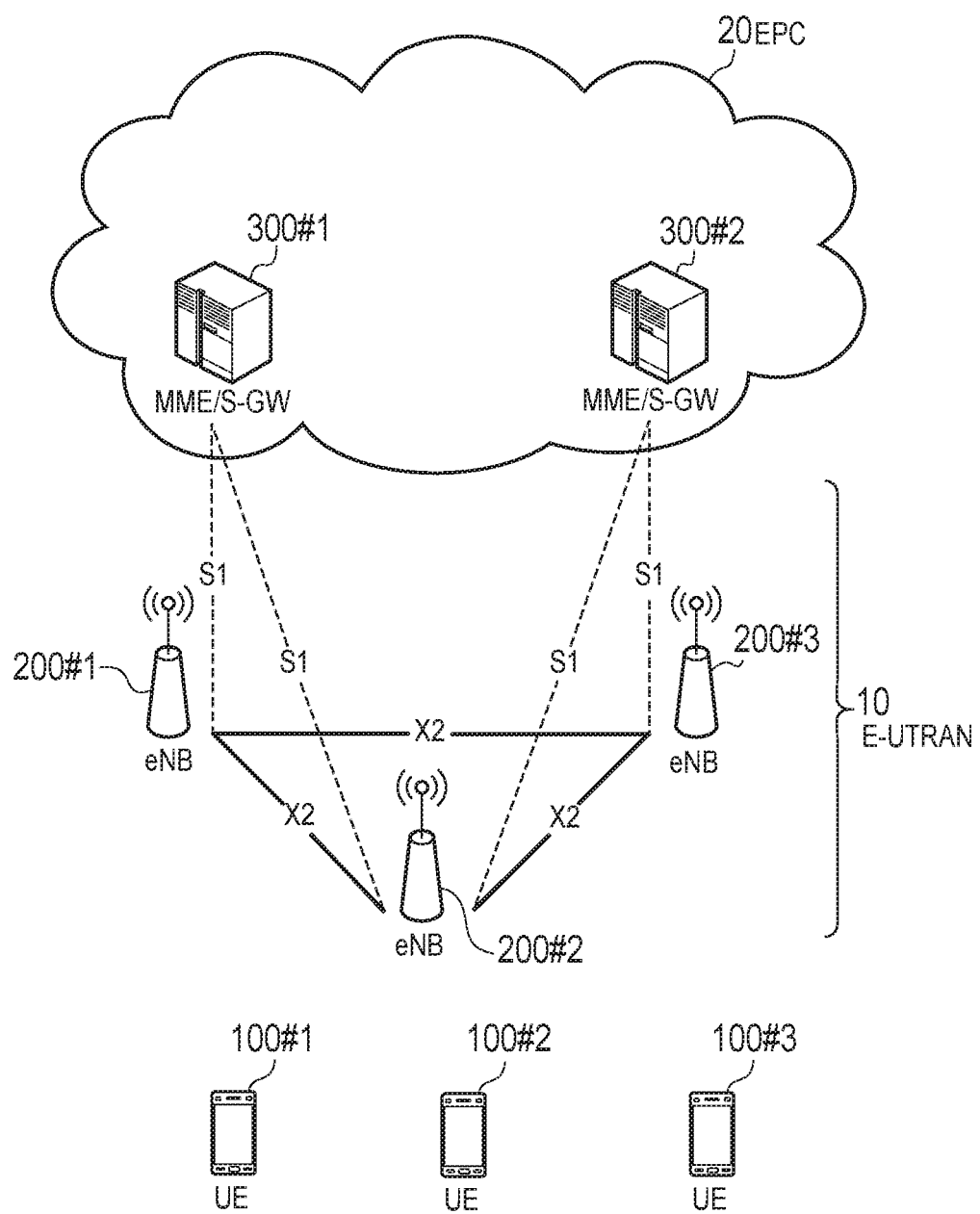
FIG. 1 is a configuration diagram of an LTE system according to an embodiment.

Hereinafter, a mobile communication system according to an embodiment will be described with reference to the drawings. It is noted that, in the following description of the drawings, identical or like numerals and symbols are assigned to identical or like parts.

However, it should be noted that the drawings are schematically shown and the ratio and the like of each dimension may be different from the real ones. Accordingly, specific dimensions and the like should be finalized in consideration of the explanation below. In addition, needless to say, among the drawings, the dimensional relationship and the ratio may be different.

[Overview of Disclosure]

In the mobile communication system mentioned in BACKGROUND ART, in selecting the target cell to be used as the serving cell, the load of each cell is not taken into consideration. Therefore, load distribution of each cell may not be appropriately performed.

A user terminal according to Overview of Disclosure includes a controller configured to select a target cell to be used as the serving cell from among a plurality of cells operated at different frequencies, and a receiver configured to receive, from a current serving cell, a reselection request signal for requesting reselection of the target cell. The controller performs, in response to the reception of the reselection request signal, the reselection of the target cell.

A user terminal according to Overview of Disclosure includes a controller configured to select a target cell to be used as a serving cell from among a plurality of cells operated at different frequencies, and a receiver configured to receive a paging signal broadcast from a current serving cell. The controller performs, depending on the reselection request signal included in the paging signal, the reselection of the target cell.

The radio base station according to Overview of Disclosure includes a transmitter configured to broadcast a paging signal at a different paging occasion. The transmitter broadcasts the paging signal including a reselection request signal for requesting reselection of a target cell to be used as a serving cell from among a plurality of cells operated at different frequencies.

A user terminal according to Overview of Disclosure includes a controller configured to select a target cell to be used as the serving cell from among a plurality of cells operated at different frequencies, and a receiver configured to receive, from a current serving cell, a reselection request signal for requesting reselection of the target cell. The controller performs, in response to a trigger that is without dependence on the reselection request signal, a first reselection process, while performing, in response to the reception of the reselection request signal, a second reselection process different from the first reselection process.

A user terminal according to Overview of Disclosure includes a controller configured to select a target cell to be used as a serving cell from among a plurality of cells operated at different frequencies. A measurement target frequency that is a frequency to be measured or to be selected in reselection of the target cell is included in the broadcast information that is broadcast from a current serving cell. The controller narrows down the measurement target frequency, based on a priority of the frequency.

A user terminal according to Overview of Disclosure includes a controller configured to select a target cell to be used as the serving cell from among a plurality of cells operated at different frequencies, and a receiver configured to receive, from a current serving cell, a reselection request signal for requesting reselection of the target cell. If the controller receives, from the current serving cell, a re-distribution parameter for distributing the target cell selected as the serving cell, the controller performs, in response to the reception of the reselection request signal, a first re-distribution process in which the re-distribution parameter is used, and if the controller does not receive the re-distribution parameter from the current serving cell, the controller performs, in response to the reception of the reselection request signal, a second re-distribution process in which the re-distribution parameter is not used.

A user terminal according to Overview of Disclosure includes a controller configured to select a target cell to be used as the serving cell from among a plurality of cells operated at different frequencies, and a receiver configured to receive, from a current serving cell, a reselection request signal for requesting reselection of the target cell. In response to the reception of the reselection request signal, the controller performs reselection of the target cell for a cell with a target frequency, while activating a predetermined timer. The controller uses the cell with the target frequency as the target cell while the predetermined timer is running. The controller changes an expiry time of the predetermined timer, based on a movement speed of the user terminal.

A user terminal according to Overview of Disclosure includes a controller configured to select a target cell to be used as the serving cell from among a plurality of cells operated at different frequencies, and a receiver configured to receive, from a current serving cell, a reselection request signal for requesting reselection of the target cell. In response to the reception of the reselection request signal, the controller performs reselection of the target cell for a cell with a target frequency, while activating a predetermined timer. The controller uses the cell with the target frequency as the target cell while the predetermined timer is running. The controller stops the predetermined timer upon receiving a stop request signal for requesting stop of the predetermined timer.

A user terminal according to Overview of Disclosure includes a controller configured to select a target cell to be used as the serving cell from among a plurality of cells operated at different frequencies, and a receiver configured to receive, from a current serving cell, a reselection request signal for requesting reselection of the target cell. In response to the reception of the reselection request signal, the controller performs reselection of the target cell for a cell with a target frequency, while activating a predetermined timer. The controller uses the cell with the target frequency as the target cell while the predetermined timer is running. The controller performs, in response to reception of an inter-frequency reselection request signal while the predetermined timer is running, reselection of the target cell for a cell with an inter-frequency.

According to a user terminal of Overview of Disclosure, it is possible to appropriately perform load distribution of each cell. In other words, a user terminal in an RRC idle state can be appropriately distributed to each cell.

First Embodiment

A first embodiment will be described by using, as an example, an LTE system based on the 3GPP standards as a mobile communication system, below.

(System Configuration)

A system configuration of the LTE system according to the first embodiment will be described below. FIG. 1 is a configuration diagram of the LTE system according to the first embodiment.

As illustrated in FIG. 1, the LTE system according to the first embodiment includes a UE (User Equipment) 100, an E-UTRAN (Evolved-UMTS Terrestrial Radio Access Network) 10, and an EPC (Evolved Packet Core) 20.

The UE 100 corresponds to a user terminal. The UE 100 is a mobile type communication device, and performs a radio communication with the cell (with the serving cell, if the UE 100 is in the RRC connected state) formed by an eNB 200. The configuration of the UE 100 will be described later.

The E-UTRAN 10 corresponds to a radio access network. The E-UTRAN 10 includes an eNB 200 (evolved Node-B). The eNB 200 corresponds to a radio base station. The eNBs 200 are connected mutually via an X2 interface. The configuration of the eNB 200 will be described later.

The eNB 200 forms one or a plurality of cells and performs radio communication with the UE 100 which establishes a connection with the cell of the eNB 200. The eNB 200 has a radio resource management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes an MME (Mobility Management Entity)/S-GW (Serving-Gateway) 300. The MME performs various types of mobility control and the like for the UE 100. The S-GW performs transfer control of the user data. The MME/S-GW 300 is connected to the eNB 200 via an S1 interface. It is noted that the E-UTRAN 10 and the EPC 20 constitute a network of the LTE system.

Figure 2:
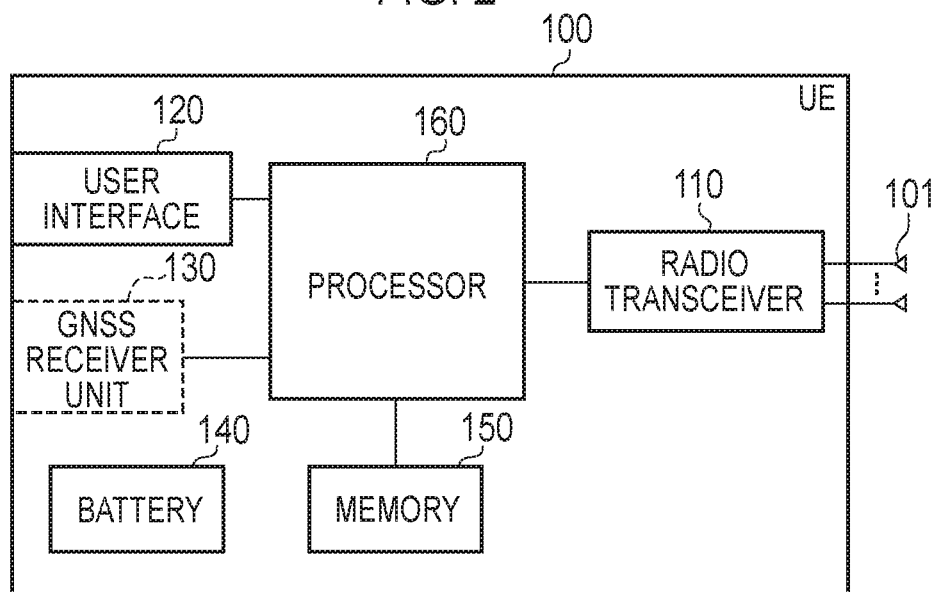
FIG. 2 is a block diagram of a UE 100 according to the embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver unit 130, a battery 140, a memory 150, and a processor 160. The memory 150 and the processor 160 configure a controller. The radio transceiver 110 and the processor 160 configure a transmitter and a receiver. The UE 100 may not necessarily have the GNSS receiver unit 130. Furthermore, the memory 150 may be integrally formed with the processor 160, and this set (that is, a chipset) may be called a processor.

The antenna 101 and the radio transceiver 110 are used to transmit and receive a radio signal. The radio transceiver 110 converts a baseband signal (transmission signal) output from the processor 160 into the radio signal, and transmits the radio signal from the antenna 101. Furthermore, the radio transceiver 110 converts the radio signal received by the antenna 101 into a baseband signal (reception signal), and outputs the baseband signal to the processor 160.

The user interface 120 is an interface with a user carrying the UE 100, and includes, for example, a display, a microphone, a speaker, various types of buttons and the like. The user interface 120 receives an operation from a user and outputs a signal indicating the content of the received operation to the processor 160. The GNSS receiver unit 130 receives a GNSS signal in order to obtain location information indicating a geographical location of the UE 100, and also outputs the received GNSS signal to the processor 160. The battery 140 accumulates power to be supplied to each block of the UE 100.

The memory 150 stores a program executed by the processor 160 and information used for a process by the processor 160. The processor 160 includes a baseband processor that performs modulation and demodulation, encoding and decoding and the like of the baseband signal and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
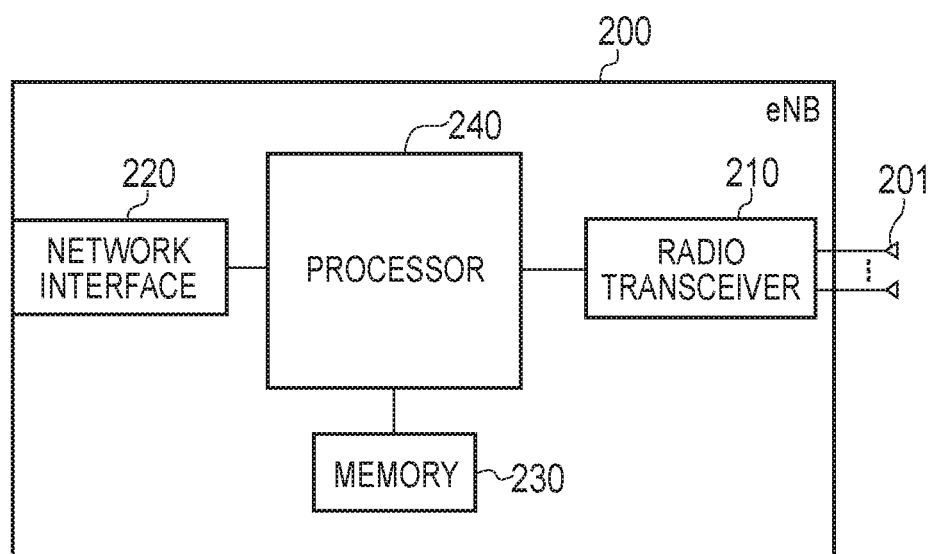
FIG. 3 is a block diagram of an eNB 200 according to the embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 configure a controller. The radio transceiver 210 (and/or the network interface 220) and the processor 240 configure a transmitter and a receiver. Furthermore, the memory 230 may be integrally formed with the processor 240, and this set (that is, the chipset) may be called a processor.

The antenna 201 and the radio transceiver 210 are used to transmit and receive the radio signal. The radio transceiver 210 converts the baseband signal (transmission signal) output from the processor 240 into the radio signal, and transmits the radio signal from the antenna 201. Furthermore, the radio transceiver 210 converts the radio signal received by the antenna 201 into the baseband signal (reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program executed by the processor 240 and information used for a process by the processor 240. The processor 240 includes a baseband processor that performs modulation and demodulation, encoding and decoding and the like of the baseband signal and a CPU that performs various types of processes by executing the program stored in the memory 230. The processor 240 executes various types of processes and various types of communication protocols described later.

Figure 4:
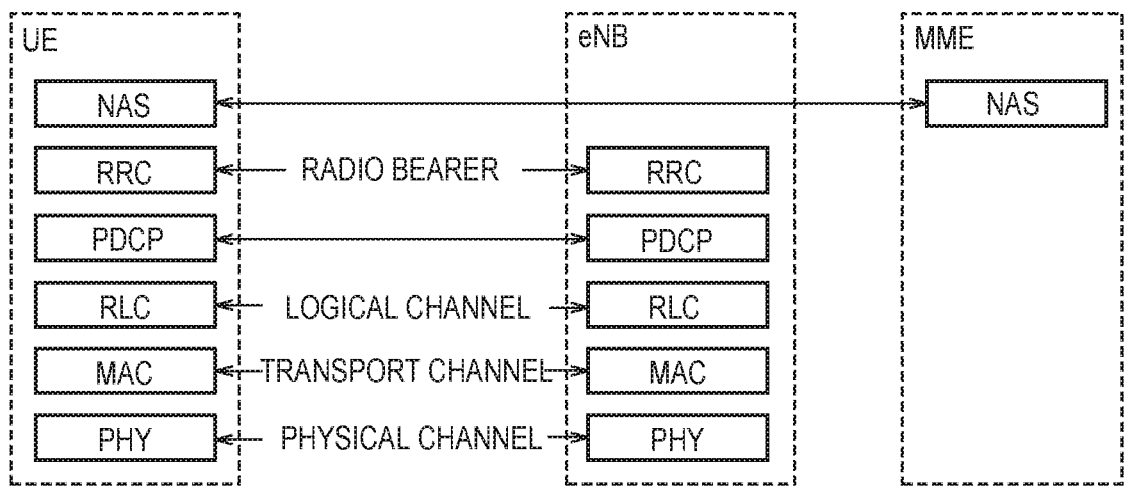
FIG. 4 is a protocol stack diagram of a radio interface according to the embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, user data and control information are transmitted via a physical channel.

The MAC layer performs priority control of data, a retransmission process by a hybrid ARQ (HARD), a random access procedure, and the like. Between the MAC layer of the UE 100 and the MAC layer of the eNB 200, user data and control information are transmitted via a transport channel. The MAC layer of the eNB 200 includes a scheduler for determining a transport format (a transport block size and a modulation and coding scheme (MCS)) of an uplink and a downlink, and an allocation resource block for the UE 100.

The RLC layer uses functions of the MAC layer and the physical layer to transmit data to the RLC layer of a reception side. Between the RLC layer of the UE 100 and the RLC layer of the eNB 200, user data and control information are transmitted via a logical channel.

The PDCP layer performs header compression and decompression, and encryption and decryption. Further, it should be noted that in the PDCP layer, a transmission entity for transmitting a data unit (PDCP PDU) or a reception entity for receiving the data unit (PDCP PDU) is formed.

The RRC layer is defined only in a control plane that handles control information. Between the RRC layer of the UE 100 and the RRC layer of the eNB 200, control information (an RRC message) for various types of settings is transmitted. The RRC layer controls the logical channel, the transport channel, and the physical channel in response to the establishment, re-establishment, and release of a radio bearer. If there is a connection (an RRC connection) between the RRC of the UE 100 and the RRC of the eNB 200, the UE 100 is in the RRC connected state, and when there is no connection (the RRC connection) between the RRC of the UE 100 and the RRC of the eNB 200, the UE 100 is in the RRC idle state.

An NAS (Non-Access Stratum) layer positioned above the RRC layer performs session management, mobility management, and the like.

Figure 5:
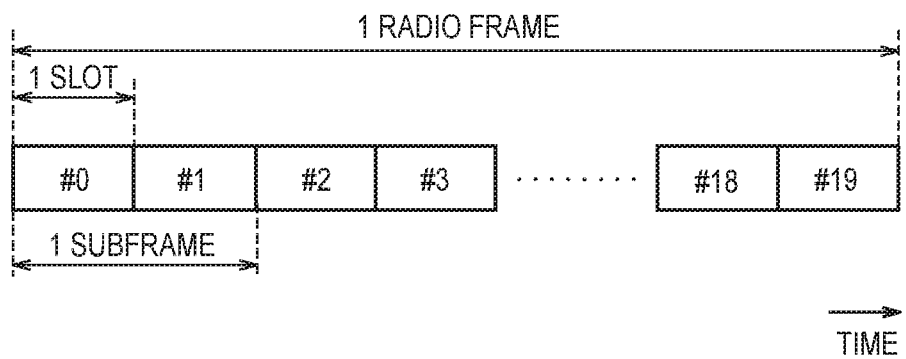
FIG. 5 is a configuration diagram of a radio frame used in the LTE system according to the embodiment.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, the radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. One resource element (RE) is configured by one symbol and one subcarrier. Furthermore, of the radio resources (time-frequency resources) allocated to the UE 100, it is possible to designate a frequency resource by a resource block, and designate a time resource by a subframe (or a slot).

(Application Scene)

Figure 6:
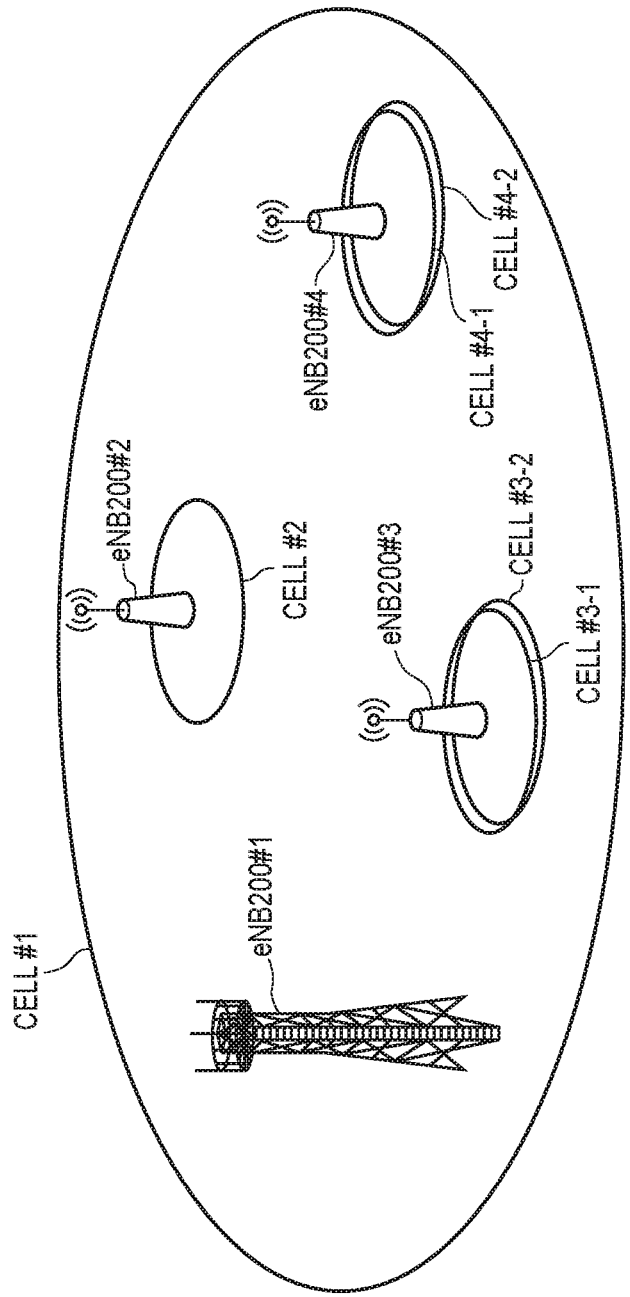
FIG. 6 is a diagram for describing an application scene according to a first embodiment.

An application scene will be described, below. FIG. 6 is a diagram for describing the application scene according to the first embodiment.

As illustrated in FIG. 6, a plurality of eNBs 200 (for example, an eNB 200 #1, an eNB 200 #2, an eNB 200 #3, and an eNB 200 #4) are provided. The eNB 200 #1 has a cell #1 as the radio communication area, the eNB 200 #2 has a cell #2 as the radio communication area, the eNB 200 #3 has a cell #3-1 and a cell #3-2 as the radio communication area, and the eNB 200 #4 has a cell #4-1 and a cell #4-2 as the radio communication area.

It is noted that the cell #2, the cell #3-1, the cell #3-2, the cell #4-1, and the cell #4-2 overlap with the cell #1. Further, each cell is operated at respectively different frequencies. A priority is defined for the frequencies where each cell is operated. The correspondence relationship between the frequency and the priority is included in system information (SIB; System Information Block) broadcast from the eNB 200.

Under such a premise, the UE 100 selects a target cell used as a serving cell from the plurality of cells operated at different frequencies. Specifically, the UE 100 measures, if start conditions are satisfied, the quality of the neighboring cell adjacent to the current serving cell, and selects, from the cells that satisfies selection conditions, the target cell used as the serving cell.

Firstly, the start conditions are shown as follows:

(A1) A frequency having a higher priority than the priority of the frequency of the current serving cell the UE 100 always measures the quality of the frequency having high priority.

(A2) A frequency having a priority equal to or lower than the priority of the frequency of the current serving cell the UE 100 measures, if the quality of the current serving cell falls below a predetermined threshold value, the quality of the frequency having equal priority or low priority.

Secondly, the selection conditions are shown as follows:

(B1) The priority of the frequency of the neighboring cell is higher than the priority of the current serving cell the UE 100 selects a cell that satisfies a relationship of Squal>Thresh$_{X, HighQ}$ over a predetermined period (Treselection$_{RAT}$), or a cell that satisfies a relationship of Srxlev>Thresh$_{X, HighP}$ over the predetermined period (Treselection$_{RAT}$) as the target cell. In such a case, such criteria to be satisfied by the neighboring cell is sometimes referred to as "S-criteria".

Squal represents a cell selection quality level, and is calculated by Squal=$Q_{qualmeas}$−($Q_{qualmin}$+$Q_{qualminoffset}$)−Qoffset$_{temp}$. $Q_{qualmeas}$ is a quality level (RSRQ) of the neighboring cell, $Q_{qualmin}$ is a minimum request quality level, $Q_{qualminoffset}$ is a predetermined offset regularly applied to the neighboring cell, and Qoffset$_{temp}$ is an offset temporarily applied to the neighboring cell. Thresh$_{X, HighQ}$ is the predetermined threshold value.

Further, Srxlev represents a cell selection reception level, and is calculated by Srxlev=$Q_{rxlevmeas}$−($Q_{rxlevmin}$+$Q_{rxlevminoffset}$)−Pcompensation−Qoffset$_{temp}$. $Q_{rxlevmeas}$ is a reception level (RSRP) of the neighboring cell, $Q_{rxlevmin}$ is a minimum request reception level, $Q_{rxlevminoffset}$ is the predetermined offset regularly applied to the neighboring cell, Pcompensation is a parameter related to an uplink capability, and Qoffset$_{temp}$ is the offset temporarily applied to the neighboring cell. Thresh$_{X, HighP}$ is the predetermined threshold value.

(B2) The priority of the frequency of the neighboring cell is the same as the priority of the current serving cell UE 100 calculates a ranking $R_s$ of the current serving cell and a ranking $R_n$ of the neighboring cell, and selects, as the target cell, the cell having the higher ranking $R_n$ than the $R_s$ over the predetermined period (Treselection$_{RAT}$). In such a case, such criteria to be satisfied by the neighboring cell is sometimes referred to as "R-criteria".

$R_s$ is calculated by $R_s$=$Q_{meas,s}$+$Q_{Hyst}$−Qoffset$_{temp}$. $R_n$ is calculated by $R_n$=$Q_{meas,n}$−Qoffset−Qoffset$_{temp}$. $Q_{meas,s}$ is the reception level (RSRP) of the current serving cell, and $Q_{meas,n}$ is the reception level (RSRP) of the neighboring cell. $Q_{Hyst}$ is a hysteresis value for facilitating reselection of the current serving cell as the target cell. Qoffset$_{temp}$ is the offset temporarily applied to the current serving cell and the neighboring cell.

(B3) The priority of the frequency of the neighboring cell is lower than the priority of the current serving cell The UE 100 selects, under a premise that Squal<Thresh$_{Serving,LowQ}$ is satisfied over the predetermined period (Treselection$_{RAT}$), or Srxlev<Thresh$_{Serving,LowP}$ is satisfied over the predetermined period (Treselection$_{RAT}$), the target cell from the neighboring cells by a similar method as the above-described (B1).

Thresh$_{Serving,LowQ}$ and Thresh$_{Serving,LowP}$ are the predetermined threshold values similarly to Thresh$_{X, HighQ}$ and Thresh$_{X, HighP}$.

It is noted that, various types of parameters used for selecting the target cell is included in the broadcast information (SIB; System Information Block) broadcast from the eNB 200. The various types of parameters include the priority of the frequency (cellReselectionPriority), the predetermined period (Treselection$_{RAT}$), the various types of offsets ($Q_{qualminoffset}$, $Q_{rxlevminoffset}$, Qoffset$_{temp}$, $Q_{Hyst}$, Qoffset), and the various types of threshold values (Thresh$_{X,HighQ}$, Thresh$_{X,HighP}$, Thresh$_{Serving,LowQ}$, Thresh$_{Serving,LowP}$).

In the first embodiment, the UE 100 (controller) selects a target cell to be used as a serving cell from among a plurality of cells operated at different frequencies. Specifically, the UE 100 (receiver) receives, from the current serving cell, a reselection request signal for requesting reselection of the target cell. The UE 100 (controller) performs, in response to the reception of the reselection request signal, the reselection of the target cell. Here, it should be noted that even if the start conditions indicated in the above-described (A1) and (A2) are not satisfied, the UE 100 (controller) starts the quality measurement of a neighboring cell accompanied with the reselection of the target cell.

Here, if the load of the current serving cell is equal to or greater than a predetermined load, the current serving cell broadcasts the reselection request signal. It is preferable that the current serving cell repeatedly broadcasts the reselection request signal in a period during which the load of the current serving cell is equal to or greater than the predetermined load. In other words, if the load of the current serving cell is equal to or greater than the predetermined load, the UE 100 (receiver) receives the reselection request signal from the current serving cell. It is preferable that the UE 100 (receiver) repeatedly receives the reselection request signal in the period during which the load of the current serving cell is equal to or greater than the predetermined load.

In the first embodiment, the reselection request signal includes a reselection parameter for making the current serving cell hard to be selected as the target cell. The UE 100 (controller) selects the target cell, based on the reselection parameter. In particular, the reselection parameter may be a parameter that designates to change the priority of the frequency (cellReselectionPriority) of the current serving cell to the lowest priority, or an offset indicating the number of steps by which the priority of the frequency (cellReselectionPriority) of the current serving cell is lowered. Alternatively, the reselection parameter may be various types of offset (Qqualminoffset, Qrxlevminoffset, Qoffsettemp, QHyst, Qoffset), and various types of threshold value (ThreshX, HighQ, ThreshX, HighP, ThreshServing, LowQ, ThreshServing, LowP).

In the first embodiment, the reselection parameter applied in response to the reception of the reselection request signal is not included in the reselection request signal, but may be included in the system information (SIB; System Information Block) broadcast separately from the reselection request signal, from the current serving cell. Alternatively, the reselection parameter applied in response to the reception of the reselection request signal may be predetermined. In such a case, the UE 100 (controller) performs, in response to the reception of the reselection request signal, the reselection of the target cell, based on the reselection parameter broadcast from the current serving cell or the predetermined reselection parameter.

In the first embodiment, even if the reselection request signal is received, the UE 100 may maintain existence in the current serving cell without performing reselection of the target cell if the predetermined condition is satisfied. The predetermined condition is a condition related to at least either item of information of the class of the UE 100 (the UE class), the priority of the frequency of the current serving cell, a power consumption setting of the UE 100, a time elapsed since receiving the last reselection request signal, and a value having randomness.

For example, if the class of the UE 100 (the UE class) is MTC (Machine Type Communication) or a data exclusive terminal, a communication data amount is small, and hence, the UE 100 (controller) preferably maintains the existence in the current serving cell without performing reselection of the target cell.

Alternatively, if the priority of the frequency of the current serving cell is the highest priority, there is a high possibility of receiving MBMS data or providing a D2D proximity service (D2D ProSe), and hence, the UE 100 (controller) preferably maintains the existence in the current serving cell without performing the reselection of the target cell.

Alternatively, if the power consumption setting of the UE 100 is a low power consumption setting, then in order to suppress the power consumption, the UE 100 (controller) preferably maintains the existence in the current serving cell without performing reselection of the target cell.

Alternatively, if the time elapsed since receiving the last reselection request signal has not elapsed a predetermined time, then in order to suppress a ping-pong phenomenon, the UE 100 (controller) preferably maintains the existence in the current serving cell without performing reselection of the target cell. For example, the UE 100 (controller) activates a timer at a timing of receiving the last reselection request signal, and preferably does not perform reselection of the target cell until the timer expires.

Alternatively, in order to suppress a situation where the plurality of UEs 100 perform reselection of the target cell all together and to randomly distribute the UEs 100 to each cell, if a value having randomness is a value other than a predetermined value, the UE 100 (controller) preferably maintains the existence in the current serving cell without performing reselection of the target cell. The value having randomness may not be a value common to all UEs 100 that exist in the current serving cell. For example, the value having randomness may be the subframe number (SFN) at which the UE 100 receives the reselection request signal, the identifier (UE-ID) of the UE 100 which receives the reselection request signal, or a random number generated by the UE 100. For example, if SFNmodUE−ID (÷n)=0 is satisfied, the UE 100 (controller) performs reselection of the target cell, and if SFNmodUE−ID (÷n)=0 is not satisfied, the UE 100 does not perform reselection of the target cell. However, n is a predetermined value or a value broadcast from the serving cell.

(Mobile Communication Method)

Figure 7:
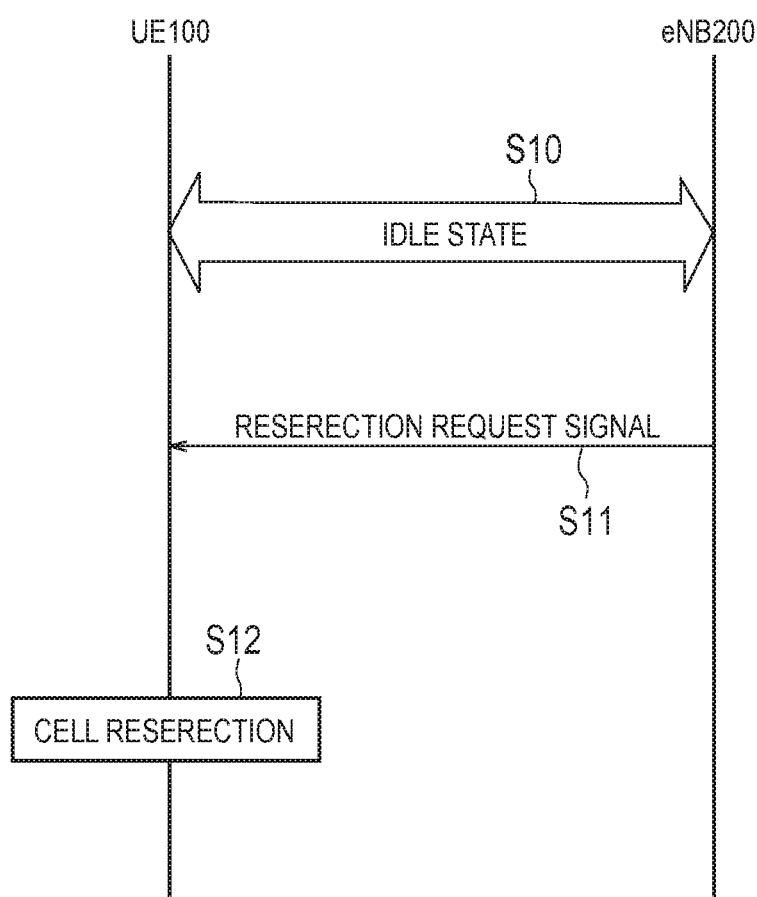
FIG. 7 is a sequence diagram illustrating a mobile communication method according to the first embodiment.

A mobile communication method according to the first embodiment will be described below. FIG. 7 is a sequence diagram illustrating the mobile communication method according to the first embodiment.

As illustrated in FIG. 7, in step S10, the UE 100 is in the RRC idle state.

In step S11, the UE 100 receives a reselection request signal broadcast from the eNB 200 (the current serving cell).

In step S12, the UE 100 performs, in response to the reception of the reselection request signal, reselection of the target cell. Here, it should be noted that even if the start conditions indicated in the above-described (A1) and (A2) are not satisfied, the UE 100 starts the quality measurement of a neighboring cell accompanied with the reselection of the target cell. Information included in the reselection request signal and a method of reselecting the target cell upon the reception of the reselection request signal are as described above.

Operation and Effect

The UE 100 according to the first embodiment performs, in response to the reception of the reselection request signal, the reselection of the target cell. That is, in response to a trigger on the network (the current serving cell) side, the UE 100 in the RRC idle state is prompted to perform the reselection of the target cell. Therefore, load distribution of each cell can be appropriately performed. In other words, the UE 100 in the RRC idle state can be appropriately distributed to each cell.

First Modification

A first modification of the first embodiment will be described below. Differences from the first embodiment will be mainly described below.

Specifically, in the first embodiment, the UE 100 performs, in response to the reception of the reselection request signal, the reselection of the target cell. In contrast, in the first modification, the UE 100 (receiver) receives, from the current serving cell, a load information signal including the information for designating a cell load. The UE 100 (controller) performs, in response to reception of the load information signal, the reselection of the target cell. Here, it should be noted that even if the start conditions indicated in the above-described (A1) and (A2) are not satisfied, the UE 100 (controller) starts the quality measurement of a neighboring cell accompanied with the reselection of the target cell.

Here, the load information signal may include information directly indicating the cell load. Information directly indicating the cell load may be, for example, a value that represents the cell load in %. Alternatively, information directly indicating the cell load may be an index indicating the level of the cell load from among a plurality of stages of levels.

The load information signal may include information indirectly indicating the cell load. Information indirectly indicating the cell load may be an offset that is temporarily set to the cell (Qoffsettemp), or a threshold value for determining whether or not to switch from a coverage area of the mobile communication system to a coverage area of a wireless LAN (ThreshServingOffloadWLAN, LowP, ThreshServingOffloadWLAN, LowQ). These values are determined depending on the cell load, and therefore, the UE 100 (controller) can estimate the cell load, based on these values. Thus, if the current serving cell broadcasts a load information signal including information indirectly indicating the cell load, the current serving cell may not broadcast information directly indicating the cell load.

In addition to information for designating the cell load of the current serving cell, the load information signal may be information indicating a difference (relative value) between the cell load of the current serving cell and the cell load of a neighboring cell adjacent to the current serving cell. Further, in addition to information for designating the cell load of the current serving cell, the load information signal may include information for designating the cell load of a neighboring cell adjacent to the current serving cell.

In the first modification, the UE 100 (controller) may determine whether or not to perform reselection of the target cell, based on the information included in the load information signal (at least either one of the cell load of the current serving cell or the cell load of the neighboring cell). The UE 100 (controller) may, for example, perform reselection of the target cell if SFNmod (UE−ID÷{(100%−cell load)×100})=0 is satisfied. However, the SFN is a subframe number at which the UE 100 receives the load information signal, the UE-ID is an identifier of the UE 100 which receives the reselection request signal, and the cell load is a value representing the cell load in %. Alternatively, the UE 100 (controller) may perform cell evaluation accompanied with the reselection of the target cell, after correcting various types of offset (Qqualminoffset, Qrxlevminoffset, Qoffset) depending on the cell load. The various types of offset are calculated, for example, by offset=(default offset)×(cell load).

In the first modification, the UE 100 (receiver) may receive, in addition to the current serving cell, the load information signal from the neighboring cell adjacent to the current serving cell. The UE 100 (controller) performs reselection of the target cell, based on information included in the load information signal received from the current serving cell and the neighboring cell. For example, the UE 100 (controller) corrects an offset to be applied to each cell, based on the cell load of each cell.

If the UE 100 (controller) is not able to receive the load information signal from a predetermined cell, the UE 100 may perform reselection of the target cell by considering the cell load of the predetermined cell as zero.

Even if the UE 100 (controller) receives the load information signal, the UE 100 may maintain existence in the current serving cell without performing reselection of the target cell if the predetermined condition is satisfied. The predetermined condition is the same as that in the first first embodiment.

(Mobile Communication Method)

Figure 8:
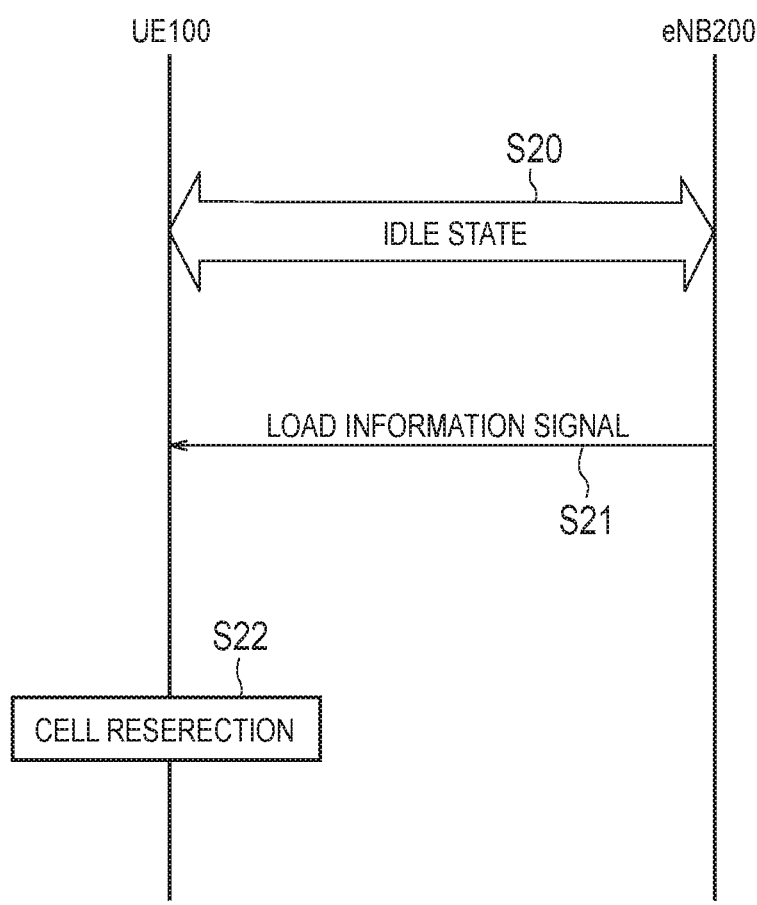
FIG. 8 is a sequence diagram illustrating a mobile communication method according to a first modification.

Hereinafter, the mobile communication method according to the first modification will be described. FIG. 8 is a sequence diagram illustrating the mobile communication method according to the first modification.

As illustrated in FIG. 8, in step S20, the UE 100 is in the RRC idle state.

In step S21, the UE 100 receives a load information signal broadcast from the eNB 200 (the current serving cell).

In step S22, the UE 100 performs, in response to the reception of the load information signal, reselection of the target cell. Here, it should be noted that even if the start conditions indicated in the above-described (A1) and (A2) are not satisfied, the UE 100 starts the quality measurement of a neighboring cell accompanied with the reselection of the target cell. Information included in the reselection request signal and a method of reselecting the target cell upon the reception of the reselection request signal are as described above.

Operation and Effect

The UE 100 according to the first modification performs, in response to the reception of the load information signal, the reselection of the target cell. That is, in response to a trigger on the network (the current serving cell) side, the UE 100 in the RRC idle state is prompted to perform the reselection of the target cell. Therefore, load distribution of each cell can be appropriately performed. In other words, the UE 100 in the RRC idle state can be appropriately distributed to each cell.

Other Modifications of First Embodiment

Although not particularly mentioned in the first embodiment, the information for designating the cell load may be information indicating the load of the current serving cell, or information indicating the load of the frequency of the current serving cell. The cell load may be the average value or the maximum value of the load of a neighboring cell operated in the same frequency as the frequency of the current serving cell.

Although not particularly mentioned in the first embodiment, the load information signal may include a reselection parameter determined by the cell load (the load of the cell, or the load of the frequency of the cell). The UE 100 (controller) selects the target cell to be used as the serving cell, based on the reselection parameter. In particular, the reselection parameter is, as the load of a cell increases, a parameter for making the cell hard to be selected as the target cell. Furthermore, the reselection parameter may be set based on the cell load of the current serving cell and the cell load of the neighboring cell.

Although not particularly mentioned in the first embodiment, a program may be provided for causing a computer to execute each process performed by the UE 100 and the eNB 200. Furthermore, the program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, for example, a recording medium such as a CD-ROM or a DVD-ROM.

Alternatively, a chip may be provided which includes: a memory in which a program for performing each process performed by the UE 100 and the eNB 200 is stored; and a processor for executing the program stored in the memory.

In the first embodiment, an LTE system was described as an example of a mobile communication system. However, the first embodiment is not limited thereto. The mobile communication system may be a system other than the LTE system.

Second Embodiment

A second embodiment will be described by using, as an example, an LTE system based on the 3GPP standards as a mobile communication system, below.

(Application Scene)

Figure 9:
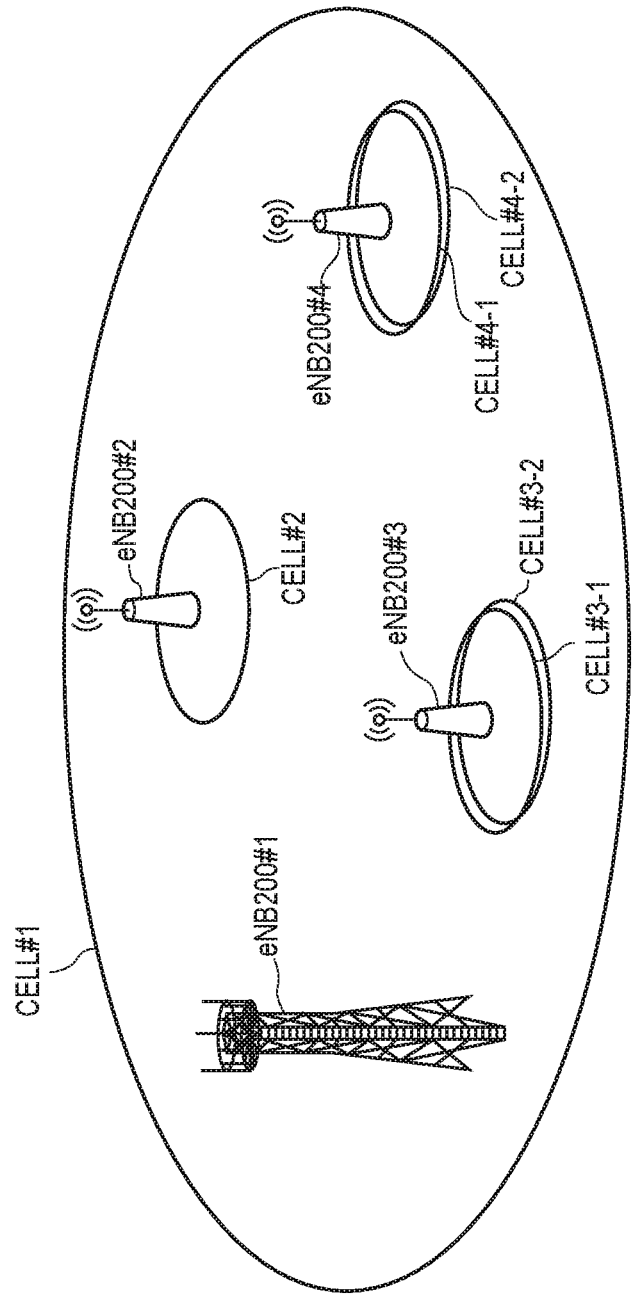
FIG. 9 is a diagram for describing an application scene according to the embodiment.

An application scene will be described below. FIG. 9 is a diagram for describing an application scene according to the second embodiment.

As illustrated in FIG. 9, a plurality of eNBs 200 (for example, an eNB 200 #1, an eNB 200 #2, and eNB 200 #3, and an eNB 200 #4) are provided. The eNB 200 #1 has a cell #1 as a radio communication area, the eNB 200 #2 has a cell #2 as a radio communication area, the eNB 200 #3 has a cell #3-1 and a cell #3-2 as a radio communication area, and the eNB 200 #4 has a cell #4-1 and a cell #4-2 as a radio communication area.

It is noted that the cell #2, the cell #3-1, the cell #3-2, the cell #4-1, and the cell #4-2 overlap with the cell #1. Further, each cell is operated at respectively different frequencies. A priority is defined for the frequencies where each cell is operated. The correspondence relationship between the frequency and the priority is included in system information (SIB; System Information Block) broadcast from the eNB 200.

Under such a premise, the UE 100 selects a target cell to be used as a serving cell from among a plurality of cells operated at different frequencies. Specifically, if a start condition is satisfied, the UE 100 measures the quality of a neighboring cell adjacent to the current serving cell, and selects, from among cells that satisfy the selection conditions, a target cell to be used as the serving cell.

Firstly, the start conditions are shown as follows:

(A1) A frequency having a higher priority than the priority of the frequency of the current serving cell the UE 100 always measures the quality of the frequency having a high priority.

(A2) A frequency having a priority equal to or lower than the priority of the frequency of the current serving cell the UE 100 measures, if the quality of the current serving cell falls below a predetermined threshold value, the quality of the frequency having an equal priority or a low priority.

Secondly, the selection conditions are shown as follows:

(B1) The priority of the frequency of the neighboring cell is higher than the priority of the current serving cell the UE 100 selects a cell that satisfies a relationship of Squal>ThreshX, HighQ over a predetermined period (TreselectionRAT), or a cell that satisfies a relationship of Srxlev>ThreshX, HighP over the predetermined period (TreselectionRAT) as the target cell. In such a case, a criteria to be satisfied by the neighboring cell is sometimes referred to as "S-criteria".

However, Squal represents a cell selection quality level, and is calculated by Squal=Qqualmeas−(Qqualmin+Qqualminoffset)−Qoffsettemp. Qqualmeas is a quality level (RSRQ) of the neighboring cell, Qqualmin is a minimum required quality level, Qqualminoffset is a predetermined offset steadily applied to the neighboring cell, and Qoffsettemp is an offset temporarily applied to the neighboring cell. ThreshX, HighQ is a predetermined threshold value.

Further, Srxlev represents a cell selection reception level, and is calculated by Srxlev=Qrxlevmeas−(Qrxlevmin+Qrxlevminoffset)−Pcompensation−Qoffsettemp. Qrxlevmeas is a reception level (RSRP) of the neighboring cell, Qrxlevmin is a minimum required reception level, Qrxlevminoffset is a predetermined offset steadily applied to the neighboring cell, Pcompensation is a parameter related to uplink capability, and Qoffsettemp is an offset temporarily applied to the neighboring cell. ThreshX, HighP are predetermined threshold values.

(B2) The priority of the frequency of the neighboring cell is the same as the priority of the current serving cell The UE 100 calculates a ranking Rs of the current serving cell and a ranking Rn of the neighboring cell, and selects a cell having a higher ranking Rn than Rs over a predetermined period (TreselectionRAT) as the target cell. In such a case, a criteria to be satisfied by the neighboring cell is sometimes referred to as "R-criteria".

However, Rs is calculated by Rs=Qmeas, s+QHyst−Qoffsettemp. Rn is calculated by Rn=Qmeas, n−Qoffset−Qoffsettemp. Qmeas, s is the reception level (RSRP) of the current serving cell, and Qmeas, n is the reception level (RSRP) of the neighboring cell. QHyst is a hysteresis value for facilitating reselection of the current serving cell as the target cell. Qoffsettemp is an offset temporarily applied to the current serving cell and the neighboring cell.

(B3) The priority of the frequency of the neighboring cell is lower than the priority of the current serving cell The UE 100 selects, under a premise that Squal<ThreshServing, LowQ is satisfied over a predetermined period (TreselectionRAT), or Srxlev<ThreshServing, LowP is satisfied over the predetermined period (TreselectionRAT), the target cell from neighboring cells by a method similar to above-described (B1).

However, ThreshServing, LowQ and ThreshServing, LowP are predetermined values similarly to ThreshX, HighQ and Thresh X, HighP.

It is noted that various types of parameter used for selecting the target cell are included in the system information (SIB; System Information Block) broadcast from the eNB 200. The various types of parameter include the priority of the frequency (cellReselectionPriority), a predetermined period (TreselectionRAT), various types of offset (Qqualminoffset, Qrxlevminoffset, Qoffsettemp, QHyst, Qoffset), and various types of threshold value (ThreshX, HighQ, ThreshX, HighP, ThreshServing, LowQ, ThreshServing, LowP).

In the second embodiment, the UE 100 (controller) selects the target cell used as the serving cell from the plurality of cells operated at different frequencies. Specifically, the UE 100 (controller) measures, even if the quality of the current serving cell satisfies the predetermined quality criteria, at a predetermined timing, the quality of the neighboring cell adjacent to the current serving cell. Here, "satisfying the predetermined quality criteria" means that the above-described start conditions are not satisfied. More particularly, the predetermined quality criteria are, as described in the above-described (A2), a condition that the quality of the current serving cell does not fall below the predetermined threshold value.

In other words, the UE 100 (controller) according to the second embodiment is configured, in principle, if the quality of the current serving cell satisfies the predetermined quality criteria, not to start quality measurement of the neighboring cell adjacent to the current serving cell. However, it should be noted that the UE 100 (controller) exceptionally starts the quality measurement of the neighboring cell based on the system information received from the current serving cell, as described later.

Here, the UE 100 (controller) designates the predetermined timing based on the system information (SIB; System Information Block) received from the current serving cell. It is noted that, the predetermined timing means a timing at which the quality measurement of the neighboring cell is started upon selection of the target cell.

The system information may mean to immediately start the quality measurement of the neighboring cell. In such a case, the UE 100 (controller) designates the timing at which the system information is received as the predetermined timing, and starts the quality measurement of the neighboring cell in response to reception of the system information.

Alternatively, the system information may include a subframe number at which the quality measurement of the neighboring cell should be started. The UE 100 (controller) designates the subframe number included in the system information as the predetermined timing, and starts the quality measurement of the neighboring cell at the designated subframe number.

Alternatively, the system information may include information indicating a period of the predetermined timing. For example, the system information includes a timer value to be set in a timer activated at the timing when the quality measurement of the neighboring cell is terminated. The UE 100 (controller) designates the timing at which the timer in which the timer value is set is expired, as the predetermined timing, and starts the quality measurement of the neighboring cell at the designated timing.

Here, in a case where the system information includes the information indicating the period of the predetermined timing, the UE 100 (controller) may correct the period of the predetermined timing based on a unique value to the UE 100. The unique value to the UE 100 may be, for example, the subframe number for receiving the system information, or an identifier (UE-ID) of the UE 100. The UE 100 (controller) sets a value obtained by "timer value×UE-ID" to the timer, and starts the quality measurement of the neighboring cell at the timing at which the timer has expired.

Alternatively, the system information may include a threshold value to be compared with a random number generated by the UE 100 (controller). The UE 100 (controller) measures the quality of the neighboring cell based on a comparison result between the random number and the threshold value at the predetermined timing. For example, the UE 100 (controller) starts, if, at the predetermined timing, a condition such as the random number being larger than the threshold value or the random number being smaller than the threshold value is satisfied, the quality measurement of the neighboring cell.

(Mobile Communication Method)

Figure 10:
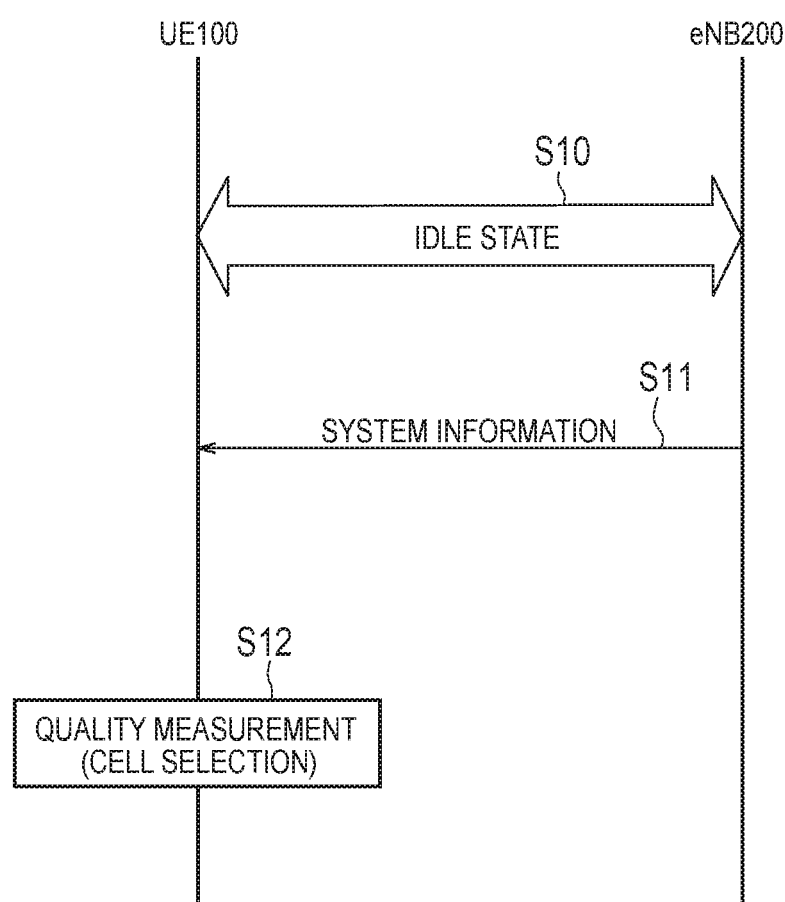
FIG. 10 is a sequence diagram illustrating a mobile communication method according to the embodiment.

Hereinafter, the mobile communication method according to the second embodiment will be described. FIG. 10 is a sequence diagram illustrating the mobile communication method according to the second embodiment.

As illustrated in FIG. 10, in step S10, the UE 100 is in the RRC idle state.

In step S11, the UE 100 receives the system information (SIB; System Information Block) broadcast from the eNB 200 (the current serving cell).

In step S12, the UE 100 measures, even if the quality of the current serving cell satisfies the predetermined quality criteria, at the predetermined timing, the quality of the neighboring cell adjacent to the current serving cell. The UE 100 designates the predetermined timing based on the system information (SIB; System Information Block).

Operation and Effect

The UE 100 (controller) according to the second embodiment measures, even if the quality of the current serving cell satisfies the predetermined quality criteria, at the predetermined timing, the quality of the neighboring cell adjacent to the current serving cell. In other words, even for the UEs 100 that are present in the geographically close location, the timings at which the quality measurement of the neighboring cell is started upon selection of the target cell are temporally discrete. Therefore, load distribution of each cell can be appropriately performed. In other words, the UE 100 in the RRC idle state can be appropriately distributed to each cell.

First Modification

A first modification of the second embodiment will be described, below. Description proceeds with a focus on differences from the second embodiment, below.

Specifically, in the second embodiment, the UE 100 measures, even if the quality of the current serving cell satisfies the predetermined quality criteria, at the predetermined timing, the quality of the neighboring cell adjacent to the current serving cell. On the contrary, in the first modification, the UE 100 (controller) selects, as illustrated in (B1) to (B3) described in the second embodiment, the target cell used as the serving cell from the cells having the quality that satisfies the predetermined quality criteria (S-criteria or R-criteria). In the selection of the target cell, the UE 100 (controller) uses a value having randomness to select the target cell.

The value having randomness may be a value which is not common to all UEs 100 that exist in the current serving cell. For example, the value having randomness is one or more values selected from the identifier (UE-ID) assigned to the UE 100, the random number generated by the UE 100 (controller), and an access class (AC) related to an access regulation of the UE 100.

Here, the UE 100 (controller) may correct the quality (for example, Squal, Srxlev, $Q_{meas,s}$, $Q_{meas,n}$) based on the value having randomness (for example, the UE-ID, the random number, and the AC). For example, as a correction method of the quality, new values may be defined as various types of offsets ($Q_{qualminoffset}$, $Q_{rxlevminoffset}$, $Qoffset_{temp}$, $Q_{Hyst}$, Qoffset), or a new offset may be introduced. Various types of offsets are calculated, for example, by offset=(default offset)×(UE-ID÷n). n is a predetermined value or a value broadcast from the serving cell.

Alternatively, the UE 100 (controller) may correct, based on the value having randomness (for example, the UE-ID, the random number, and the AC), the priority (cellReselectionPriority) of the frequency in which each of the plurality of cells is operated.

Alternatively, the UE 100 (controller) may select, based on the value having randomness (for example, the UE-ID, the random number, and the AC), the target cell from the cells having the quality that satisfies the predetermined quality criteria (S-criteria or R-criteria). In other words, the UE 100 (controller) identifies the cells having the quality that satisfies the predetermined quality criteria (S-criteria or R-criteria), and selects, based on the value having randomness, the target cell from the identified cells (selection candidate cells). For example, the UE 100 (controller) corrects, based on the value having randomness, the ranking of the selection candidate cell.

Alternatively, the UE 100 (controller) may select, based on the value having randomness, the target cell from the cells operated at a frequency having the same priority as the frequency of the current serving cell. Here, the frequency having the same priority as the frequency of the current serving cell may be the same frequency as the frequency of the current serving cell, or may be a frequency different from the frequency of the current serving cell. In other words, the UE 100 (controller) identifies the cells that satisfies the above-described conditions, and selects, based on the value having randomness, the target cell from the identified cells (selection candidate cells). For example, the UE 100 (controller) corrects, based on the value having randomness, the ranking of the selection candidate cell.

Alternatively, the UE 100 (controller) may select, based on the value having randomness, the target cell from the cells having the quality in a predetermined range. Here, the predetermined range is preferably included in the system information (SIB; System Information Block) broadcast from the current serving cell. In other words, the UE 100 (controller) identifies the cells having the quality in the predetermined range, and may select, based on the value having randomness, the target cell from the identified cells (selection candidate cells). The quality in the predetermined range may be a quality in which a difference to the best quality is included in the predetermined range (for example, within 5 dB, and the like), or may be a quality of a cell having a ranking in the predetermined range (for example, the top three) counted from the top of the ranking. For example, the UE 100 (controller) corrects, based on the value having randomness, the ranking of the selection candidate cell.

It is noted that, the ranking of the cell can be corrected as follows, for example. If the random number is used as the value having randomness, the ranking of the cell is modified by using a function of Roundup {RAND×(number of selection candidate cells)}. Alternatively, if the UE-ID is used as the value having randomness, the cell with the highest ranking is selected as the target cell from the selection candidate cells that satisfy the relationship of (UE ID) mod (Cell ID)≤n. n is a predetermined value or a value broadcast from the serving cell.

(Mobile Communication Method)

Figure 11:
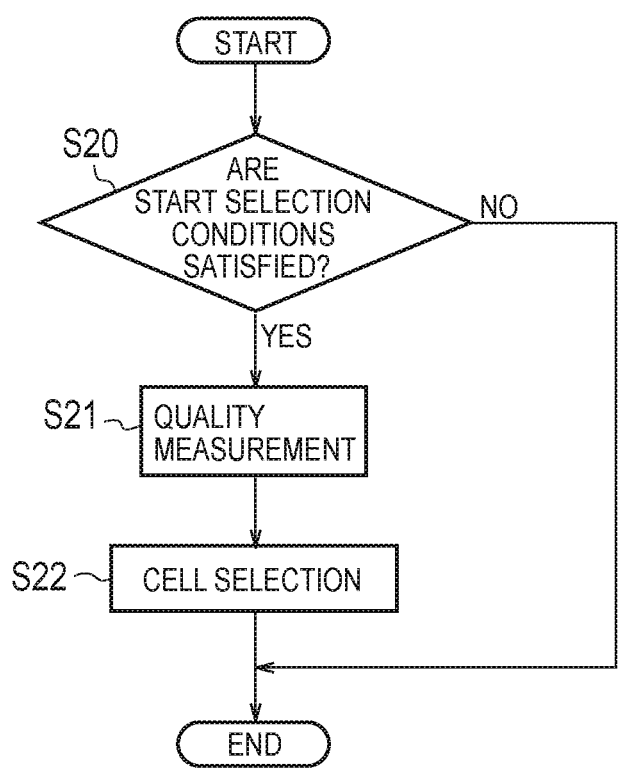
FIG. 11 is a flow diagram illustrating the mobile communication method according to the first modification.

Hereinafter, the mobile communication method according to the first modification will be described. FIG. 11 is a flow diagram illustrating the mobile communication method according to the first modification. It should be noted that the flow illustrated in FIG. 11 is performed by the UE 100.

As illustrated in FIG. 11, in step S20, the UE 100 determines whether or not the start conditions to start measuring the quality of the neighboring cell adjacent to the current serving cell are satisfied. If a determination result is YES, the UE 100 performs a process of step S21. On the other hand, if the determination result is NO, the UE 100 terminates the series of processes.

It is noted that, the start conditions are shown as follows, as described above:

(A1) A frequency having a higher priority than the priority of the frequency of the current serving cell
    the UE 100 always measures the quality of the frequency having high priority.
(A2) A frequency having a priority equal to or lower than the priority of the frequency of the current serving cell
    the UE 100 measures, if the quality of the current serving cell falls below a predetermined threshold value, the quality of the frequency having equal priority or low priority.

Here, in step 20, as described above, the priority of the frequency (cellReselectionPriority) may be corrected based on the value having randomness (for example, the UE-ID, the random number, and the AC).

In step S21, the UE 100 measures the quality of the neighboring cell adjacent to the current serving cell.

Here, in step S21, as described above, the quality (for example, Squal, Srxlev, $Q_{meas,s}$, $Q_{meas,n}$) may be corrected based on the value having randomness (for example, the UE-ID, the random number, and the AC).

In step S22, the UE 100 selects the target cell used as the serving cell from the cells (selection candidate cells) having the quality that satisfies the predetermined quality criteria (S-criteria or R-criteria).

Here, in step S22, as described above, the ranking of the selection candidate cell may be corrected based on the value having randomness (for example, the UE-ID, the random number, and the AC).

It is noted that, in the description according to FIG. 11 a part of the first modification is only illustrated, however, it should be noted that the UE 100 only needs to select the target cell by using the value having randomness, as described above.

Operation and Effect

The UE 100 (controller) according to the first modification selects the target cell by using the value having randomness. That is, even for the UEs 100 that are present in the geographically close location, cells selected as a target cell will vary. Therefore, load distribution of each cell can be appropriately performed. In other words, the UE 100 in the RRC idle state can be appropriately distributed to each cell.

Second Modification

A second modification of the second embodiment will be described, below. Description proceeds with a focus on differences from the second embodiment, below.

Specifically, in the second embodiment, the UE 100 measures, even if the quality of the current serving cell satisfies the predetermined quality criteria, at the predetermined timing, the quality of the neighboring cell adjacent to the current serving cell. On the contrary, in the second modification, the UE 100 (controller) selects, as illustrated in (B1) to (B3) described in the second embodiment, the target cell used as the serving cell, from the cells having the quality that satisfies the predetermined quality criteria (S-criteria or R-criteria). The UE 100 (controller) selects the target cell based on the reselection parameter different for each group including one or more UEs 100.

Here, the group to which the UE 100 belongs is designated by a message (for example, RRC Connection Release) used in a transition procedure from the connected state to the idle state. The message (for example, RRC Connection release) may include group identification information for identifying the group to which the UE 100 belongs.

Further, the reselection parameter includes the priority of the frequency (cellReselectionPriority), the predetermined period (Treselection$_{RAT}$), the various types of offsets ($Q_{qualminoffset}$, $Q_{rxlevminoffset}$, Qoffset$_{temp}$, $Q_{Hyst}$, $Q_{offset}$), and the various types of threshold values (Thresh$_{X,HighQ}$, Thresh$_{X,HighP}$, Thresh$_{Serving,LowQ}$, Thresh$_{Serving,LowP}$).

In the second modification, the reselection parameter is preferably included in the system information (SIB; System Information Block) broadcast from the current serving cell. That is, the cell that broadcasts the reselection parameter may be different from the cell for transmitting the message (for example, RRC Connection Release). However, the reselection parameter may be included in the message (for example, RRC Connection Release).

Here, the UE 100 (controller) may maintain the group to which the UE 100 belongs until transitioning again from the RRC idle state to the RRC connected state. In other words, the group to which the UE 100 belongs is released by a transition from the RRC idle state to the RRC connected state. Alternatively, the UE 100 (controller) may maintain the group to which the UE 100 belongs until the timer activated by reception of the message (for example, RRC Connection Release) expires. In other words, the group to which the UE 100 belongs may be released when the timer activated by designation of the group expires.

The group including one or more UEs 100 may be formed based on one or more pieces of information selected from a category of the UE 100 (a capacity of throughput), a capability of the UE 100 (number of streams of MIMO, and the like), a statistic according to a traffic of the UE 100 (S1 Initial UE Context Setup), a statistic according to a mobility of the UE 100 (S1 Initial UE Context Setup), and location information of the UE 100 (including measurement report).

Alternatively, the group including one or more UEs 100 may be formed by the access class (AC) related to the access regulation of the UE 100. That is, the reselection parameter differs for each access class related to the access regulation of the UE 100.

(Mobile Communication Method)

Figure 12:
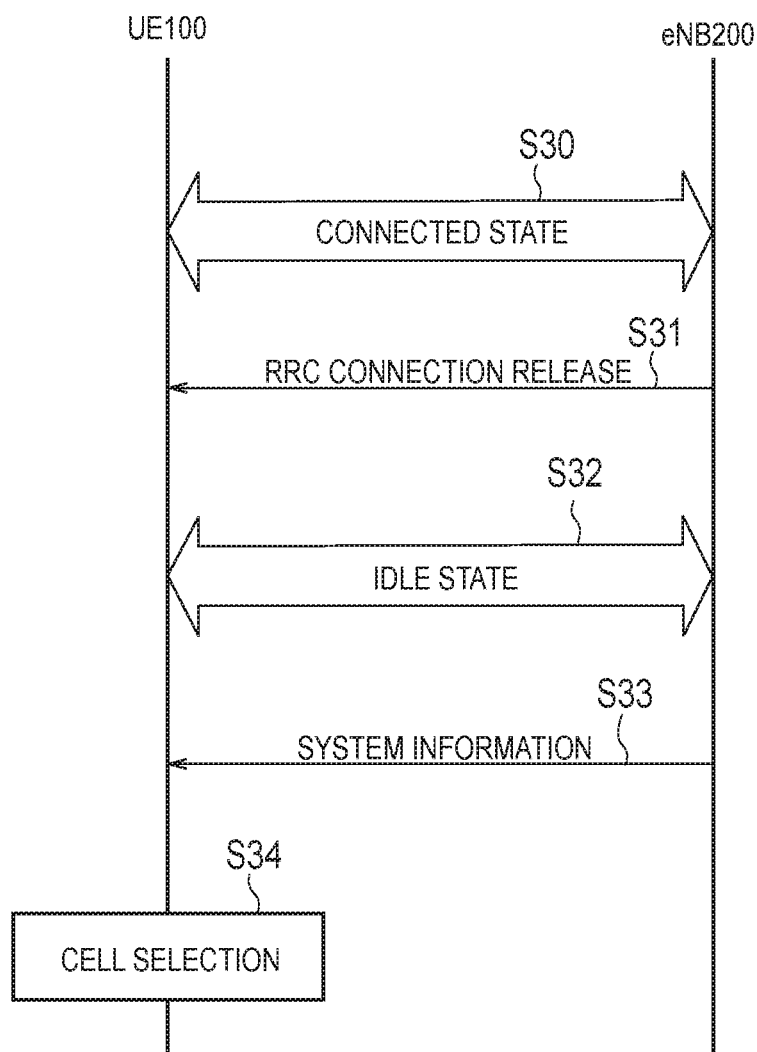
FIG. 12 is a sequence diagram illustrating a mobile communication method according to a second modification.

Hereinafter, the mobile communication method according to the second modification will be described. FIG. 12 is a sequence diagram illustrating the mobile communication method according to the second modification.

As illustrated in FIG. 12, in step S30, the UE 100 is in the RRC connected state.

In step S31, the UE 100 receives the message (RRC Connection Release) used in the transition procedure from the connected state to the idle state. The message (RRC Connection Release) designates the group to which the UE 100 belongs.

In step S32, the UE 100 is in the RRC idle state.

In step S33, the UE 100 receives the system information (SIB; System Information Block) broadcast from the eNB 200 (current serving cell). The system information includes the reselection parameter different for each group including one or more UEs 100.

It is noted that, the cell that broadcasts the reselection parameter may be different from the cell for transmitting the message (for example, RRC Connection Release).

In step S34, the UE 100 selects the target cell based on the reselection parameter assigned to the group to which the UE 100 belongs.

Operation and Effect

The UE 100 (controller) according to the second modification selects the target cell based on the reselection parameter different for each group including one or more UEs 100. That is, even for the UEs 100 that are present in the geographically close location, cells selected as a target cell will be different for different groups. Therefore, load distribution of each cell can be appropriately performed. In other words, the UE 100 in the RRC idle state can be appropriately distributed to each cell.

Third Modification

A third modification of the second embodiment will be described, below. Description proceeds with a focus on differences from the first modification, below.

In the first modification, a case where the UE 100 (controller) corrects, based on the value having randomness, the ranking of the selection candidate cell has been illustrated. On the contrary, in the third modification, another selection method will be explained as a selection method of the target cell based on the value having randomness.

Specifically, the UE 100 (receiver) receives the system information including the threshold value to be compared with the random number generated by the controller. The UE 100 (controller) selects the target cell, based on the comparison result between the random number and the threshold value.

More particularly, the UE 100 (controller) calculates, based on measurement results of the quality of each of the plurality of cells, the rankings of each of the plurality of cells, as described above. The rankings are, as described above, the ranking $R_s$ of the current serving cell and the ranking $R_n$ of the neighboring cell. The UE 100 (controller) selects the target cell, based on the comparison result between the random number and the threshold value.

In such a case, the system information includes threshold values different for each ranking. The UE 100 (controller) generates random numbers for each ranking, and selects the target cell, based on the comparison result between random numbers and threshold values for each ranking. The UE 100 (controller) may compare the random number with the threshold value in descending order of ranking, and select, as the target cell, the cell of which the comparison result between the random number and the threshold value satisfies the selection conditions.

For example, the system information includes information (Ranking_No, Probability) associating the ranking with the threshold value. Such information (Ranking_No, Probability) is information such as {Rank 1, 0.6}, {Rank 2, 0.8}, and {Rank 3, 1.0}. It is noted that, {Rank 1, 0.6} means that the threshold value associated with the Rank 1 is 0.6. Similarly, {Rank 2, 0.8} means that the threshold value associated with the Rank 2 is 0.8, and {Rank 3, 1.0} means that the threshold value associated with the Rank 3 is 1.0. Further, the range that the random number generated by the UE 100 (controller) can take is 0 to 1. Here, the selection conditions that the comparison result between random number and the threshold value should satisfy are, for example, conditions that the random number is equal to or less than the threshold value.

Firstly, the UE 100 (controller) determines whether or not to select the cell with ranking 1, as the target cell. That is, the UE 100 (controller) generates the random number for the cell with ranking 1, and determines whether or not the comparison result between the random number and 0.6 satisfies the selection conditions. For example, the UE 100 (controller) determines that, if the random number is 0.8, the selection conditions are not satisfied. Therefore, the UE 100 (controller) continues to select the target cell.

Secondly, the UE 100 (controller) determines whether or not to select the cell with ranking 2, as the target cell. That is, the UE 100 (controller) generates the random number for the cell with ranking 2, and determines whether or not the comparison result between the random number and 0.8 satisfies the selection conditions. For example, the UE 100 (controller) determines, if the random number is 0.7, the selection conditions are satisfied. Therefore, the UE 100 (controller) selects the cell with ranking 2 as the target cell, and terminates the selection of the target cell.

According to the selection method of the above-described target cell, the probability that the cell with ranking 1 is selected as the target cell is 60%. The probability that the cell with ranking 2 is selected as the target cell is 32% ({1−0.6}×0.8). The probability that the cell with ranking 3 is selected as the target cell is 8% (1−0.6−0.32). Thus, the threshold value included in the system information may be determined so that a cell with a high ranking is apt to be selected as a target cell. The third modification is not limited thereto, and the threshold value included in the system information may be determined by the load or capability of the cell.

In the third modification, a case where the system information includes the information associating the ranking with the threshold value (Ranking_No, Probability) has been illustrated. However, the third modification is not limited thereto. For example, the system information includes the information associating the priority with the threshold value (Priority, Probability).

In such a case, the UE 100 (controller) generates random numbers for each priority, and selects the target cell based on the comparison result between random numbers and threshold values for each priority. The UE 100 (controller) may compare the random number with the threshold value in descending order of priority, and select, as the target cell, the cell of which the comparison result between the random number and the threshold value satisfies the selection conditions.

The priority may be a priority of the frequency at which the cell is operated, or a priority unique to the cell.

Fourth Modification

A fourth modification of the second embodiment will be described, below. Description proceeds with a focus on differences from the second embodiment and the third modification, below.

In the fourth modification, the UE 100 (controller) triggers (or executes or starts, the same hereinafter), in response to a reference trigger notification that is any one of a plurality of trigger notifications broadcast from the current serving cell, an operation (or a procedure, the same hereinafter) for selecting (or reselecting, the same hereinafter) the target cell. The reference trigger notification is preferably the trigger notification of any one of the plurality of trigger notifications. The reference trigger notification may be a part of the trigger notification among the plurality of trigger notifications, or may be two or more trigger notifications.

Here, the trigger notification may be, at the initiative of the network (in this case, the current serving cell), a notification for directly or indirectly triggering the operation in which the UE 100 selects the target cell, and a notification broadcast over a plurality of times within a constant period. In the other words, the trigger notification may be a notification instructing the UE 100 to perform the operation for selecting the target cell.

For example, the trigger notification may be the system information (SIB; System Information Block) described in the second embodiment. The system information described in the second embodiment includes information for designating the predetermined timing at which the UE 100 starts the quality measurement of the neighboring cell. Therefore, it should be noted that the system information described in the second embodiment directly triggers the operation in which the UE 100 selects the target cell.

Alternatively, the trigger notification may be the system information (SIB; System Information Block) described in the third modification. As described above, the system information described in the third modification includes the threshold value to be compared with the random number. Alternatively, the system information described in the third modification may include the information associating the ranking with the threshold value (Ranking_No, Probability). Alternatively, the system information described in the third modification may include the information associating the priority with the threshold value (Priority, Probability). It is noted that, the UE 100 (controller) selects, in response to reception of the system information described in the third modification, the cell of which the comparison result between the random number and the threshold value satisfies the selection conditions, as the target cell. Therefore, it should be noted that the system information described in the third modification indirectly triggers the operation in which the UE 100 selects the target cell.

In such case, each of the plurality of trigger notifications includes a counter value. The UE 100 (controller) stores, in response to trigger (or execution, the same hereinafter) of the operation for selecting the target cell, the counter value included in the reference trigger notification in a counter. For example, the UE 100 retains the counter in the memory 150. The UE 100 may accumulate, each time the operation for selecting the target cell in response to the reference trigger notification is triggered, the counter value in the counter. The UE 100 (controller) does not trigger (or prohibits to execute), if the counter value included in the trigger notification broadcast from the current serving cell coincides with the counter value stored in the counter, the operation for selecting the target cell in response to the trigger notification. On the other hand, the UE 100 (controller) triggers, if the counter value included in the trigger notification broadcast from the current serving cell does not coincide with the counter value stored in the counter, the operation for selecting the target cell. Thus, in response to the trigger notification (that is, the reference trigger notification) which is any one of the trigger notifications broadcast over a plurality of times within the constant period, the operation for selecting the target cell by the UE 100 is triggered only once. In other words, in response to each of the plurality of trigger notifications within the constant period, a situation in which the operation for selecting the target cell is triggered over a plurality of times is suppressed. In other words, the UE 100 triggers, in response to one type of the trigger notification, the operation for selecting the target cell at most once. It is noted that, the counter value may be a predetermined numerical value (0 to 9, and the like).

It is noted that, the counter value included in each of the plurality of trigger notifications is updated by the current serving cell at the timing when causing the UE 100 to trigger the operation for selecting the target cell. In other words, the current serving cell broadcasts, at the timing when attempting to redistribute the UE 100 in the RRC idle state to each cell, the trigger notification including the updated counter value, over a plurality of times within the constant period.

Operation and Effect

Here, if the operation for selecting the target cell is triggered over a plurality of times by the UE 100, in response to each of the plurality of trigger notifications, most of the UEs 100 existing in the current serving cell result in performing selection of the target cell. In other words, most of the UEs 100 result in selecting the similar cell as the serving cell, and as a result, the UEs 100 in the RRC idle state cannot be appropriately distributed to each cell.

On the contrary, in the fourth modification, the UE 100 (controller) triggers, in response to the reference trigger notification that is any one of the plurality of trigger notifications broadcast from the current serving cell, the operation for selecting the target cell. Therefore, the UEs 100 in the RRC idle state can be appropriately distributed to each cell.

Fifth Modification

A fifth modification of the second embodiment will be described, below. Description proceeds with a focus on differences from the fourth modification, below.

In the fourth modification, the trigger notification is the system information (SIB; System Information Block) described in the second embodiment or the third modification. On the contrary, in the fifth modification, the trigger notification is a reselection request signal for requesting reselection of the target cell.

In the fifth modification, the UE 100 (receiver) receives, from the current serving cell, the reselection request signal for requesting reselection of the target cell. The UE 100 (controller) performs, in response to reception of the reselection request signal, reselection of the target cell. Here, it should be noted that the UE 100 (controller) starts, even if the start conditions indicated in the above-described (A1) and (A2) are not satisfied, the quality measurement of the neighboring cell upon reselection of the target cell.

Here, the current serving cell broadcasts, if the load of the current serving cell is equal to or greater than a predetermined load, the reselection request signal. The current serving cell is preferable to repeatedly broadcast the reselection request signal in a period during which the load of the current serving cell is equal to or greater than the predetermined load. In other words, the UE 100 (receiver) receives, if the load of the current serving cell is equal to or greater than the predetermined load, the reselection request signal from the current serving cell. The UE 100 (receiver) is preferable to repeatedly receive the reselection request signal in the period during which the load of the current serving cell is equal to or greater than the predetermined load.

In the fifth modification, the reselection request signal includes a reselection parameter for making the current serving cell hard to be selected as the target cell. The UE 100 (controller) selects the target cell, based on the reselection parameter. More particularly, the reselection parameter may be a parameter that designates to change the priority of the frequency of the current serving cell (cellReselectionPriority) to the lowest priority, or an offset indicating the number of steps to lower the priority of the frequency of the current serving cell (cellReselectionPriority). Alternatively, the reselection parameter may be the various types of offsets ($Q_{qualminoffset}$, $Q_{rxlevminoffset}$, $Qoffset_{temp}$, $Q_{Hyst}$, Qoffset), and the various types of threshold values ($Thresh_{X,HighQ}$, $Thresh_{X,HighP}$, $Thresh_{Serving,LowQ}$, $Thresh_{Serving,LowP}$).

In the fifth modification, the reselection parameter applied in response to reception of the reselection request signal is not included in the reselection request signal, but may be included in the system information (SIB; System Information Block) broadcast separately from the reselection request signal, from the current serving cell. Alternatively, the reselection parameter applied in response to reception of the reselection request signal may be predetermined. In such a case, the UE 100 (controller) performs, in response to reception of the reselection request signal, reselection of the target cell, based on the reselection parameter broadcast from the current serving cell or the predetermined reselection parameter.

In the fifth modification, the UE 100 (controller) may maintain, if, even if the reselection request signal is received, the predetermined condition is satisfied, existence in the current serving cell without performing reselection of the target cell. The predetermined condition is a condition related to at least one type of information selected from a class of the UE 100 (UE class), the priority of the frequency of the current serving cell, the power consumption setting of the UE 100, the time elapsed since receiving the last reselection request signal, and the value having randomness.

For example, if the class of the UE 100 (UE class) is MTC (Machine Type Communication) or a data exclusive terminal, a communication data amount is small, and hence, the UE 100 (controller) preferably maintains the existence in the current serving cell without performing reselection of the target cell.

Alternatively, if the priority of the frequency of the current serving cell is the highest priority, there is a high possibility of receiving MBMS data or providing D2D proximity service (D2D ProSe), and hence, the UE 100 (controller) preferably maintains the existence in the current serving cell without performing the reselection of the target cell.

Alternatively, if the power consumption setting of the UE 100 is the low power consumption setting, in order to suppress the power consumption, the UE 100 (controller) preferably maintains the existence in the current serving cell without performing reselection of the target cell.

Alternatively, if the time elapsed since receiving the last reselection request signal has not elapsed the predetermined time, in order to suppress the ping-pong phenomenon, the UE 100 (controller) preferably maintains the existence in the current serving cell without performing reselection of the target cell. For example, the UE 100 (controller) activates the timer at the timing of receiving the last reselection request signal, and preferably do not perform reselection of the target cell until the timer expires.

Alternatively, in order to suppress a situation where the plurality of UEs 100 perform reselection of the target cell all at once, and randomly distribute the UEs 100 to each cell, the UE 100 (controller) preferably maintains the existence in the current serving cell without performing reselection of the target cell, if the value having randomness is other than the predetermined value. The value having randomness may be a value which is not common to all UEs 100 that exist in the current serving cell. For example, the value having randomness may be the subframe number (SFN) in which the UE 100 receives the reselection request signal, the identifier (UE-ID) of the UE 100 for receiving the reselection request signal, or the random number generated by the UE 100. For example, the UE 100 (controller) performs, if SFNmodUE-ID (÷n)=0 is satisfied, reselection of the target cell, and does not perform, if SFNmodUE-ID (÷n)=0 is not satisfied, reselection of the target cell. n is a predetermined value or a value broadcast from the serving cell.

Sixth Modification

A fifth modification of the second embodiment will be described, below. Description proceeds with a focus on differences from any one of the second embodiment, the first modification to the fifth modification, below.

Specifically, in the embodiment, the first modification to the fifth modification, a signal such as the system information (SIB; System Information Block) is broadcast from the current serving cell to the UE 100.

On the contrary, in the sixth modification, a signal such as the system information broadcast from the current serving cell is broadcast to the UE 100, and is also notified to the neighboring cell (eNB 200) adjacent to the current serving cell (eNB 200). Alternatively, a load state of the current serving cell (eNB 200) is also notified to the neighboring cell (eNB 200) adjacent to the current serving cell (eNB 200). The signal or the load state such as the system information are exchanged, via an X2 interface connecting two or more eNBs 200, between each cell. Thus, the signal such as system information broadcast in each cell (the parameter for prompting reselection of the target cell) or the load state of each cell are shared between each cell, and hence, cooperative control of the plurality of cells can be performed.

For example, in a case where the loads of the plurality of cells adjacent to each other are all high, a phenomenon in which reselection of the target cell frequently occurs between the plurality of cells can be suppressed (ping-pong phenomenon). More particularly, the current serving cell puts, in a case where the signal (the parameter for prompting reselection of the target cell) such as the system information is broadcast in the neighboring cell or a case where the load of the neighboring cell is higher than a threshold value, a broadcast of the signal (the parameter for prompting reselection of that target cell) such as the system information for the UE 100, on hold.

Here, the signal such as the system information may include, as described in the second embodiment, the parameter for designating a timing (predetermined timing) at which the quality measurement of the neighboring cell is started. Alternatively, the signal such as the system information may include, as described in the first modification, the predetermined range referred to in selection of the target cell based on the value having randomness. Alternatively, the signal such as the system information may include, as described in the second modification, the reselection parameter different for each group including the one or more UEs 100. Alternatively, the signal such as the system information may include, as described in the third modification, the threshold value to be compared with the random number generated by the controller. Alternatively, the signal such as the system information may include, as described in the fourth modification, the trigger notification to prompt reselection of the target cell. Alternatively, the signal such as the system information may include, as described in the fifth modification, the reselection request signal to prompt reselection of the target cell, and may include the reselection parameter applied in response to reception of the reselection request signal.

Seventh Modification

A seventh modification of the second embodiment will be described below. Description proceeds with a focus on differences from the fifth modification, below.

Although not particularly mentioned in the fifth modification, in the seventh modification, the reselection request signal is included in a paging signal broadcast from the eNB 200 (serving cell).

Specifically, a transmitter of the eNB 200 (serving cell) broadcasts the paging signal on a different paging occasion. The eNB 200 (serving cell) broadcasts the paging signal including the reselection request signal for requesting reselection of the target cell.

Here, the paging occasion is a subframe including the paging signal. The one or more paging occasions are included in the radio frame (paging frame). The paging frame (PF) is calculated by PF=SFNmodT=(TdivN)× (UE_IDmodN). T is a DRX cycle of the UE 100, and N is represented by min (T, nB). nB is a value selected from 4T, 2T, T, T/2, T/4, T/8, T/16, and T/32. The paging occasion is defined by the relationship between Ns and i_s. i_s is represented by i_s=floor (UE_ID/N) modNs, and Ns is represented by max (1, nB/T).

In the seventh modification, the eNB 200 (serving cell) broadcasts, as the paging signal including the reselection request signal, a first paging signal on a first paging occasion, and broadcasts, as the paging signal not including the reselection request signal, a second paging signal on a second paging occasion different from the first paging occasion. In other words, the eNB 200 (serving cell) determines, for each paging cycle, whether or not to include the reselection request signal in the paging signal, and broadcasts, for each paging cycle, the paging signal including the reselection request signal or the paging signal not including the reselection request signal.

On the other hand, the UE 100 (receiver) receives the paging signal broadcast from the current serving cell. It should be noted that the UE 100 receives the paging signal at the paging cycle assigned to the UE 100. The UE 100 (controller) performs, in response to the reselection request signal included in the paging signal, reselection of the target cell. It should be noted that the UE 100 starts, similarly to the fifth modification, even if the start conditions indicated in the above-described (A1) and (A2) are not satisfied, the quality measurement of the neighboring cell upon reselection of the target cell.

In the seventh modification, the UE 100 preferably performs, even if the paging signal received in the paging cycle assigned to the UE 100 is not the paging signal addressed to the UE 100, reselection of the target cell in response to the reselection request signal included in the paging signal.

Operation and Effect

In the seventh modification, the UE 100 performs, in response to the reselection request signal included in the paging signal, reselection of the target cell. In other words, by the trigger on the network (current serving cell) side, the UE 100 in the RRC idle state is prompted to reselect the target cell. Therefore, load distribution of each cell can be appropriately performed. In other words, the UE 100 in the RRC idle state can be appropriately distributed to each cell.

Here, the paging cycle differs for each UE 100, and hence, randomness of the UE 100 performing reselection of the target cell in response to the reselection request signal included in the paging signal is secured, and the UEs 100 in the RRC idle state can be appropriately distributed to each cell.

In the seventh modification, the eNB 200 (serving cell) determines, for each paging cycle, whether or not to include the reselection request signal in the paging signal, and broadcasts, for each paging cycle, the paging signal including the reselection request signal or the paging signal not including the reselection request signal. Therefore, the percentage of the UE 100 performing reselection of the target cell in response to the reselection request signal included in the paging signal can be controlled on the eNB 200 (serving cell) side, to some extent. For example, by determining, depending on the load of the eNB 200 (serving cell), the percentage of the UE 100 performing reselection of the target cell, load distribution of each cell can be appropriately performed.

Eighth Modification

An eighth modification of the second embodiment will be described below. Description proceeds with a focus on differences from the first modification, below.

Specifically, in the first modification, a case where the UE 100 (controller) corrects, based on the value having randomness (for example, the UE-ID, the random number, and the AC), the quality (for example, Squal, Srxlev, $Q_{meas,s}$, $Q_{meas,n}$) is illustrated. In such a case, the various types of offsets ($Q_{qualminoffset}$, $Q_{rxlevminoffset}$, Qoffset$_{temp}$, $Q_{Hyst}$, Qoffset) are calculated by, for example, offset=(default offset)×(UE−ID÷n).

On the contrary, in the eighth modification, the UE 100 (controller) corrects, based on the value having randomness (for example, the UE-ID, the random number, and the AC), the various types of threshold values (Thresh$_{X,HighQ}$, Thresh$_{X,HighP}$, Thresh$_{Serving,LowQ}$, Thresh$_{Serving,LowP}$). The various types of threshold values are, as described above, an example of the various types of parameters used for selecting the target cell. Various types of threshold values are calculated, for example, by threshold=(default threshold)×(UE−ID÷n). n is a predetermined value or a value broadcast from the serving cell.

Ninth Modification

A ninth modification of the second embodiment will be described below. Differences from the fifth modification will be mainly described below.

In the fifth modification, the UE 100 (controller) performs, in response to the reception of the reselection request signal, the reselection of the target cell. The UE 100 selects the target cell, based on the reselection parameter included in the reselection request signal. In contrast, in the ninth modification, the UE 100 (controller) performs, in response to a trigger that is without dependence on the reselection request signal, a first reselection process, while performing, in response to the reception of the reselection request signal, a second reselection process different from the first reselection process.

Here, the first reselection process is a process of measuring the quality of a neighboring cell adjacent to the current serving cell if either one of the above-described start conditions (A1) to (A2) is satisfied, and selecting the target cell if any one of the above-described selection conditions (B1) to (B3) is satisfied. In contrast, the second reselection process is a process to which rules different from those of the first reselection process are applied in the reselection of the target cell. The rules to be applied to the second reselection process are as follows.

(Rule 1)

According to rule 1 to be applied to the second reselection process, the UE 100 does not use a priority of a preconfigured frequency (cellReselectionPriority).

For example, in place of the priority of a preconfigured frequency, the UE 100 uses the same priority for the priority of each cell or frequency. In such a case, only the above-described (A2) may be used as the start condition. Moreover, only the above-described (B2) may be used as the selection condition.

Alternatively, the UE 100 may ignore the priority of the preconfigured frequency (cellReselectionPriority). In such a case, only either one of the above-described (A1) and (A2) may be used as the start condition. Only any one of the above-described (B1) to (B3) may be used as the selection condition.

It is noted that the above-described (B2) is a process of reselecting the target cell, based on the ranking Rs of the current serving cell and the ranking Rn of the neighboring cell (ranking process). That is, it should be noted that in a case in which only (B2) is used, the ranking process is performed for all cells in response to the reception of the reselection request signal. Alternatively, it should be noted that the ranking process is performed for a cell having a quality equal to or more than a fixed quality in response to the reception of the reselection request signal.

(Rule 2)

According to rule 2 to be applied to the second reselection process, the UE 100 starts, in response to the reception of the reselection request signal, measurement of the quality of the measurement target frequency included in the broadcast information broadcast from the current serving cell. The broadcast information, for example, may be an SIB4 designating the frequency to be measured of an Intra-frequency, or may be an SIB5 designating the frequency to be measured of an Inter-frequency.

Here, in the first selection process, the UE 100 starts measurement of the Intra-frequency if the cell selection quality level (Squal or Srxlev) of the current serving cell is smaller than a threshold value (SIntraSearchP or SIntraSearchQ). Similarly, the UE 100 starts measurement of the Inter-frequency if the cell selection quality level (Squal or Srxlev) of the current serving cell is smaller than a threshold value (SInterSearchP or SInterSearchQ). Under such a premise, the UE 100 may ignore the setting of the threshold value (SIntraSearchP or SIntraSearchQ), and start, in response to the reception of the reselection request signal, the measurement of the Intra-frequency. Alternatively, the UE 100 may ignore the threshold value (SInterSearchP or SInterSearchQ), and start, in response to the reception of the reselection request signal, the measurement of the Inter-frequency. Alternatively, the UE 100 may handle the cell selection quality level (Squal or Srxlev) as the minimum value, and start, in response to the reception of the reselection request signal, the measurement of the quality of the measurement target frequency.

(Rule 3)

Rule 3 to be applied to the second reselection process is a rule for selecting the target cell in the ranking process. According to the rule to be applied to the first process, a cell with the highest ranking, or a cell with a higher ranking than the current serving cell is selected as the target cell. In contrast, according to rule 3 to be applied to the second reselection process, the process described below is performed.

For example, in the selection of the target cell, the UE 100 selects the target cell by using a value having randomness. In other words, the UE 100 designates a cell having a quality that satisfies the predetermined quality criteria (S-criteria or R-criteria), and selects, based on the value having randomness, the target cell from among the designated cells (candidate selection cells). In such a case, the UE 100 corrects the ranking of the candidate selection cells, based on the value having randomness. It is noted that the value having randomness is, for example, a UE-ID, a random number, or an AC.

Alternatively, the UE 100 may select a cell that does not have the highest ranking as the target cell, or the UE 10 may select a cell that does not have a higher ranking than the current serving cell as the target cell.

Alternatively, in the ranking process, the UE 100 may determine the ranking of the current serving cell or the neighboring cell, based on a quality (such as the RSRQ or the SINR) other than the RSRP. Such a rule may be thought of as an extension of the above-described "R-criteria".

(Rule 4)

According to rule 4 to be applied to the second reselection process, the UE 100 does not use a time threshold value regarding the reselection of the target cell. Specifically, the time threshold value is a predetermined period (Treselection$_{RAT}$) to be compared with a time when the cell selection quality level (Squal or Srxlev) of the neighboring cell continuously satisfies a predetermined condition, or a prohibition time threshold value to be compared with a time that has elapsed since existence in the current serving cell (for example, one second). That is, in the second reselection process, the UE 100 handles the predetermined period (Treselection$_{RAT}$) or the prohibition time threshold value (for example, one second) as zero. Alternatively, the UE 100 ignores the predetermined period (Treselection$_{RAT}$) or the prohibition time threshold value (for example, one second).

(Rule 5)

According to rule 5 to be applied to the second reselection process, a period during which the second reselection process is applied continues over a constant period.

For example, the second reselection process is applied since the first cell is selected as the target cell by the second reselection process until the second cell is selected as the target cell by the second reselection process.

Alternatively, the second reselection process is applied in a period during which the timer is running. The timer may be activated in response to the reception of the reselection request signal, or may be activated in response to the selection of the target cell in the second reselection process.

The timer activation time may be broadcast from the current serving cell, or may be included in the reselection request signal.

Alternatively, the second reselection process may be applied until reception of a message for canceling the second reselection process (for example, Reselection Request Cancel).

Tenth Modification

A tenth modification of the second embodiment will be described below. Differences from the second embodiment will be mainly described below.

The second embodiment does not particularly mention about the frequency to be measured or to be selected (hereinafter called "measurement target frequency"), in the reselection process of the cell. The measurement target frequency is, generally, included in the broadcast information broadcast from the current serving cell. The broadcast information, for example, may be an SIB4 designating the frequency to be measured of an Intra-frequency, or may be an SIB5 designating the frequency to be measured of an Inter-frequency. In contrast, in the tenth modification, a method of narrowing down a measurement target frequency in a process for appropriately distributing a UE 100 in the RRC idle state to each cell (hereinafter called "UE distribution process") will be described. The method of narrowing down a measurement target frequency is, for example, as follows.

First Method

In a first method, a measurement target frequency is narrowed down to a frequency having the same priority as the priority of the frequency (cellReselectionPriority) of the current serving cell.

Second Method

In a second method, in addition to an existing priority (first priority), an extended priority (second priority) is introduced as the priority of the frequency. A measurement target frequency is narrowed down to the frequency having the same existing priority as the existing priority of the frequency of the current serving cell, and having the same extended priority as the extended priority of the frequency of the current serving cell.

Third Method

In a third method, similarly to the second method, in addition to the existing priority (first priority), the extended priority (second priority) is introduced as the priority of the frequency. The measurement target frequency is narrowed down to a frequency to which the extended priority has been set, without dependence on the existing priority.

Fourth Method

In a fourth method, similarly to the second method, in addition to an existing priority (first priority), an extended priority (second priority) is introduced as the priority of the frequency. The measurement target frequency is narrowed down to a frequency having the same extended priority as the extended priority of the frequency of the current serving cell, without dependence on the existing priority.

Fifth Method

In a fifth method, if a frequency having a priority that is higher than the priority of the frequency narrowed down by the first method through the fourth method is detected, the process of selecting the target cell (that is, the first reselection process described in the ninth modification) may be applied if any one of the above-described selection conditions (B1) through (B3) is satisfied.

In the tenth modification, the method of narrowing down the measurement target frequency in the UE distribution process is described. Here, the UE distribution process may be any of the methods indicated in the second embodiment up to the ninth modification. For example, as described in the first, third, and eighth modifications, the UE distribution process may be a process of selecting the target cell by using a value having randomness. Alternatively, as described in the second modification, the UE distribution process may be a process of selecting the target cell by using a different reselection parameter for each group. As described in the fourth, fifth, seventh, and ninth modifications, the UE distribution process may be a process of selecting the target cell in response to a trigger notification (for example, a reselection request signal).

Eleventh Modification

An eleventh modification of the second embodiment will be described below. Differences from the fifth modification will be mainly described below.

In the fifth modification, the UE 100 (receiver) receives, from the current serving cell, the reselection request signal for requesting the reselection of the target cell. The UE 100 (controller) performs, in response to the reception of the reselection request signal, the reselection of the target cell.

In contrast, in the eleventh modification, if the UE 100 receives the reselection request signal and a predetermined trigger condition is satisfied, the UE 100 may perform the reselection of the target cell. That is, even if the UE 100 (controller) receives the reselection request signal, the UE 100 may not perform the reselection of the target cell if the predetermined trigger condition is not satisfied.

In the eleventh modification, the predetermined trigger condition is a condition in which the priority of the frequency (cellReselectionPriority) of the current serving cell is not a high priority.

For example, if the current serving cell is a CSG (Closed Subscriber Group) cell, the priority of the frequency of the CSG cell is set to high priority. In such a case, the predetermined trigger condition is that the current serving cell is not a CSG cell. Therefore, if the UE 100 receives the reselection request signal, and the current serving cell is not a CSG cell, the UE 100 performs reselection of the target cell. On the other hand, even if the UE 100 receives the reselection request signal, the UE 100 does not perform the reselection of the target cell if the current serving cell is a CSG cell. However, if a CSG cell is included in a neighboring cell of the current serving cell, the UE 100 may perform reselection of the target cell even if the current serving cell is a CSG cell.

Alternatively, if the D2D proximity service (D2D ProSe) is set in the frequency of the current serving cell, the priority of the current serving cell is set to high priority. In such a case, the predetermined trigger condition is that the D2D proximity service is not set in the frequency of the current serving cell, or that the D2D proximity service can be set even though the UE 100 does not exist in the current serving cell. Therefore, the UE 100 performs reselection of the target cell if the UE 100 receives the reselection request signal in a case where the D2D proximity service is not set in the frequency of the current serving cell, or in a case where the D2D proximity service can be set even though the UE 100 does not exist in the current serving cell. On the other hand, even if the UE 100 receives the reselection request signal, the UE 100 does not perform reselection of the target cell if the D2D proximity service is set in the frequency of the current serving cell, and if the D2D proximity service cannot be set unless the UE 100 exists in the current serving cell. It is noted that whether or not the D2D proximity service can be set is influenced not only by the network (such as the eNB 200) settings, but also by the capability of the UE 100.

Alternatively, if the UE 100 has an interest in an MBMS service provided in the frequency of the current serving cell, the priority of the current serving cell is set to high priority. In such a case, the predetermined trigger condition is that the UE 100 does not have an interest in the MBMS service provided in the frequency of the current serving cell, or that an MBMS service in which the UE 100 has an interest is provided in the frequency of a neighboring cell of the current serving cell. Therefore, the UE 100 performs reselection of the target cell if the UE 100 receives the reselection request signal in a case where the UE 100 does not have an interest in the MBMS service provided in the frequency of the current serving cell, or in a case where the MBMS service in which the UE 100 has an interest is provided in the frequency of the neighboring cell of the current serving cell. On the other hand, even if the UE 100 receives the reselection request signal, the UE 100 does not perform reselection of the target cell if the UE 100 has an interest in the MBMS service provided in the frequency of the current serving cell, and if the MBMS service in which the UE 100 has an interest is not provided in the frequency of the neighboring cell of the current serving cell.

Twelfth Modification

A twelfth modification of the second embodiment will be described below. Differences from the fifth modification will be mainly described below.

In the fifth modification, a case in which the reselection parameter is a parameter for designating to change the priority of the frequency (cellReselectionPriority) of the current serving cell to the lowest priority is described as an example. In contrast, in the twelfth modification, the definition of the lowest priority will be clarified.

Specifically, the lowest priority may be a priority that is lower than the lowest priority from among priorities that can be set at the network (eNB 200) side.

Alternatively, the lowest priority may be a priority that is lower than the lowest priority of priorities (cellReselectionPriorities) included in the broadcast information (such as the SIB5) broadcast from the neighboring cell of the current serving cell, and included in the broadcast information received by the UE 100. That is, the lowest priority may be a priority that is lower than the lowest priority of priorities of the neighboring cell.

Here, as already described in the fifth modification, the UE 100 may replace the priority (cellReselectionPriority) included in broadcast information (an SIB3) broadcast from the current serving cell with the lowest priority.

It is noted that the priority (cellReselectionPriority) can be in the range of 0 to 7, and if a large value represents a high priority, the lowest priority may be a negative value.

In addition, the reselection request signal may include an identifier indicating whether or not to replace the priority of the frequency (cellReselectionPriority) of the current serving cell with the lowest priority. For example, if the current serving cell provides an MBMS service, the current serving cell transmits a reselection request signal including an identifier indicating that the priority of the frequency of the current serving is replaced with the lowest priority. On the other hand, if the current serving cell does not provide the MBMS service, the current serving cell transmits a reselection request signal including an identifier indicating that the priority of the frequency of the current serving cell is not replaced with the lowest priority.

Thirteenth Modification

A thirteenth modification of the second embodiment will be described below. Differences from the fifth modification will be mainly described below.

In the fifth modification, the UE 100 (receiver) receives, from the current serving cell, the reselection request signal for requesting the reselection of the target cell. The UE 100 (controller) performs, in response to the reception of the reselection request signal, the reselection of the target cell.

In contrast, in the thirteenth modification, after performing reselection of the target cell in response to the reception of the reselection request signal (hereinafter called "one-shot reselection"), the UE 100 (controller) may further perform reselection of the target cell (hereinafter called "post-reselection"). Here, as described in the fifth and twelfth modifications, in the one-shot reselection, after replacing the priority of the current serving cell (or the frequency of the current serving cell) with the lowest priority, the UE 100 selects a neighboring cell (or a neighboring cell with the frequency) having a priority that is higher than the lowest priority as the target cell.

Here, a case in which two or more neighboring cells (or neighboring cells with the frequency) having a priority that is higher than the lowest priority are found in the one-shot reselection is assumed. In such a case, by performing the post-reselection after the one-shot reselection, the UE 100 can reselect an optimum cell as the target cell.

The UE 100 may perform the post-reselection only if the priority of the neighboring cell (or the frequency of the neighboring cell) is the same as the priority of the current serving cell. That is, the UE 100 may perform the post-reselection if a neighboring cell (or a neighboring cell with the frequency) having the same priority as the priority of the cell (or the frequency of the cell) selected as the target cell in the one-shot reselection exists. Alternatively, the UE 100 may perform the post-reselection if two or more neighboring cells having the same priority are found as the target cell in the one-shot reselection. On the other hand, the UE 100 may skip the post-reselection if a neighboring cell (or a neighboring cell with the frequency) having the same priority as the priority of the cell (or the frequency of the cell) selected as the target cell in the one-shot reselection does not exist. Alternatively, the UE 100 may perform the post-reselection if two or more neighboring cells having the same priority are not found as the target cell in the one-shot reselection. Here, the post selection process may be started by implementing the measurement of the neighboring cell (or the frequency of the neighboring cell) having the same priority.

To put these expressions in different wording, the process described in (A2) in the second embodiment, that is, the process of starting the measurement of the frequency having a priority that is equal to or lower than the priority of the frequency of the current serving cell if the quality of the current serving cell (for example, Srxlev and Squal) falls below a predetermined threshold value (SnonIntraSearchP and SnonIntraSearchQ) is corrected as follows. Specifically, the UE 100 starts the measurement of the frequency having a priority that is equal to or lower than the priority of the frequency of the current serving cell if the quality of the current serving cell (for example, Srxlev and Squal) falls below the predetermined threshold value (SnonIntraSearchP and SnonIntraSearchQ), or if the current serving cell is a cell selected in the one-shot reselection. On the other hand, the UE 100 may not start the measurement of the frequency having a priority that is equal to or lower than the priority of the frequency of the current serving cell if the quality of the current serving cell (for example, Srxlev and Squal) exceeds the predetermined threshold value (SnonIntraSearchP and SnonIntraSearchQ), and if the current serving cell is not a cell selected in the one-shot reselection. That is, the post-reselection process may be skipped in such a case.

It is noted that the priority of the cell (or the frequency of the cell) is included in the broadcast information (such as the SIB3 or the SIB5) broadcast from each cell, and the UE 100 may grasp the priority, based on the broadcast information.

In the thirteenth modification, only one the post-reselection may be executed after the one-shot reselection. That is, two or more post-reselections may not be performed after the one-shot reselection.

In the thirteenth modification, the UE 100 has a timer that activates in response to execution of the one-shot reselection, and the UE 100 may perform the post-reselection during a period until a timer value reaches a threshold value. The threshold value to be compared with the timer value may be included in the broadcast information (the SIB or the paging signal) broadcast from the current serving cell. The threshold value to be compared with the timer value may be included in the above-described reselection request signal. It is noted that only one the post-reselection may be executed during the period until the timer value reaches the threshold value. That is, two or more post-reselections may not be performed during the period until the timer value reaches the threshold value. Alternatively, the UE 100 has a timer that activates in response to the execution of the post-reselection, and the UE 100 may not execute the next post-reselection during a period until a timer value reaches ae threshold value, and may execute the next post reselection if the timer value reaches the threshold value. If the next post-reselection is executed upon the timer value reaching the threshold value, the UE 100 may reset or reactivate the timer. However, even during the period until the timer value reaches the threshold value, the UE 100 may execute the quality measurement described in the second embodiment above (for example, (A1) through (A2)) and the cell reselection process (for example, (B1) through (B3)). For example, even during the period until the timer value reaches the threshold value, the UE 100 may execute quality measurement of the neighboring cell (or the frequency of the neighboring cell), as well as the cell reselection process if the quality of the current serving cell (for example, Srxlev and Squal) falls below the predetermined threshold value (SnonIntraSearchP and SnonIntraSearchQ).

In the one-shot reselection according to the thirteenth modification, similarly to the fifth modification or the twelfth modification, the priority (cellReselectionPriority) included in the broadcast information (the SIB3) broadcast from the current serving cell may be replaced with the lowest priority. In such a case, in the post-reselection, the UE 100 may still handle the priority of the cell (or the frequency of the cell) (cellReselectionPriority) for which the one-shot reselection request is performed as the lowest priority. As a result, even if the network has an inadequate setting, etc., the ping-pong phenomenon in which the cell for which the one-shot reselection will be performed is selected as the target cell is suppressed.

Fourteenth Modification

A fourteenth modification of the second embodiment will be described below. Differences from the fifth modification will be mainly described below.

In the fourteenth modification, if the eNB 200 (cell) performs a process of prompting the UE 100 to perform reselection of the target cell by transmission of the reselection request signal (hereinafter called "UE distribution process"), the eNB 200 may notify an adjacent eNB of a message including an indication that the UE distribution process is to be performed, via an X2 interface. The timing of notifying the message including an indication that the UE distribution process is being performed may be before performing the UE distribution process, during the course of performing the UE distribution process, or after performing the UE distribution process. Here, during the course of performing the UE distribution process is a period from a timing of transmitting the first reselection request signal until a timing of transmitting the last reselection request signal in repeatedly transmitting the reselection request signal. In such a case, before performing the UE distribution process may be before the timing of transmitting the first reselection request signal. After performing the UE distribution process may be after the timing of transmitting the last reselection request signal.

In addition, if the eNB 200 ends the UE distribution process after notifying the adjacent eNB of the message including an indication that the UE distribution process is to be performed, via the X2 interface, the eNB 200 may notify the adjacent eNB of a message including an indication that the UE distribution process has ended, via the X2 interface.

Firstly, the adjacent eNB notified that the UE distribution process is to be performed, performs a process of preventing the eNB 200 (cell) that has notified that the UE distribution process is to be performed, from being selected as the target cell (hereinafter called "reselection restriction process").

For example, the adjacent eNB notified that the UE distribution process is to be performed, may set the priority of the eNB 200 (cell) that has notified that the UE distribution process is to be performed lower than the priority of the cell managed by the adjacent eNB. The adjacent eNB may broadcast the newly set priority of the eNB 200 (cell).

Alternatively, the adjacent eNB notified that the UE distribution process is to be performed, may add the eNB 200 (cell) that has notified that the UE distribution process is to be performed to a list of cells that are not to be selected as the target cell (hereinafter called "black list"). The adjacent eNB may broadcast the black list to which the eNB 200 (cell) has been added.

Secondly, the adjacent eNB notified that the UE distribution process is to be performed, performs a process of restricting a handover to the eNB 200 (cell) that has notified that the UE distribution process is to be performed (hereinafter called "handover restriction process").

For example, the adjacent eNB notified that the UE distribution process is to be performed, may exclude the eNB 200 (cell) that has notified that the UE distribution process is to be performed from an eNB 200 to be measured (Measurement Configuration).

Alternatively, the adjacent eNB notified that the UE distribution process is to be performed, may restrict transmission of a handover request to the eNB 200 (cell) that has notified that the UE distribution process is to be performed. Alternatively, the adjacent eNB notified that the UE distribution process is to be performed, may restrict transmission of an addition request of an SeNB in Dual Connectivity, to the eNB 200 (cell) that has notified that the UE distribution process is to be performed. Alternatively, the adjacent eNB notified that the UE distribution process is to be performed is notified, may transmit a message about exclusion from an SeNB in Dual Connectivity, to the eNB 200 (cell) that has notified that the UE distribution process is to be performed.

Here, if the adjacent eNB activates in response to start of the reselection restriction process or the handover restriction process, and a timer value reaches a threshold value, the adjacent eNB may cancel the reselection restriction process or the handover restriction process. The threshold value to be compared with the timer value may be preconfigured, or may be included in the message indicating that the UE distribution process is to be performed, or may be notified from the OAM (Operation, Administration, and Management) server. Alternatively, the adjacent eNB may cancel the reselection restriction process or the handover restriction process if being notified that the UE distribution process has ended.

Fifteenth Modification

A fifteenth modification of the second embodiment will be described below. Differences from the second embodiment will be mainly described below.

In the second embodiment, the value having randomness includes a random number generated by the UE 100 (controller). In contrast, in the fifteenth modification, the value having randomness does not include a random number generated by the UE 100 (controller). Further, the UE 100 determines whether or not to perform reselection of the target cell by using the value having randomness.

For example, the value having randomness is a value specific to the UE 100 (UE-ID). The value specific to the UE 100 (UE-ID) may be an identifier assigned by the current serving cell (RNTI; Radio Network Temporary Identifier), or may be an identifier assigned uniquely to the UE 100 beforehand (IMSI; International Mobile Subscriber Identity), or may be an identifier assigned depending on location registration of the UE 100 (S-TMSI; SAE-Temporary Mobile Subscriber Identity).

In the fifteenth modification, the UE 100 determines whether or not to perform reselection of the target cell, based on the value specific to the UE 100 and the value received from the current serving cell. Specifically, the value received from the current serving cell includes a value (Np) defining the probability that reselection of the target cell is performed and a value (Nr) for securing equity among UEs 100. Np and Nr may be included in the broadcast information broadcast from the current serving cell. In order to secure equity among UEs 100, it is preferable that Nr changes in a predetermined period. However, Np may be a predetermined value regardless of the broadcast information broadcast from the current serving cell. Similarly, Nr may be a predetermined value regardless of the broadcast information broadcast from the current serving cell.

For example, the UE 100 may perform reselection of the target cell if the condition (UE–IDmodNp)=Nr is satisfied. In such a case, the UE 100 does not perform reselection of the target cell if the condition (UE–IDmodNp)=Nr is not satisfied. As described above, an RNTI, IMSI, and S-TMSI can be used as the UE-ID. Therefore, in the expression described above, the UE-ID may be replaced with any one of the RNTI, the IMSI, and the S-TMSI.

Here, a timing of determining whether or not to perform reselection of the target cell by using a value having randomness may be the "predetermined timing" described in the second embodiment. The predetermined timing is designated, for example, based on the system information (SIB; System Information Block) received from the current serving cell. It is noted that the predetermined timing means a timing at which the quality measurement of the neighboring cell is started accompanied with the selection of the target cell.

As described in the second embodiment, the system information may mean that the quality measurement of the neighboring cell is started immediately. In such a case, the UE 100 designates the timing at which the system information is received as the predetermined timing, and starts the quality measurement of the neighboring cell in response to the reception of the system information.

Alternatively, the system information may include a subframe number at which the quality measurement of the neighboring cell should be started. The UE 100 designates the subframe number included in the system information as the predetermined timing, and starts the quality measurement of the neighboring cell at the designated subframe number.

Alternatively, the system information may include information indicating a period of the predetermined timing. For example, the system information includes a timer value to be set to a timer activated at a timing when the quality measurement of the neighboring cell, the reselection of the target cell, or the re-distribution process ends. The UE 100 designates a timing at which the timer to which the timer value is set expires, as the predetermined timing, and starts the quality measurement of the neighboring cell at the designated timing. It is noted that the re-distribution process includes an OSS (One Shot Scheme) or a CRS (Continuous Re-Distribution Scheme) described later.

In the fifteenth embodiment, a case in which the value (Nr) for securing equity among UEs 100 is included in the broadcast information broadcast from the current serving cell has been described as an example. However, the fifteenth modification is not limited thereto. For example, a frame number or subframe number including a predetermined timing may be used as Nr. For example, if the system information means that the quality measurement of the neighboring cell is started immediately, the frame number or subframe number at which the system information is received is used as Nr. Alternatively, if the system information includes the subframe number at which the quality measurement of the neighboring cell is to be started, the frame number or the subframe number at which the quality measurement of the neighboring cell is to be started is used as Nr.

Alternatively, a value (systemInfoValueTag) incremented in response to the update of the contents of the system information (SIB) may be used as the value (Nr) for securing equity among UEs 100. The systemInfoValueTag is included in the broadcast information (SIB1) broadcast from the current serving cell.

It is noted that the value of Nr is preferably selected such that the relationship Nr<Np is satisfied. Alternatively, the UE 100 may perform reselection of the target cell if the condition (UE–IDmodNp)=(NrmodNp) is satisfied. In such a case, the UE 100 does not perform reselection of the target cell if the condition (UE–IDmodNp)=(NrmodNp) is not satisfied.

Here, the UE 100 may perform reselection of the target cell if one or more conditions selected from among the three types of conditions of (UE–IDmodNp)>(NrmodNp), (UE–IDmodNp)<(NrmodNp), and (UE–IDmodNp)=(NrmodNp) are satisfied. The one or more conditions selected from among the three types of conditions (that is, an equality sign or an inequality sign in the expression described above) may be included in the broadcast information broadcast from the current serving cell.

Alternatively, a plurality of Nrs (for example, Nr1 and Nr2) may be set as the value (Nr) for securing equity among UEs 100. In such a case, the UE 100 may perform reselection of the target cell if the condition (UE–IDmodNp)=(Nr1modNp), or the condition (UE–IDmodNp)=(Nr2modNp) is satisfied.

Alternatively, a plurality of Nps (for example, Np1 and Np2) may be set as the value (Np) for defining the probability that reselection of the target cell is performed. In such a case, the UE 100 may perform reselection of the target cell if the condition (UE–IDmodNp1)=(Nr1modNp1), or the condition (UE–IDmodNp2)=(Nr2modNp2) is satisfied.

Sixteenth Modification

A sixteenth modification of the second embodiment will be described below. Differences from the second embodiment will be mainly described below.

In the sixteenth embodiment, if a re-distribution parameter for distributing the target cell selected as the serving cell is broadcast from the current serving cell, the UE 100 (receiver) receives the re-distribution parameter.

The re-distribution parameter includes one or more parameters selected from among the priority of the frequency (cellReselectionPriority), the priority of the cell (CSP; Cell Specific Priority), a predetermined period (Treselection$_{RAT}$), various types of offset (Qqualminoffset, Qrxlevminoffset, Qoffsettemp, QHyst, Qoffset), and various types of threshold value (ThreshX, HighQ, ThreshX, HighP, ThreshServing, LowQ, ThreshServing, LowP). The re-distribution parameter is, for example, included in the system information (SIB; System Information Block) broadcast from the current serving cell.

Under such a premise, if the UE 100 (controller) receives the re-distribution parameter from the current serving cell, the UE 100 performs, in response to the reception of the reselection request signal, a first re-distribution process using the re-distribution parameter. On the other hand, if the UE 100 (controller) does not receive the re-distribution parameter from the current serving cell, the UE 100 performs, in response to the reception of the reselection request signal, a second re-distribution process not using the re-distribution parameter. It is noted that similarly to the seventh modification, the reselection request signal may be included in a paging signal broadcast from the eNB 200 (serving cell).

Specifically, in the first re-distribution process, the UE 100 performs the process similar to that in the fifth modification, that is, the UE 100 performs reselection of the target cell in response to the reception of the reselection request signal. However, as described above, the re-distribution parameter is used in the first re-distribution process.

On the other hand, in the second re-distribution process, the UE 100 makes the current serving cell hard to be selected as the target cell. For example, the following process can be assumed as the second re-distribution process.

Firstly, in the second re-distribution process, the UE 100 may relatively lower the priority of the frequency (cellReselectionPriority) of the current serving cell. For example, the UE 100 changes the priority of the frequency (cellReselectionPriority) of the current serving cell to the lowest priority. Alternatively, the UE 100 may increase the priority of the frequency of a cell other than the current serving cell.

Secondly, in the second re-distribution process, the UE 100 may relatively lower the priority (CSP) of the current serving cell. For example, the UE 100 changes the priority (CSP) of the current serving cell to the lowest priority. Alternatively, the UE 100 may increase the priority of a cell other than the current serving cell.

Thirdly, in the second re-distribution process, if the priority (CSP) of the cell has been set to at least one of cells having the same frequency as the frequency of the current serving cell, the UE 100 may relatively lower the priority (CSP) of the current serving cell. On the other hand, in the second re-distribution process, if the priority (CSP) has not been set to all cells having the same frequency as the frequency of the current serving cell, the UE 100 may relatively lower the priority of the frequency (cellReselectionPriority) of the current serving cell.

Fourthly, the reselection request signal may include a predetermined value for designating the priority to be applied in the second reselection process. In such a case, if the predetermined value is a first value (for example, 0), the UE 100 may relatively lower the priority of the frequency of the current serving cell in the second re-distribution process, and if the predetermined value is a second value (for example, 1), the UE 100 may relatively lower the priority (CSP) of the current serving cell in the second re-distribution process.

Seventeenth Modification

A seventeenth modification of the second embodiment will be described below. Differences from the second embodiment will be mainly described below.

In the seventeenth modification, the UE 100 (receiver) receives, from the current serving cell, an indicator (OSS applicable) for indicating whether or not to apply the re-distribution process (OSS (One Shot Scheme)) of performing reselection of the target cell, in response to the reception of the reselection request signal. The indicator is, for example, included in the system information (SIB; System Information Block) broadcast from the current serving cell.

Under such a premise, if the UE 100 (controller) receives an indicator indicating application of the re-distribution process (OSS), and does not receive the re-distribution parameter from the current serving cell, the UE 100 may perform, in response to the reception of the reselection request signal, the second re-distribution process. If the UE 100 (controller) receives an indicator indicating non-application of the re-distribution process (OSS), and does not receive the re-distribution parameter from the current serving cell, the UE 100 may perform, in response to the reception of the reselection request signal, the second re-distribution process.

It is noted that if the UE 100 receives the indicator indicating non-application of the re-distribution process (OSS), and receives the re-distribution parameter from the current serving cell, the UE 100 performs, in response to a trigger without dependence on the reselection request signal, the reselection of the target cell by using the re-distribution parameter (CRS; Continuous Re-Distribution Scheme). The trigger without dependence on the reselection request signal is, for example, a trigger such as expiry of a timer. The value set to the timer is, for example, included in system information (SIB; System Information Block) broadcast from the current serving cell.

Eighteenth Modification

An eighteenth modification of the second embodiment will be described below. Differences from the second embodiment will be mainly described below.

In the eighteenth modification, the UE 100 (receiver) receives a broadcast existence indicator indicating whether or not the re-distribution parameter is being broadcast. The broadcast existence indicator is, for example, included in system information (SIB; System Information Block) broadcast from the current serving cell. However, the broadcast existence indicator is preferably included in the system information (for example, an MIB or an SIB1) that is to be acquired before receiving the system information (for example, the SIB3) including the re-distribution parameter. Alternatively, the broadcast existence indicator may be included in the paging signal including the reselection request signal.

Further, the UE 100 (receiver) receives a re-acquisition indicator indicating whether or not re-acquisition of the re-distribution parameter is necessary. If the re-acquisition indicator indicates that the re-acquisition of the re-distribution parameter is necessary, the UE 100 re-acquires the re-distribution parameter. The re-acquisition indicator may be included in the system information (SIB; System Information Block) broadcast from the current serving cell, or may be included in the paging signal including the reselection request signal.

In such a case, if the re-acquisition indicator indicates that the re-acquisition of the re-distribution parameter is necessary, the UE 100 (controller) performs the first re-distribution process by using the re-distribution parameter after the re-acquisition. That is, even if the UE 100 receives the reselection request signal, the UE 100 keeps the first re-distribution process pending until the re-distribution parameter is re-acquired, and performs the first re-distribution process after the re-distribution parameter is re-acquired. On the other hand, if the re-acquisition indicator indicates that the re-acquisition of the re-distribution parameter is not necessary, the UE 100 (controller) performs the first re-distribution process by using the re-distribution parameter prior to re-acquisition. That is, if the UE 100 receives the reselection request signal, the UE 100 performs the first re-distribution process without waiting for the re-acquisition of the re-distribution parameter.

In the eighteenth modification, the broadcast existence indicator may be information indicating whether or not the re-distribution parameter is broadcast in the next system modification period (SI Modification Period). The re-acquisition indicator may be information indicating whether or not the re-distribution parameter is modified in the next system modification period (SI Modification Period). According to such a configuration, the broadcast existence indicator and the re-acquisition indicator can be notified only to a certain UE 100.

In addition, in a case in which both the re-distribution parameter according to the priority of the frequency, and the re-distribution parameter according to the priority of the cell are broadcast from the current serving cell to a single frequency, an application parameter indicator indicating which re-distribution parameter is to be applied may be broadcast from the current serving cell. For example, the application parameter indicator indicates whether to apply the re-distribution parameter according to the priority of the frequency, or to apply the re-distribution parameter according to the priority of the cell, or else to apply the re-distribution parameter according to both the priority of the frequency and the priority of the cell. The application parameter indicator may be included in the system information (SIB; System Information Block) broadcast from the current serving cell, or may be included in the paging signal including the reselection request signal. The UE 100 that receives the application parameter indicator determines the re-distribution parameter to be used in the re-distribution process, based on the application parameter indicator.

Nineteenth Modification

A nineteenth modification of the second embodiment will be described below. Differences from the second embodiment will be mainly described below.

In the nineteenth modification, similarly to in the fifteenth modification, the UE 100 (controller) performs reselection of the target cell, based on a value specific to the UE 100. In particular, in addition to the value specific to the UE 100, the UE 100 uses values that are different for each frequency or cell to perform the first re-distribution process or the second re-distribution process.

For example, the UE 100 performs the first re-distribution process or the second re-distribution process according to the following expression.

[Math. 1]

$$redistrRange[i] =$$ expression (1)

$$redistrFactor[i] / \sum_{j=0}^{j=(max\ CandidateFreq-1)} redistrFactor[j]$$

$$\{(UE\_ID + offset) \bmod 100\} <= 100 \times redistrRange[0]$$ expression (2)

$$100 \times \sum_{j=0}^{j=i-1} redistrRange[j] <$$ expression (3)

$$\{(UE\_ID + offset) \bmod 100\} <= 100 \times \sum_{j=0}^{j=i} redistrRange[j]$$

However, redistrRange[i] is a value for defining the probability that a cell with the ith candidate frequency is selected as the target cell, and is a value being from 0 to 1. redistrRange[0] is a value for defining the probability that a cell with the frequency of the current serving cell is selected as the target cell, and is a value being from 0 to 1. UE_ID is a value specific to a UE, offset is a value that is different for each frequency or cell, and is a value being from 0 to 100.

In such a case, if offset is not used, a certain UE 100 that satisfies "(UE_IDmod100)≤100×redeitrRange[0]" does not move from the current serving cell to a cell with another frequency, and continues to exist in the serving cell. That is, the certain UE 100 that need not move from the current serving cell is fixed. If such a situation is permitted, an inequity may occur between the certain UE 100 and the other UEs 100. In contrast, in the nineteenth modification, the inequity among the UEs 100 can be resolved by the introduction of the offset.

Further, if the offset is not used, the effect of re-distribution of the UE 100 to each cell is influenced by the initial distribution of the certain UE 100 satisfying "(UE_IDmod100)≤100×redeitrRange[0]". In contrast, in the nineteenth modification, the certain UE 100 satisfying "{(UE_ID+offset) mod 100}≤100×redeitrRange[0]" can be intentionally induced in a certain frequency by the introduction of the offset. In addition, if the randomness of UE_ID of the UE 100 that exists in each cell is taken into consideration, the UE 100 can be effectively redistributed to each cell as compared to the case in which the effect of re-distribution of the UE 100 to each cell is influenced by the initial distribution of the certain UE 100 satisfying "(UE_IDmod100)≤100×redeitrRange[0]".

In the nineteenth modification, the offset may be, for example, included in the system information (SIB; System Information Block) broadcast from the current serving cell, or may be included in the paging signal including the reselection request signal. The offset may be included in the RRC message transmitted individually to the UE 100.

In the nineteenth modification, the offset may be calculated, based on a value and another parameter that vary for each frequency or each cell. For the other parameter, time information (SFN or UTC) including a timing when the UE 100 receives the reselection request signal can be used. The offset may be a value that varies for each frequency or cell, or may be a value that is set by OAM.

In the nineteenth modification, a case in which after the expression (2) is applied, the expression (3) is applied is assumed, and in order to select a UE 100 that moves to the cell with the ith candidate frequency, the order of substitution of (UE_ID+offset) mod 100} in the expression (3) is optional. However, the nineteenth modification is not limited thereto.

Specifically, in a case in which the frequencies assigned to redeitrRange[0] through redeitrRange[j] are predetermined, the order of substitution of (UE_ID+offset) mod 100} in expression (2) or expression (3) may be specified. Alternatively, in a case in which (UE_ID+offset) mod 100} is substituted in expression (2) or expression (3) in the order of 0 to j, the frequencies assigned to redeitrRange[0] through redeitrRange[j] may be specified. The re-distribution process can be intentionally controlled so that the UE 100 can use a cell with a certain frequency as the serving cell by such an order specification or frequency specification. The information including the above-described order specification or frequency specification may be included in the system information (SIB; System Information Block) broadcast from the current serving cell, or may be included in the paging signal including the reselection request signal. Without the order specification or frequency specification, the process of substituting (UE_ID+offset) mod 100} in expression (2) or expression (3) of redeitrRange corresponding to an absent order or frequency may be skipped.

Twentieth Modification

A twentieth modification of the embodiment will be described below. Differences from the fifth modification will be mainly described below.

Figure 13:
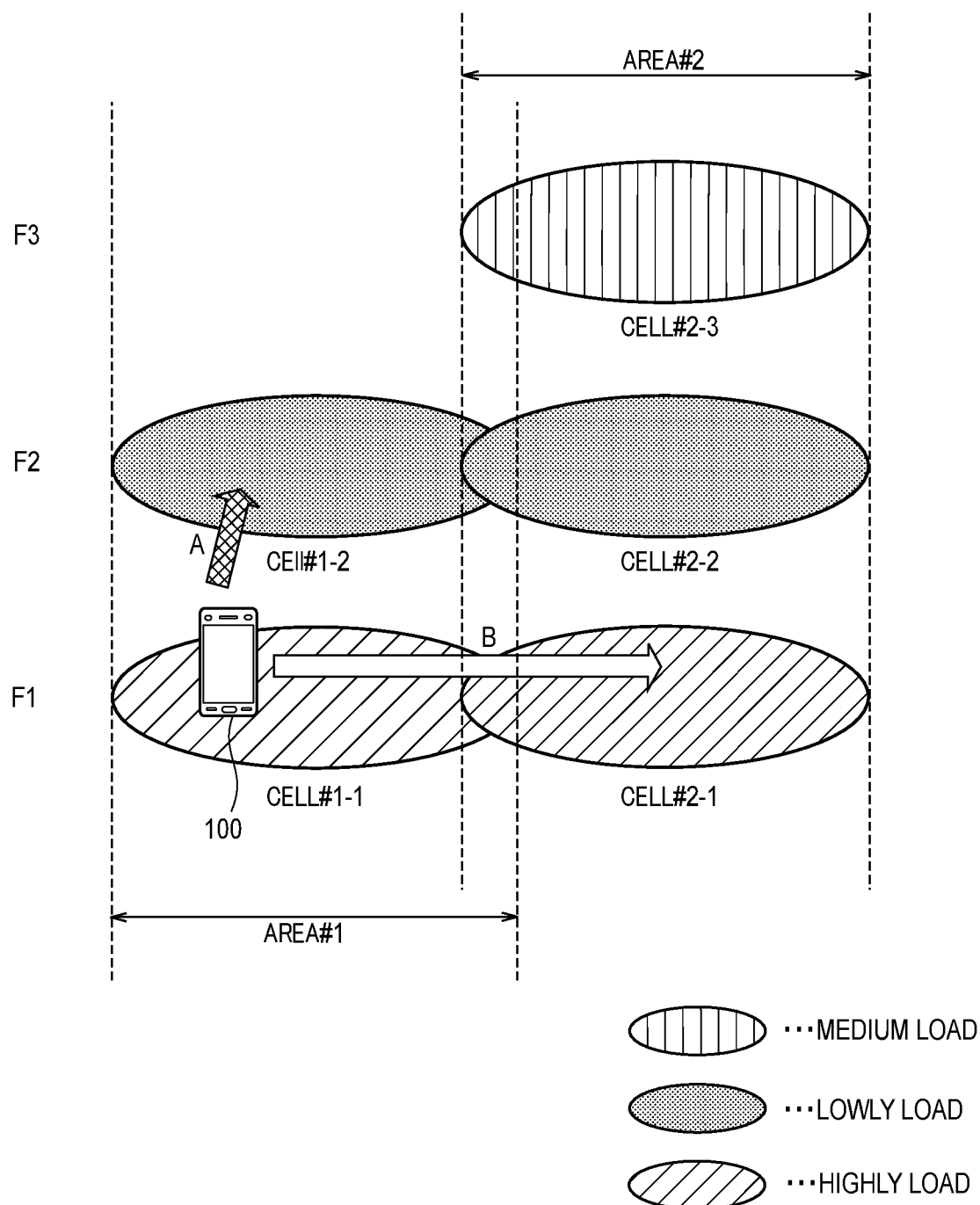
FIG. 13 is a diagram illustrating an application scene according to a twentieth modification.

An application scene of the twentieth modification is as illustrated in FIG. 13. As illustrated in FIG. 13, the mobile communication system has an area #1 and an area #2. A cell #1-1 with a frequency F1 and a cell #1-2 with the frequency F1 are provided in the area #1. A cell #2-1 with the frequency F1, a cell #2-2 with the frequency F1, and a cell #2-3 with the frequency F1 are provided in the area #2. The cells (#1-1 and #2-1) with the frequency F1 are cells having high load, and the cells (#1-2 and #2-2) with a frequency F2 are cells having low load. The cell (#2-3) with a frequency F3 is a cell having medium load, and has a higher priority than the cells with the frequencies F1 and F2. For example, the cells with the frequencies F1 and F2 may be macro cells, and the cell with frequency F3 may be a CSG cell.

In the twentieth modification, similarly to in the fifth modification, the UE 100 (controller) performs, in response to the reception of the reselection request signal, the reselection of the target cell for the cell with the target frequency, while activating a predetermined timer (T360). The UE 100 (controller) uses the cell with the target frequency as the target cell while the predetermined timer is running. For example, in the case illustrated in FIG. 13, if a reselection request signal is received from the cell #1-1 with the frequency F1 in the first area, reselection of the target cell is performed from the cell #1-1 with the frequency F1 to the cell #1-2 with the frequency F2 (an operation A illustrated in FIG. 13). After such an operation A, a case in which the UE 100 moves from the area #1 to the area #2 is assumed (an operation B illustrated in FIG. 13).

In such a case, in the twentieth modification, the UE 100 (controller) changes an expiry time of the predetermined timer (T360), based on the movement speed of the UE 100. Specifically, the faster the movement speed of the UE 100, the UE 100 (controller) sets a short expiry time for the expiry time of the predetermined timer. For example, if a count time of the predetermined timer reaches a predetermined time threshold value (T-re-distribution), the UE 100 (controller) determines that the predetermined timer has expired. Therefore, the predetermined time threshold value (T-re-distribution) is a value that defines the expiry time of the predetermined timer. A method of changing the expiry time of the predetermined timer is, for example, as follows.

(1) The UE 100 (controller) may determine the expiry of the timer by using a value obtained by multiplying a scaling factor based on the movement speed of the UE 100 with the predetermined time threshold value (T-re-distribution) that defines the expiry time of the predetermined timer. The scaling factor is a value that is defined based on the movement speed, and is, for example, a value being from 0 to 1. The faster the movement speed, the smaller the value of the scaling factor.

For example, a case is assumed in which a movement speed slower than a predetermined movement speed is considered as a low movement speed, and a movement speed faster than the predetermined movement speed is considered as a high movement speed. If the scaling factor corresponding to the low movement speed is 1, the scaling factor corresponding to the high movement speed is, for example, 0.25. Therefore, upon the movement speed of the UE 100 being a low movement speed, if the count time of the predetermined timer reaches a value obtained by multiplying the scaling factor (1) with the predetermined time threshold value (T-re-distribution), it is determined that the predetermined timer has expired. On the other hand, upon the movement speed of the UE 100 being a high movement speed, if the count time of the predetermined timer reaches a value obtained by multiplying the scaling factor (0.25) with the predetermined time threshold value (T-re-distribution), it is determined that the predetermined timer has expired.

(2) The UE 100 (receiver) receives a plurality of predetermined time threshold values that define the expiry time of the predetermined timer. The UE 100 (controller) determines the expiry of the timer by using the predetermined time threshold value selected based on the movement speed of the UE 100 from among a plurality of predetermined time threshold values. The faster the movement speed, the shorter the predetermined time threshold value.

For example, a case is assumed in which a movement speed slower than a predetermined movement speed is considered as a low movement speed, and a movement speed faster than the predetermined movement speed is considered as a high movement speed. The predetermined time threshold value corresponding to the high movement speed (T-re-distribution_2) is shorter than the predetermined time threshold value corresponding to the low movement speed (T-re-distribution_1). The plurality of predetermined time threshold values may be included in the system information (SIB) broadcast from an eNB 200 having a high priority cell (#2-3) with a higher priority than the priority of the cells (#1-2 and #2-2) with the target frequency F2.

(3) The UE 100 (controller) may determine the expiry of the timer, based on the combination of (1) and (2). That is, the UE 100 (controller) may determine the expiry of the timer by using a value obtained by multiplying a scaling factor with the predetermined time threshold value selected based on the movement speed of the UE 100.

In any one of the above-described procedures (1) through (3), the UE 100 (controller) may change the expiry time of the predetermined timer if the movement speed of the UE 100 changes after activating the predetermined timer. It is natural for the UE 100 to change the expiry time of the predetermined timer, based on the movement speed after the change.

In such a case, if the movement speed of the UE 100 becomes faster than the movement speed of the UE 100 that is referenced in activating the predetermined timer, the UE 100 (controller) may change the expiry time of the predetermined timer. If the movement speed of the UE 100 becomes slower than the movement speed of the UE 100 that is referenced in activating the predetermined timer, the UE 100 (controller) may not change the expiry time of the predetermined timer.

The UE 100 (controller) may change the expiry time of the predetermined timer while the predetermined timer is running. The UE 100 (controller) may change the expiry time of the predetermined timer after the expiry of the predetermined timer.

According to the twentieth modification, while the predetermined timer is running, if the possibility is high that the UE 100 moves from the area #1 in which the UE 100 is located when the UE 100 receives the reselection request signal, to the area #2 in which a high priority cell (#2-3) having a higher priority than the cells (#1-2 and #2-2) with the target frequency F2 is provided, it is possible to suppress the situation where the high priority cell is not selected as the target cell until the predetermined timer expires. On the other hand, if the possibility is low that the UE 100 moves from the area #1 to the area #2, while the predetermined timer is running, it is possible to suppress the ping-pong phenomenon that occurs between a source frequency and a target frequency.

Twenty First Modification

A twenty first modification of the embodiment will be described below. Differences from the twentieth modification will be mainly described below. An application scene of the twenty first modification is similar to that of the twentieth modification.

In the twentieth modification, the UE 100 (controller) changes an expiry time of the predetermined timer (T360), based on the movement speed of the UE 100. In contrast, in the twenty first modification, the UE 100 (controller) stops the predetermined timer upon reception of a stop request signal for requesting stop of the predetermined timer. The stop request signal may be broadcast from an eNB 200 having a high priority cell (#2-3) with a higher priority than the priority of the cells (#1-2 and #2-2) with the target frequency F2. That is, the stop request signal may not be broadcast from the eNB 200 having a cell provided in the area #1. The stop request signal may be included in the system information (SIB) broadcast from the eNB 200 having a cell provided in the area #2.

Here, the UE 100 (controller) may stop the predetermined timer if the movement speed of the UE 100 is faster than a predetermined speed, and the UE 100 receives the stop request signal. That is, even if the UE 100 receives the stop request signal, the UE 100 may not stop the predetermined timer if the movement speed of the UE 100 is slower than the predetermined speed. However, regardless of the movement speed of the UE 100, the UE 100 (controller) may stop the predetermined timer if the UE 100 receives the stop request signal.

According to the twenty first modification, similarly to in the twentieth modification, if the possibility that the UE 100 moves from the area #1 to the area #2 is high while the predetermined timer is running, it is possible to suppress the situation where the high priority cell is not selected as the target cell until the predetermined timer expires. On the other hand, if the possibility is low that the UE 100 moves from the area #1 to the area #2, while the predetermined timer is running, it is possible to suppress the ping-pong phenomenon that occurs between a source frequency and a target frequency.

Twenty Second Modification

A twenty second modification of the embodiment will be described below. Differences from the twentieth modification will be mainly described below. An application scene of the twenty second modification is similar to that of the twentieth modification.

In the twentieth modification, the UE 100 (controller) changes an expiry time of the predetermined timer (T360), based on the movement speed of the UE 100. In contrast, in the twenty second modification, the UE 100 (controller) performs, in response to reception of an inter-frequency reselection request signal while the predetermined timer is running, the reselection of the target cell for a cell with an inter-frequency. The inter-frequency reselection request signal may be broadcast from an eNB 200 having a high priority cell (#2-3) with a higher priority than the priority of the cells (#1-2 and #2-2) with the target frequency F2. That is, the inter-frequency reselection request signal may not be broadcast from the eNB 200 having a cell provided in the area #1. The inter-frequency reselection request signal may be included in the system information (SIB) broadcast from the eNB 200 having a cell provided in the area #2.

In the twenty second modification, in response to the reception of the inter-frequency reselection request signal, the predetermined timer may not be stopped even if reselection of the target cell for a cell with an inter-frequency is performed.

Here, the UE 100 (controller) may perform reselection of the target cell for a cell with an inter-frequency, based on a parameter broadcast from the cell (cell #2-2) with the target frequency (F2), rather than a parameter broadcast from the cell (cell #1-1) with the source frequency (F1). Various types of parameter broadcast from the cell (cell #2-2) with the target frequency (F2) include, for example, the priority of the frequency (cellReselectionPriority), a predetermined period (TreselectionRAT), various types of offset (Qqualminoffset, Qrxlevminoffset, Qoffsettemp, QHyst, Qoffset), and various types of threshold value (ThreshX, HighQ, ThreshX, HighP, ThreshServing, LowQ, ThreshServing, LowP).

According to the twenty second modification, similarly to in the twentieth modification, if the possibility that the UE 100 moves from the area #1 to the area #2 is high while the predetermined timer is running, it is possible to suppress the situation where the high priority cell is not selected as the target cell until the predetermined timer expires. On the other hand, if the possibility is low that the UE 100 moves from the area #1 to the area #2, while the predetermined timer is running, it is possible to suppress the ping-pong phenomenon that occurs between a source frequency and a target frequency.

Other Modifications of Second Embodiment

Although not particularly mentioned in the second embodiment, the quality measurement of the neighboring cell upon selection of the target cell may be started if the predetermined condition is satisfied at the predetermined timing (second embodiment). Alternatively, selection of the target cell by using the value having randomness (first modification) may be performed when the predetermined condition is satisfied. For example, the predetermined condition may be that the access class of the UE 100 is the access class notified from the current serving cell. Alternatively, the predetermined condition may be that the priority of the frequency modAC=0 is satisfied, or that cell–IDmodAC=0 is satisfied.

As described in the second embodiment, a selection procedure of the target cell as a whole includes, (A) if the start conditions are satisfied, a procedure for measuring the quality of the neighboring cell adjacent to the current serving cell (a measurement procedure), and (B) a procedure for selecting, from the cells that satisfy the selection conditions, the target cell used as the serving cell (the selection procedure). The second embodiment relates to the measurement procedure, and the first modification to the third modification relate to the selection procedure. In such a case, the measurement procedure according to the second embodiment may be combined with the selection procedure according to any one of the first modification to the third modification. Further, the selection procedures according to two or more modifications selected from the first modification to the third modification may be combined.

In the fourth modification, a case where the current serving cell uses, in order to cause the UE 100 to trigger the operation for selecting the target cell in response to the reference trigger notification which is any one of the plurality of trigger notifications, the counter that the UE 100 has and the counter value included in the trigger notification has been illustrated. However, the fourth modification is not limited thereto. Specifically, in response to the trigger notification (reference trigger notification) which is any one of the trigger notifications broadcast from the current serving cell, over the plurality of times within the constant period, the operation in which the UE 100 selects the target cell may be triggered. Therefore, the UE 100 may activate the timer in response to trigger (or execution or start, the same hereinafter) of the operation for selecting the target cell, and be configured, even if the trigger notification is received during the time until timer expires, not to trigger the operation for selecting the target cell. The time until the timer expires since the timer has been activated is preferably comparable to the period (the above-described constant period) during which the trigger notification is broadcast over a plurality of times. Alternatively, each of the plurality of trigger notifications include toggle information that can take a value of two or more, and the UE 100 (controller) may store, if the operation for selecting the target cell is triggered in response to the reference notification, the toggle information included in the reference trigger, in a storage area. In such a case, the UE 100 (controller) does not trigger, if the toggle information included in the trigger notification broadcast from the current serving cell coincides with the toggle information stored in the storage area, the operation for selecting the target cell. On the other hand, the UE 100 (controller) triggers, if the toggle information included in the trigger notification broadcast from the current serving cell does not coincide with the toggle information stored in the storage area, the operation for selecting the target cell.

Although not particularly mentioned in the second embodiment, a cell (hereinafter, an overload cell) that transmits the trigger notification such as a parameter for prompting reselection of the target cell or the reselection request signal for requesting reselection of the target cell may be handled as follows. Specifically, the UE 100 may exclude the overload cell from the measurement target cells. Alternatively, the UE 100 may exclude, even if the overload cell satisfies the criteria ("S-criteria") to be satisfied by the neighboring cell, the overload cell from the target cells used as the serving cell. Alternatively, the UE 100 may exclude the overload cell from the cell imparting the ranking. Thus, in a state where the plurality of neighboring cells are transmitting the trigger notification (for example, in a state where the load is high in all the plurality of neighboring cells), the ping-pong phenomenon in which the UE 100 alternately selects these neighboring cells as the target cell is suppressed.

Although not particularly mentioned in the second embodiment, the UE 100 may perform, if the condition that the time elapsed since the UE 100 existed in the current serving cell exceeds a prohibition time threshold value (for example, one second) is satisfied, reselection of the target cell. Under such premises, if the UE 100 performs reselection of the target cell in response to the above-described trigger notification, it is preferable to use the time threshold value longer than the time threshold value used in a case of performing reselection of the target cell in response to the above-described start conditions (A1 and A2). Thus, in a state where the plurality of neighboring cells are transmitting the trigger notification (for example, in a state where the load is high in all the plurality of neighboring cells), the ping-pong phenomenon in which the UE 100 alternately selects these neighboring cells as the target cell is suppressed. From a similar point of view, if the UE 100 performs reselection of the target cell in response to the above-described trigger notification, it is preferable to use a predetermined period (Treselection$_{RAT}$) longer than the predetermined period (Treselection$_{RAT}$) used in a case of performing reselection of the target cell in response to the above-described start conditions (A1 and A2).

In the second embodiment and the modifications thereof, the priority (cellReselectionPriority) may be considered as the priority assigned to the frequency of the cell, or may be considered as the priority assigned to the cell. For example, the priority (cellReselectionPriority) may be the priority of an inter-frequency, or may be the priority of an inter-RAT frequency cell.

Although not particularly mentioned in the twentieth through the twenty second modification of the second embodiment, a method of reselecting the target cell is not particularly restricted, and may be the method described in the embodiment or the other modifications.

Although not particularly mentioned in the second embodiment, a program may be provided for causing a computer to execute each process performed by the UE 100 and the eNB 200. Furthermore, the program may be recorded on a computer-readable medium. If the computer-readable medium is used, it is possible to install the program in a computer. Here, the computer-readable medium recording therein the program may be a non-transitory recording medium. The non-transitory recording medium may include, but not be limited to, for example, a recording medium such as a CD-ROM or a DVD-ROM.

Alternatively, a chip may be provided which includes: a memory in which a program for performing each process performed by the UE 100 and the eNB 200 is stored; and a processor for executing the program stored in the memory.

In the second embodiment, the LTE system is described as an example of a mobile communication system. However, the embodiment is not limited thereto. The mobile communication system may be a system other than the LTE system.

[Additional Statement 1]

(Instruction)

the new work item is approved on Multicarrier Load Distribution of UEs in LTE and the objective of this work item (WI) is to enhance the cell reselection mechanism in IDLE under up-to-date multicarrier operations.

The WI should first have a study phase to look at following.

Limitations of the current mechanisms and measurement quantities for redistribution of UEs amongst multiple LTE carriers.

Based on the analysis of the study phase, the WI should provide solution(s) for following.

To redistribute RRC Idle UEs amongst LTE carriers that minimize the need for load triggered HO or redirection of UE during connected mode Carriers with different cell load, bandwidth and capabilities should be considered.

Both homogeneous and heterogeneous deployment scenarios should be considered

New measurement quantities, e.g. SINR, for better estimation of user throughput should be evaluated and introduced, if needed In this additional statement, the potential issues in the cell reselection mechanism for multi-carrier load distribution are identified in support of the study phase.

(Deployment Scenarios)

Figure 14:
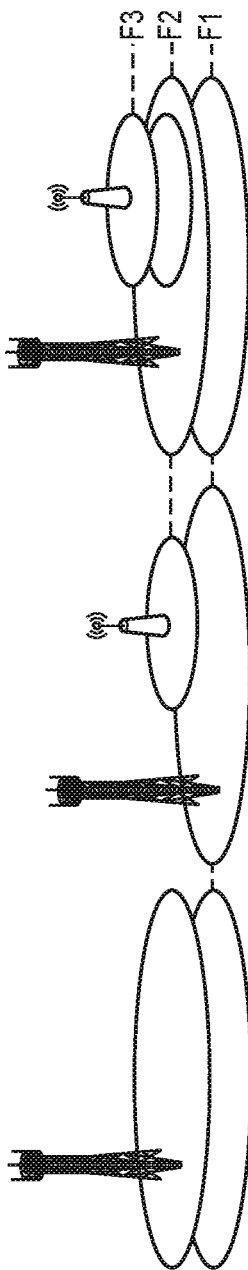
FIGS. 14A to 14C are diagrams according to an additional remark of the embodiment.

FIGS. 14A to 14C are a diagram illustrating deployment scenarios. The WID and the motivation document point out the examples of multi-carrier deployment scenario, such as homogeneous coverage among multiple carriers (inter-frequency HomoNet), heterogeneous coverage between multiple carriers (inter-frequency HetNet), and the combination of these two scenarios. Although a unified solution applicable to all three scenarios is desirable, scenario-specific solutions should also be considered if significant benefits can be realized. Therefore, any proposed solution should be evaluated based on its applicability to specific deployment scenario(s) and whether it causes degradation (e.g., ping-ponging in reselection) in the non-intended deployment scenarios.

The solutions should be applicable to at least one deployment scenario in inter-frequency HomoNet, inter-frequency HetNet or the combination of the two scenarios, and the solutions should not have negative impact on the non-intended scenarios.

(Limitation in the Existing Cell Reselection Mechanism)

The cell (re)selection parameters are provided by SIB s or dedicated signalling (RRC Connection Reject or RRC Connection Release messages) and the cell reselection procedure is performed in the UE using the parameters. Focusing on normal cell reselection (i.e., without dedicated parameters), SIB3 provides common parameters, while SIB4 provides intra-frequency specific parameters and SIB5 provides inter-frequency specific parameters. With these parameters, the UE performs frequency prioritization according to the cell reselection priority, the measurements of RSRP/RSRQ, the evaluations of the S-criterion, and the ranking of cells with the R-criterion, and then it finds out the most suitable cell to reselect and camp on.

Figure 15:
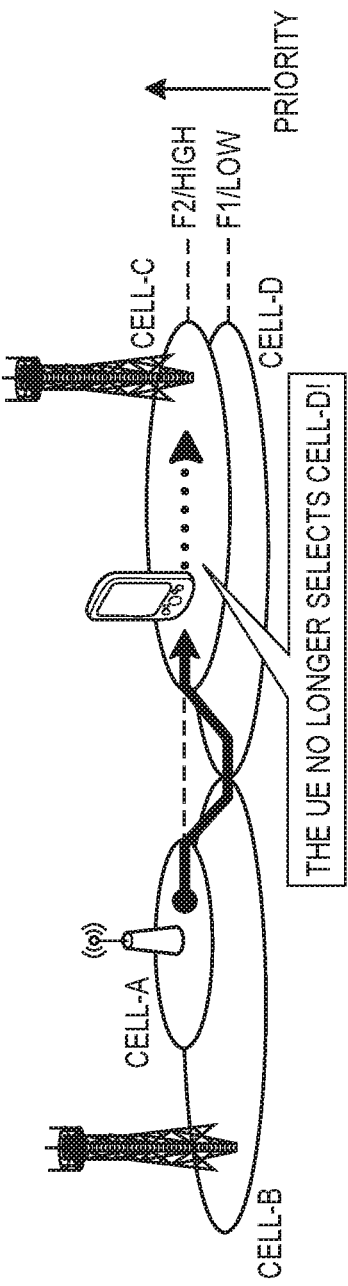
FIG. 15 is a diagram according to the additional remark of the embodiment.

In the prioritization and measurement phase, the UE may not perform intra-frequency measurement when the S-criterion of the serving cell is fulfilled. In addition, the UE may not perform inter-frequency measurement unless the reselection priority of the neighbour frequency is higher than that of the serving frequency or the S-criterion of the serving cell is not fulfilled. It is obvious that the cell resection procedure is not triggered unless the measurement is performed, even if more suitable cell is actually available. It is one of limitations in the current cell reselection procedure and causes lopsided UE distribution in some cases, e.g., "lock-on" with idle mode mobility illustrated in FIG. 15. FIG. 15 is a diagram illustrating "Lock-on" within higher priority frequency In addition, there are exceptions in the prioritization phase. The UE is allowed to deviate from the normal frequency prioritization to selection rule and select a different frequency that provides MBMS services of interest. Moreover, Rel-12 ProSe direct communication introduced a similar rule that "If the UE capable of ProSe direct communication is configured to perform ProSe direct communication and can only perform the ProSe direct communication while camping on a frequency, the UE may consider that frequency to be the highest priority". Therefore, it is likely that cells on frequencies offering MBMS and/or ProSe experience congestion more often than those that do not, if there are many UEs interested in these types of services.

Note that it is assumed that the cell reselection for inter-RAT and CSG cell is out of the scope of this work item.

RAN2 should consider how load balance may be achieved between a low priority frequency and a high priority frequency with the understanding that the UE is also allowed to prioritize a frequency based on its interest in MBMS and/or ProSe.

In the evaluation and ranking phase, both the S-criterion and the R-criterion use RSRP and RSRQ which are measured by the UE. However, it was pointed out in that RSRQ is not a sufficient metric for determining SINR since RSRQ has a narrow dynamic range and it becomes a non-linear function of SINR above 5 dB and is saturated around 10 dB. However, the throughput is kept almost linear between 0 dB and 30 dB. The limitation with RSRQ measurement is particularly troublesome for higher category UEs (e.g., smartphones) since this may degrade the achievable user throughput. Therefore, in order to maximize achievable user throughput after transitioning to RRC CONNECTED, at least the ranking process using RSRQ is no longer adequate and a new measurement metric, with a better estimate of SINR is desirable.

At least the ranking process for the higher category UEs should be based on a more accurate measurement metric than RSRQ.

Unlike smartphones, the MTC devices with lower UE category don't need too much higher SINR, since the throughput ends up hitting the limits capped by the Maximum number of DL-SCH transport block bits received within a TTI. Especially for such lower category UEs, it should be taken into consideration to avoid unnecessary power consumption due to the increased measurements using the new metric, as stated in the WID.

RAN2 should avoid additional power consumption for lower category UEs.

(Potential Issues and Challenges)

In this section, the potential issues, other than the limitations identified in the above section, are discussed.

(Potential Capacity (Static)/Cell Load (Dynamic) Awareness Distribution)

Figure 16:
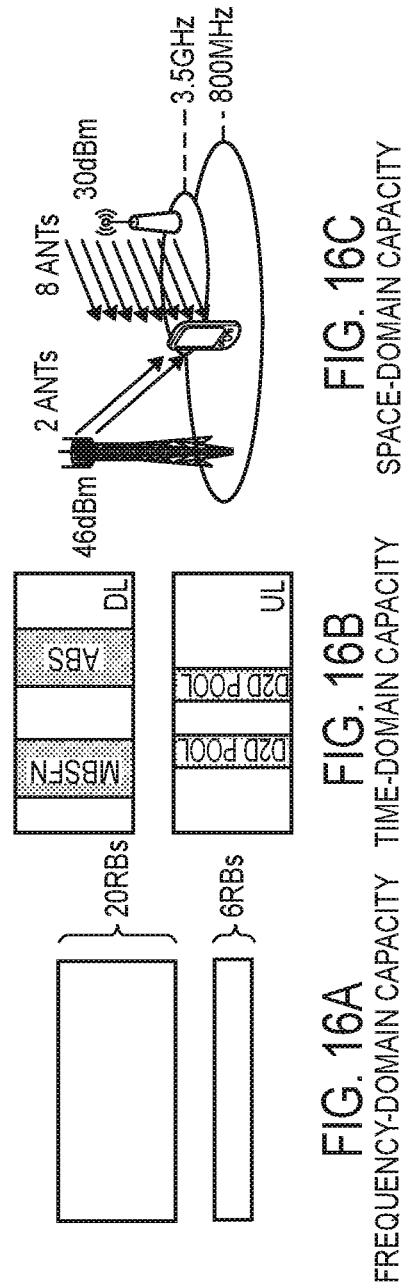
FIGS. 16A to 16C are diagrams according to the additional remark of the embodiment.

The potential capacities of frequencies/cells are different since cells have independent configuration of parameters such as bandwidth, CP length, almost blank subframes (ABS), MBSFN subframes, ProSe resource pools, number of antennas and/or cell sizes depending on transmission power of eNB and operating frequency. These can be categorized into frequency-domain, time-domain and space-domain (illustrated in FIGS. 16A to 16C). FIGS. 16A to 16C are a diagram illustrating Potential capacity and (semi-) static configurations. The potential capacity of a cell may be determined as a function of the above parameters, and since these configurations are typically (semi-) static and are already provided in SIBs, they may be acquired by IDLE UEs through UE implementation or assistance from their serving cells. Since a cell's capacity is directly related to the potential for user throughput UEs should take such cell capacity into account as part of cell reselection.

The cell reselection procedure should take into account the configurations of neighbour cells.

As intended in, more dynamic information such as current cell loads will facilitate more suitable cell reselection; however, the direct broadcast of load information is not acceptable by some operators based on previous discussions e.g., Rel-12 WLAN Interworking. As in the case for WLAN Interworking, the cell loads are implicitly provided through the configurations of RAN assistance parameters, i.e., RSRP/RSRQ thresholds. Since a cell's load is an integral part of idle mode UE distribution, it should be considered whether implicit or direct configuration of a cell's load should also be considered for optimizing cell reselection RAN2 should discuss whether it can be acceptable to provide dynamic information such as current cell load to IDLE UEs, directly or implicitly.

(Clustered UE Distribution)

In general, it is well-known that the density of users is not uniform in an area and the user tends to cluster within specific spots, e.g., in a building, on a main street, in a stadium and so on. Therefore, the distribution of UE clusters among multiple carriers within an eNB coverage area may be one of the keys to successful load distribution.

Figure 17:
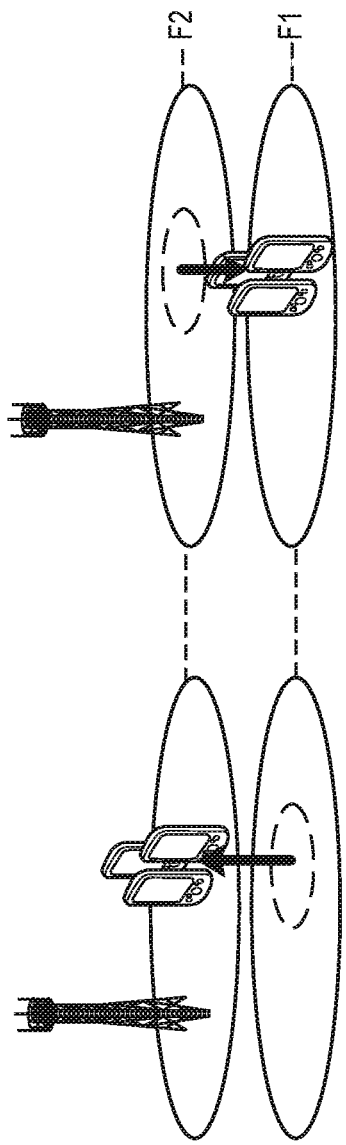
FIGS. 17A and 17B are diagrams according to the additional remark of the embodiment.

With connected mode UEs, load balancing may be resolved using existing mechanisms such as redirections or handovers. On the other hand, idle mode UEs basically applies the common configuration provided by SIBs. Assuming the clustered UEs experience similar radio conditions, i.e., RSRP and RSRQ, the current cell reselection mechanism cannot split the cluster, i.e., these UEs may reselect based on the same 5-criterion/R-criterion. So, even if cell reselection parameters are adjusted by the eNB, it simply results in "mass reselection" and load balancing among multiple carriers cannot be achieved (as illustrated in FIGS. 17A and 17B). FIGS. 17A and 17B are a diagram illustrating the mass reselection of the clustered UE. To avoid the mass reselection and achieve better load balancing, it should be possible for a group of UEs within the cluster to select cell(s) that differ from cell(s) selected by other group of UEs within the cluster. It should be further considered whether it would be beneficial for the cells to be reselected using some kind of UE-by-UE randomization scheme. Such a randomization scheme could be based on an acceptable measurement range e.g., Cell Reselection Priority and/or R-criterion, where the measurement range is under control of the eNB. Therefore, RAN2 should consider how to achieve load balance of the clustered UEs.

RAN2 should consider how to achieve load balancing of the clustered UEs among multiple carriers.

[Additional Statement 2]

(Introduction)

In the present additional statement, the two mechanisms are identified for the multi-carrier load distribution, i.e., the continuous distribution and the one-shot re-distribution, and the solutions with per-cell parameter and/or reselection probabilities are considered.

(Pre-Conditions and Post-Conditions)

Figure 18:
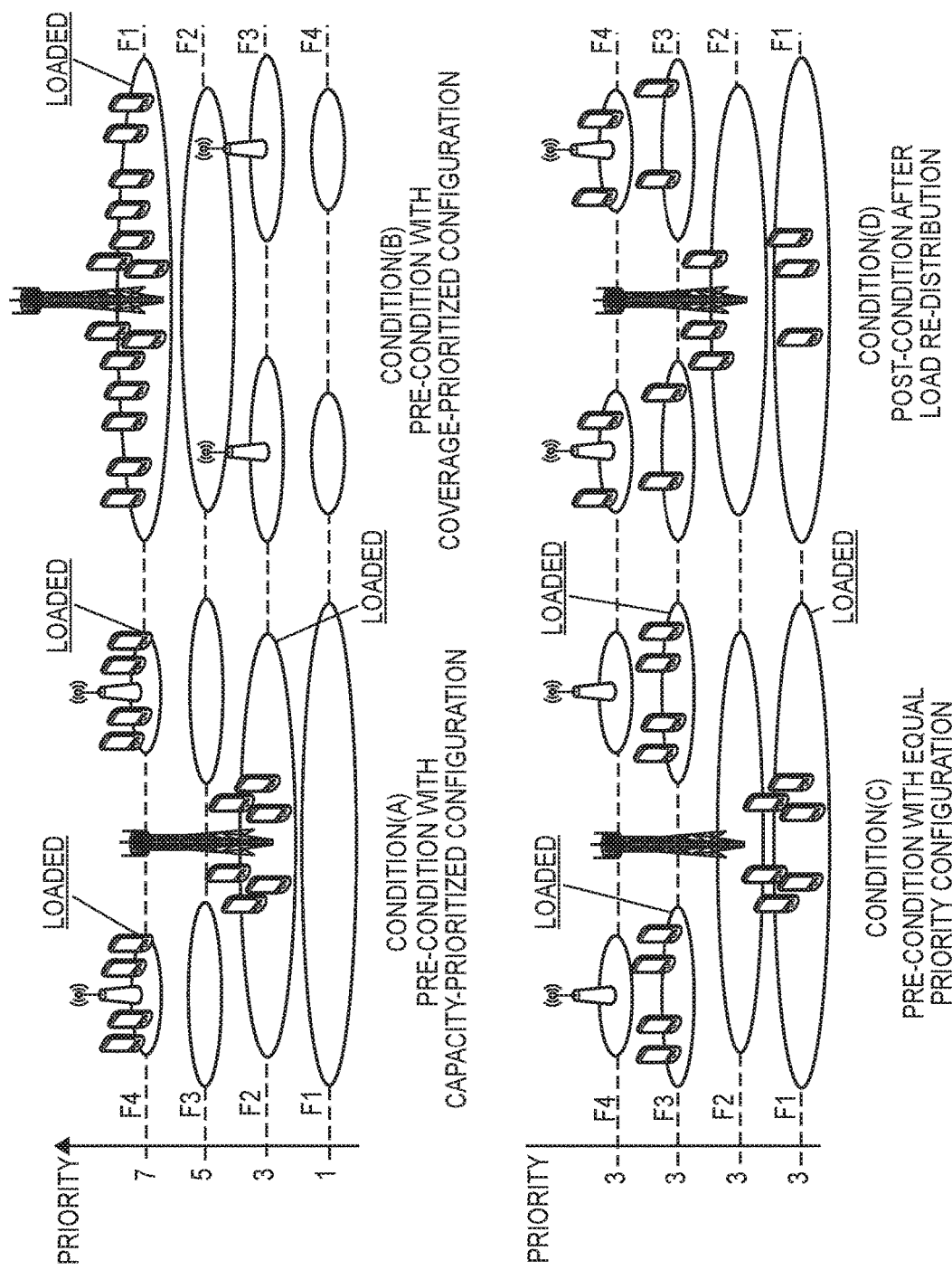
FIG. 18 is a diagram according to the additional remark of the embodiment.

Before considering the solutions, it's worth revisiting why the idle UEs may be distributed non-uniformly among multiple carriers today. FIG. 18 illustrates three possible pre-conditions, i.e., (a) to (c), and a post-condition, i.e., (d), assuming four frequency layers for the purpose of coverage and capacity. F1 is the lowest frequency (e.g., 800 MHz, thus it has larger coverage) and F4 is the highest frequency (e.g., 3.5 GHz, thus it has smaller coverage). It is noted in FIG. 18 that the condition (b) has reverse order compared to the other conditions. In the condition (a) and (b) each frequency layer has different cellReselectionPriority, while the condition (c) intends equal priority among all frequencies.

The condition (a) may be considered as a typical priority configuration, whereby the small cell layers on higher frequencies are prioritized for reselection to achieve capacity enhancements. The UEs are camped on F4 or F2 as long as the S-criteria of the cell is fulfilled, since the current specification forces the UE to perform inter-frequency measurements and cell reselection to a cell configured with higher priority frequency than the frequency of the serving cell, regardless of Squal/Srxlev of the serving cell.

The condition (b) may be considered for the coverage-prioritized configuration e.g., in Dual Connectivity capable network. This results in a worse condition than condition (a), since all UEs are camped on F1.

It should be noted that the cellReselectionPriority may cause load imbalance of idle UEs beyond just two frequency layers, i.e., imbalance between F1 and F2, or between F3 and F4 in FIG. 18. Although the current mechanism allows configuring different ThreshX, HighQ/ThreshX, HighP for each frequency priority, it cannot solve the distribution issue since a change of these parameters cause mass reselection and agreement "Solution should be able to move fraction of the UEs from one cell to another cell" above cannot be met. Even if the cell specific priority is provided in Rel-13, the prioritized cell may experience higher load due to the mass reselection (also known as "surge of UEs" or "closely located UEs problem") assuming the cells offers the same capacity (e.g., the same bandwidth), although the solution may work well in a specific scenario, e.g., reselection to small cells on co-channel HetNet layer.

The cell reselection prioritization itself may cause load imbalance among multiple frequencies, regardless of whether it's on a frequency layer or a cell layer.

Condition (c) configures all frequency layers with the same priority, i.e., equal priority inter-frequency case. With equal priority inter-frequency, the cell ranking is performed by R-criteria and the UE should select a cell with the best RSRP, taking into account of the Qoffset to compensate for different pathloss due to different frequencies. As in the case for conditions (a) and (b), the current mechanism also cannot meet the agreement that Solution should be able to move fraction of the UEs from one cell to another cell. However, the current cell ranking mechanism is useful in solving the issue "Maximize user throughput and network capacity (in terms of system throughput, connection establishment, RA, (inter-frequency) mobility related signalling) for UEs in CONNECTED", since the UE can reselect the cell that offers the best radio condition, although it only relies on RSRP.

The equal frequency priority with cell ranking has a potential to maximize user throughput and network capacity.

The condition (d) is an example of a desirable post-condition, wherein the UEs are camped on each frequency/cell uniformly and all cells are not heavy-loaded. The post-condition in (d) is consistent with the agreement above that a Solution should be able to move fraction of the UEs from one cell to another cell which may be using e.g. per-cell parameter and/or reselection probabilities.

The most significant benefit of the enhanced continuous distribution mechanism such as CSP is to allow the cells to remain lightly-loaded, i.e., the network's UE distribution may be maintained and used to prevent the pre-conditions (a)-(c) in FIG. 18 from occurring. On the other hand, one of the main drawbacks with the enhanced continuous distribution is the impact to the power consumption of IDLE UEs even though the network does not suffer from any over-load conditions, as suggested. If further solutions such as the cell-specific priority with probability and/or with random threshold offset are introduced, the UE power consumption may be substantially increased. Additionally, operators may face challenges to modify their existing network reselection mechanism even if the operator does not suffer from the necessity redistribute idle UEs.

The enhanced continuous distribution mechanism is expected to have more impacts on the UE power consumption and the configurations of the existing network deployments.

If an enhanced continuous distribution is introduced to fulfil the agreement that 4) It should be possible to control the load distribution among individual cells rather than only on a carrier level (for example the scenario that the macro cell in a co-channel Het-Net deployment and/or certain small cells on another carrier may be overloaded), it should not require drastic changes to network deployment, but simply aim to provide more flexibilities based on the existing mechanism.

Proposal 1: The existing reselection mechanism or the small enhancement may work well, other than some heavily loaded network deployment scenarios.

Even if the enhanced continuous distribution could statistically maintain the network under light load, the traffic demands, which is correlated with the density of IDLE UEs in an area, could vary significantly e.g., at sports events, during commuting hours, within a shopping mall in weekends or under emergency conditions. In such a heavy-loaded condition, there should be a means for the network to return to a more balanced loaded condition as soon as possible, by means of a one-shot re-distribution mechanism. Once the one-shot re-distribution mechanism allows the network to return to a normal load condition, the enhanced continuous distribution may be activated again to maintain the network under the balanced load condition.

The one-shot re-distribution mechanism may be useful under heavily loaded network due to sudden surge in traffic demand.

Since the one-shot re-distribution mechanisms is mainly used for cases of heavily loaded network due to sudden surge in traffic demand, it may be applied independently of the existing mechanisms and thus it will not conflict with the current network strategies. Furthermore, the impacts on UE power consumption would be reduced since the power-consumed event is performed only once. The network may initiate the one-shot re-distribution when it experiences higher load in multiple cells/frequencies, i.e., the preconditions (a)~(c) in FIG. 18. In addition, the word "re-distribute" within agreement 1) above is consistent with the need for a one-shot re-distribution mechanism, since the continuous distribution or enhanced continuous distribution should not be depicted by as a means to "re-distribute" the UEs.

Proposal 2: RAN2 should consider the one-shot re-distribution mechanism as an independent mechanism from the continuous distribution or enhanced continuous distribution mechanism.

(Enhanced Continuous Distribution Mechanism)

For the extreme case when the network is lightly loaded and there is only one UE camped on the macro cell, there is no reason for the UE to stay on the macro cell layer when a small cell fulfils a threshold for the UE. In this case, either the prioritization mechanisms, or the existing frequency priority or the additional cell-specific priority (CSP), still works well. With the CSP which was already a baseline, the network is offered more flexibility in its configuration with minimum impacts on the existing rules for the priority handling. This is similar approach with the agreements for IncMon to Extend the number of cell reselection priorities to reduce number of reselections between equal priority carriers, from the configuration flexibility point of view. Therefore, the enhanced continuous distribution based on the existing cell reselection mechanism should only have an additional means to configure priorities on a cell basis with CSP, although it should be noted that it potentially has a drawback which may lead to load imbalance when the number of UEs increases. In this case another solution may be needed, i.e., the one-shot re-distribution mechanism.

Proposal 3: RAN2 should conclude for lightly/medium loaded network that no additional mechanism is necessary in the existing cell reselection mechanism, except for optional provisioning of the cell-specific priority and the already agreed extended reselection priorities.

(Benefit of One-Shot Re-Distribution Mechanism)

Trigger for re-distribution

The trigger for re-distribution, i.e., when the UE initiates/continues the (special) cell reselection procedure, may be based on one of the following options.

Option 1: When the network broadcasts parameters for the re-distribution;

Option 1-a: When the network provides the list of cell-specific priorities;

It's assumed as the trigger for the cell-specific priority with randomization as well as CSP itself. The UE should continue the cell reselection procedure, including inter-frequency measurements, as long as the cell-specific priority provided is higher than the priority of serving cell, as it is today.

Option 1-b: When the network provides the list of cell-specific probabilities;

This option assumes the trigger for reselection is based on the cell-specific priority with probability (CSPP). The UE should generate a random value and perform the cell reselection procedure when the random value is over the cell-specific priority provided.

Option 1-c: When the network provides the maximum value of reselections;

This option assumes the counter-based scheme discussed. The UE should count the number of cell reselection performed and ignore the higher-prioritized cell when the count is over the maximum value broadcasted by the serving cell.

Option 1-d: When the network updates the parameters;

It's assumed the trigger is implied by the updated parameters in SIB or the paging. The UE should apply the updated parameters and perform the cell reselection procedure.

Option 2: When the network provides an explicit request;

This option assumes a pure trigger for re-distribution. The UE applies the (special) parameters and perform the cell reselection procedure only once upon reception of the request. The request may require 1-bit signalling in either a SIB or in the paging message as an application. The UE may only monitor the request since the parameter for the (special) cell reselection can be broadcasted in advance.

Option 3: When the serving cell configures dedicated parameters over RRC Connection Release;

It is for the specific case the UE transitions from RRC Connected to Idle and the RRC Connection Release may have the additional cell-specific offsets, the extra grouping, and/or the existing dedicated priority.

Options 1-x are based on typical mechanisms for reselection control, but these have some drawbacks. With Options 1-x, the UE is forced to apply additional continuous inter-frequency measurements during the parameters are provided, e.g., if the cell prioritized by Option 1-a is not on the frequencies prioritized by the existing cellReselectionPriority. It results in additional UE power consumption and it should be avoided. Also, it is not crystal clear at which points in time the UE should re-calculate the probability.

Additionally, Options 1-x may require the UE to monitor continuously to check whether the parameters are updated, or whether the network decided to initiate a (special) cell reselection procedure. Option 2 is a simple solution for the one-shot re-distribution mechanism, although it does require 1-bit signalling to inform UE of the activation of this procedure. Option 3 may also be an nice way if the solution only relies on the dedicated signalling, but it cannot fulfil the requirement to Maximize user throughput and network capacity (in terms of system throughput, connection establishment, RA, (inter-frequency) mobility related signalling) for UEs in CONNECTED. Therefore, Option 2 is the preferred solution for the trigger for re-distribution.

Proposal 4: The one-shot re-distribution should be triggered by an explicit request indication broadcasted by the serving cell.

Proposal 5: If the Proposal 4 is agreeable, RAN2 should discuss whether the indication is provided in SIB or the paging.

[Additional Statement 3]

(Introduction)

The present additional statement considers the solutions with per-cell parameter and/or reselection probabilities for the one-shot re-distribution mechanism.

(One-Shot Re-Distribution Mechanism)

The one-shot re-distribution obviously needs a trigger for the initiation of special cell reselection procedure. The following solutions for cell reselection by fraction of UEs are considered after the triggering.

(Cell Reselection by Fraction of UEs)

It is one of big challenges in this WI that Solution should be able to move fraction of the UEs from one cell to another cell. The possible solutions were suggested as follows.

Assuming the cell-specific priority list is provisioned in advance and the priority has to be higher than that of the serving cell.

Option 1-a: Cell-specific priority with random threshold offset [4]

If it could be applicable to the one-shot re-distribution, when a trigger happens the UE generates the random value for a cell of higher priority frequency, and the UE reselects the cell if Squal>Thresh'X, HighQ or Srxlev>Thresh'X, HighP is fulfilled, wherein Thresh'X, HighQ or Thresh'X, HighP is applied with the randomized offset (i.e., Thresh'X, HighQ=ThreshX, HighQ+offset x/cell*random).

One drawback with this approach is that the Thresh'X may not ensure good user throughput with wider/negative range of the randomized offset and that only UEs in cell-edge can move to the other cell with narrower range of the randomized offset.

Option 1-b: Cell-specific priority with probability (CSPP)

If it could be applicable to the one-shot re-distribution, when a trigger happens the UE generates the random value for the cell prioritized and reselect it if the random value exceeds the probability provided.

One drawback may be that the cell reselected can only ensure S-criteria, not for ThreshX nor R-criteria. It may result in the degradation of user throughput when the UE transitions to RRC Connected.

Option 1-c: Counter-Based Scheme with Number of Cell Reselection

If it could be applicable to the one-shot re-distribution, whereby the UE keeps track of the number of reselections and when a trigger happens, the UE decides whether the cell reselection priority should be applied or ignored based on the counter value.

Independent of the priority handling, i.e., not only for higher priority cells.

Option 2-a: Ranking Randomization within a Specified Range

This option is a kind of extension on Option 1-b (from the randomization point of view) and essentially similar approach with Option 1-a (from the range concept perspective), but Option 2-a focuses on the enhancements in the ranking process. With the specified range, the degradation of user throughput may be limited and is under network control. The details of range are FFS, e.g., the unit may be [dB].

Option 2-b: Ranking-Specific Probability

This option is basically similar approach with Option 2-a, but Option 2-b focuses on the enhancements in the ranking process with probabilities similar to Option 1-b. Since the probability is corresponding to each rank, the UE is allowed to reselect the cell with better rank order and probabilities.

All options could move fraction of the UEs from one cell to another cell. The most significant difference between Options 1-x and Options 2-x is whether a cell specific priority list (CSP) is needed or not. Since Options 1-x would only take the priority handling in the reselection consideration, the reselected cell may not be (sub-)optimal for each UE from the radio quality point of view, i.e., the new cell may only fulfil the S-criterion even if some cells offering better radio quality are available around the UE. In addition, Options 1-x cannot consider equal priority frequencies/cells since these options rely on the configuration with higher priority frequencies/cells.

Options 2-x may be based on the existing ranking process which ensured a cell reselection to a better cell as the result of comparison to cells the UE detects. So, Options 2-x can potentially Maximize user throughput and network capacity (in terms of system throughput, connection establishment, RA, (inter-frequency) mobility related signalling) for UEs in CONNECTED. Therefore, the one-shot re-distribution should adapt the ranking process.

Proposal 1: The ranking process should be enhanced for the one-shot re-distribution.

(Target Cells/Frequencies for Enhanced Ranking Process)

If the Proposal 1 is agreeable, the issue is which cell/frequency should be considered in the enhanced ranking process. In the current specification, the evaluation with the R-criteria applies for intra-frequency and equal priority inter-frequency cells. So, to minimize changes in the specification, the target cells/frequencies for the enhanced ranking process should also be considered under equal priority cells/frequencies.

Proposal 2: The target cells/frequencies in the one-shot re-distribution should only be applicable under equal priority.

If the Proposal 2 is acceptable, it is necessary to determine how the equal priority target cells/frequencies are provided to the UE for the one-shot distribution. The following alternatives could be considered.

Alt.1: The serving cell provides the cell/frequency list explicitly.

The UE simply consider the cells/frequencies provided in the list in the enhanced ranking process.

Alt.2: The serving cell provides the cell/frequency implicitly.

It could use the extended cell reselection priority. For each cell/frequency configured with the extended cell reselection priority, the UE determines these cells/frequencies for enhanced ranking process. It is FFS whether the UE should also take the legacy cell reselection priority into account or not, while some examples are suggested on Table 1.

From the perspective of signalling overhead, Alt.2 is better than Alt.1. However, Alt.2 will need at least one more rule to determine the target cells/frequencies, e.g., whether the prioritized cells/frequencies in the legacy cell reselection priority should still be prioritized. Although pros and cons can be seen in both alternatives, Alt.2 is slightly preferred solution.

Proposal 3: RAN2 should decide if the cells/frequencies configured with the extended cell reselection priority should be considered as equal priority in the one-shot re-distribution.

Table 1 shows examples of implicit target cells/frequencies provisioning with Alt.2

TABLE 1

| Legacy priority i.e., cellReselectionPriority [10] | Extended priority e.g., CellReselSubPriority-r12 [11] | Alt.2-1 | Alt.2-2 | Alt.2-3 | Alt.2-4 |
|---|---|---|---|---|---|
| F1 | 7 | 3 | Target | Target | Target | Target |
| F2 | 7 | 3 | Target | Target | Target | Target |
| F3 | 7 | 1 | Target |  | Target |  |
| F4 | 7 | (not provided) |  |  |  |  |
| F5 | 3 | 3 |  |  | Target | Target |
| F6 | 3 | 1 |  |  | Target |  |
| F7 | 3 | (not provided) |  |  |  |  |

Note:
The serving cell may be legacy priority 5, and the target cells/frequencies are configured.
Alt.2-1: a (e.g., higher) legacy priority and any extended priority are used.
Alt.2-2: a (e.g., higher) legacy priority and a (e.g., higher) extended priority are used.
Alt.2-3: any extended priority, regardless of the legacy priority is used.
Alt.2-4: a (e.g., higher) extended priority, regardless of the legacy priority is used.

(Additional Considerations)
Further Considerations for Randomization

It was pointed out that the probability-based scheme has some concern on the testability and/or controllability of the reselection by the network. Thus, the counter-based scheme was suggested as an alternative to the probabilistic-based scheme. However, if the probability-based scheme is really problematic, it could also be considered whether the randomization may be based on the UE_ID (or the IMSI) similar to the existing paging frame/occasion determination. For example of IMSI, the UE could perform the (special) cell reselection procedure if (IMSI mod Np)=Nr is fulfilled, wherein Np and Nr configured based on the expected probability and fairness among UEs. If Np and Nr are configured with 10 and 0 respectively, the probability fulfilling the formula is 10%. If the IMSIs are assumed adequately randomized among UEs within a cell, the network may control the probability, while the UE testability would be much simpler.

Proposal 4: If the probability-based scheme is not preferred, the IMSI-based randomization should be one of potential methods instead.

Possibility of RSRQ/SINR-Based Ranking Process

The current R-criteria only consider RSRP, thus any radio quality are not taken into account. If only received power is evaluated, it could ensure the optimal throughput in homogeneous network with macro cells. However, today it cannot be true with HetNet deployments, e.g., the small cell located near a macro cell may offer better RSRP but worse RSRQ than a cell on the frequency layer with small cell only. To maximize the user throughput and network capacity when the UE transitions to Connected, it's worth revisiting the R-criteria with RSRQ or SINR. If IDLE UEs uses a more accurate indication of signal quality than what is used today, it would potentially meet the requirement to Maximize user throughput and network capacity (in terms of system throughput, connection establishment, RA, (inter-frequency) mobility related signalling) for UEs in CONNECTED.

Proposal 5: RAN2 should consider whether the R-criteria should be revisited using a different signal quality criteria considering HetNet deployments.

[Additional Statement 4]
(Introduction)

The merged solution for Continuous Re-distribution Scheme (CRS) and One Shot Scheme (OSS) was proposed and technically endorsed for idle mode distribution. The merged solution reuses overall re-distribution mechanism of the harmonized solution for CRS with IMSI-based re-distribution.

In the present additional statement, the merged solution is verified from the OSS's perspective along with one possible optimization to reduce NW/UE complexity.

(Merged Solution with the OSS Option)

Two scenarios were discussed, i.e., long term unbalanced distribution (Scenario 1) and short term unbalanced distribution (Scenario 2). It was identified that OSS is useful especially for Scenario 2. The following agreements were reached.

Agreements

1. Use followings as the baseline of OSS:

Paging may contain a simple reprioritization request to instruct the UE/UEs currently used/prioritized carrier should be temporarily assigned (with a timer) the lowest priority.

2. The solution in R2-154729 as the baseline of CRS. But how to select UEs for the portion of moving to another layer is still FFS.

3. Both CRS and OSS solution should be introduced for different scenarios.

4. Both details of the two solutions should be further identified.

Upon further offline discussions, it was agreed that agreements 3 and 4, can be combined into a merged solution incorporating both the requirements for the OSS solution (agreement 1) and the CRS solution (agreement 2). The merged solution works very well especially under Scenario 1 or if both scenarios, i.e., Scenario 1 and Scenario 2 are needed in succession.

Observation 1: The merged CRS and OSS solution is optimized for the necessity to support Scenario 1 or if both Scenario 1 and Scenario 2 are needed in succession.

On the other hand, if the operator only needs to support Scenario 2 at a given time, it may be assumed that only OSS is needed. According to the procedure of the merged solution, the OSS operation is achieved with the following five steps.

(1) SI update to provide the redistribution parameters with the option to trigger OSS applicable.

(2) UE acquires the redistribution parameters in SIB3 and SIB5.

(3) Selective UEs that receive the OSS paging message trigger/apply the redistribution parameters, (4) UE performs the redistribution evaluation/reselection. And, (5) SI update at the next modification boundary to remove the redistribution parameters and apply the legacy parameters.

It above procedure does not capture the intention of agreement 1 based on the proposed OSS solutions, which requires only two simple steps as follows.

a) OSS is triggered for the UE upon receiving the OSS paging message.

b) UE performs the redistribution evaluation/reselection based on deprioritization of the serving cell/frequency.

Considering the load redistribution is often needed under the congested case, it's would be a disadvantage to tolerate the additional signalling overhead required of the merged solution.

Observation 2: The merged CRS and OSS solution requires excessive steps and signalling overhead if only the OSS operation is needed.

In addition, the SI update requires that all UEs re-acquire the updated system information, regardless of whether the UEs are later triggered by the OSS paging message i.e., the updated system information is usefulness for those UEs which are not targeted for the OSS. It will result in extra UE power consumption which could be avoided if agreement 1 were realized through the two steps (e.g., steps a and b above) since only a fraction of UEs are triggered for OSS. So, the merged solution should also be optimized for the case when only Scenario 2 is needed.

Observation 3: If only OSS operation is needed, the merged solution unnecessarily forces all the UEs to update SI resulting with increased UE power consumptions.

Proposal 1: The merged CRS and OSS solution should be optimized also for Scenario 2, i.e., OSS-only operation should be possible with two steps and without SI update.

(Possible Optimization for OSS-Only Operation)

If Proposal 1 is acceptable, it could be straight forward to adopt the agreement 1 that "Paging may contain a simple reprioritization request to instruct the UE/UEs currently used/prioritized carrier should be temporarily assigned (with a timer) the lowest priority", into the merged solution. Since the merged solution already has the OSS paging message and the timer, the issue is how "the UE/UEs currently used/prioritized carrier should be temporarily assigned [ . . . ] the lowest priority".

According to the merged solution, the redistribution parameters are optional. It is assumed that when the parameters are not provided in SIB3/5, the UE performs the legacy cell reselection procedure (regardless of the setting of OSS applicable), wherein the merged solution assumes the SI does not include the optional redistribution parameters as shown in Table 2.

TABLE 2

| | | OSS applicable [1] | |
| --- | --- | --- | --- |
| | | 0 (OFF) | 1 (ON) |
| Redistribution parameters (optional) i.e., redistributionFactor/ redistributionTimer and interFreqNeighCellList2 [1] | Not available | (Legacy cell reselection) Possible target for OSS optimization | (Legacy cell reselection) Possible target for OSS optimization |
| | Available | CRS | OSS with paging trigger |

Observation 4: The UE performs the legacy cell reselection procedure when the redistribution parameters are not provided in SIB3/5.

During the legacy cell reselection procedure, i.e., when the optional redistribution parameters are not provided (as highlighted in yellow in Table 1), the UE is still able to receive the paging message, although the UE is not expected to perform OSS without the SIB updates in the merged solution. If this kind of OSS paging message is allowed, the simplest optimization should be that the UE just considers the current cell/frequency as the lowest priority and performs cell reselection according to the legacy procedure. To align with the redistribution evaluation in the merged solution, it can be rephrased that the UE considers all neighbour cells/frequencies as having higher priority than the serving cell/frequency.

This optimization will minimize the signalling overhead compared to the current OSS operation with the merged solution, i.e., no SI update and no broadcast of the redistribution parameters. Regarding the additional power consumption, it affects only on a fraction of UEs which are paged, i.e., the rest of UEs do not suffer from any power consumption for the OSS operation. Also, the impacts on the merged solution and/or the legacy specification are quite small. Therefore, RAN2 should enhance the merged solution with this "add-on" optimization.

Note that if the optional redistribution parameters are provided and OSS applicable is set to "1", the UE should continue to follow the procedure in the merged solution without the optimization.

Proposal 2: If the OSS paging message is received and the redistribution parameters are not provided in SIB (regardless of OSS applicable bit), the UE should perform the legacy cell reselection procedure with the exception that prioritization of all neighbour cells/frequencies will be higher than that of the serving cell/frequency.

(Annex: Potential Change for the OSS Optimization)

The potential change in the specification for the OSS optimization is as follows.

Start of Change 5.2.4: Cell Reselection Evaluation Process 5.2.4.1: Reselection Priorities Handling Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signalling, the UE shall ignore all the priorities provided in system information. If UE is in camped on any cell state, UE shall only apply the priorities provided by system information from current cell, and the UE preserves priorities provided by dedicated signalling and deprioritisationReq received in RRCConnectionReject unless specified otherwise. When the UE in camped normally state, has only dedicated priorities other than for the current frequency, the UE shall consider the current frequency to be the lowest priority frequency (i.e. lower than the eight network configured values). Also if the UE receives an OSS paging message, and if the System Information does not contain any redistribution parameters (i.e. the field redistributionFactor is absent for all frequencies/cells) or the UE only has dedicated priorities other than for the current frequency, the UE shall consider the current frequency/cell to be the lowest priority frequency/cell. While the UE is camped on a suitable CSG cell, the UE shall always consider the current frequency to be the highest priority frequency (i.e. higher than the eight network configured values), irrespective of any other priority value allocated to this frequency. If the UE capable of sidelink communication is configured to perform sidelink communication and can only perform the sidelink communication while camping on a frequency, the UE may consider that frequency to be the highest priority.

NOTE: The prioritization among the frequencies which UE considers to be the highest priority frequency is left to UE implementation.

[Additional Statement 5]

(Introduction)

RAN2 agreed the direction of solution for the multi-carrier load re-distribution.

Agreements

1. Following Requirements can't be met by existing cell reselection scheme.

1) It should be possible under network control to re-distribute among the different carriers a fraction of users currently camped on these carriers.

4) It should be possible to control the load distribution among individual cells rather than only on a carrier level (for example the scenario that the macro cell in a co-channel Het-Net deployment and/or certain small cells on another carrier may be overloaded)

2. Solution should be able to move fraction of the UEs from one cell to another cell.

3. To focus on solutions using e.g. per-cell parameter and/or reselection probabilities from RAN2 #91 meeting.

RAN2 further agreed to "Adopt cell specific priorities as baseline". This could fulfil the requirement 4) above. However, the solutions to re-distribute a fraction of users, i.e., the requirement 1), could not be converged within the last meeting.

In the present additional statement, a possible compromise solution for the requirement 1) is discussed.

(Randomization Mechanisms)

Current Solutions

To fulfil the requirement 4), especially to re-distribute a fraction of users, it's considered that some sort of randomization mechanism would be useful since the existing priority itself cannot avoid the mass-reselection. With regards to the randomization mechanisms, possible solutions have been already proposed, such as the randomized threshold offset, CSPP, CSPP with best-cell and the ranking randomization. They all share the commonality that the UE generates the random value to determine which UE should perform the enhanced cell reselection, thus all these mechanisms may be considered as UE-based mechanisms. The advantage of UE-based mechanisms would allow the Idle UEs to move to a different frequency according to a probability, all the time. One drawback may be that it's unclear when the UE should stop the load re-distribution process, which may result in unstable probability due to multiple triggering of the reselection procedure.

That is, UE-based mechanism with random value, can re-distribute Idle UEs, while it may result in unstable probability due to multiple triggering of the reselection procedure.

On the other hand, the solution using dedicated signalling is also proposed, which offers tighter network control, thus it could be considered as NW-based mechanism, although it may "be insufficient to address all Idle mode Load Balancing needs".

NW-based mechanism, i.e., with dedicated signalling, ensures tighter network control, while it's insufficient to re-distribute all Idle UEs.

RAN2 has four alternatives to move forward as follows;

Alt.1: Adopt only the UE-based solution.

Alt.2: Adopt only the NW-based solution.

Alt.3: Adopt both NW-based and UE-based solutions in Rel-13.

Alt.4: Consider an alternative solution consisting of benefits from both UE-based and NW-based solutions.

With regards to Alt.1 and Alt.2, although both UE-based and NW-based mechanisms can potentially resolve the issues in requirement 4), each of the solutions have their benefits and drawbacks, as mentioned in Observation 1and Observation 2 respectively. Regarding Alt.3, the different suboptimal solutions will be specified to resolve the one issue. It causes more standardization efforts and also brings more complexity from the UE and NW implementation point of view, which should be avoided as much as possible. With Alt.4, RAN2 is potentially able to converge to a single solution based on the ideas, issues and preferences discussed in prior meetings, with minimal specification impact.

RAN2 should consider a compromise solution to re-distribute a fraction of UEs among different carrier under network control, to take advantage of the benefits of current solutions.

(Compromise Solution: NW-Based Randomization of Idle UEs)

Randomization Scheme

Figure 19:
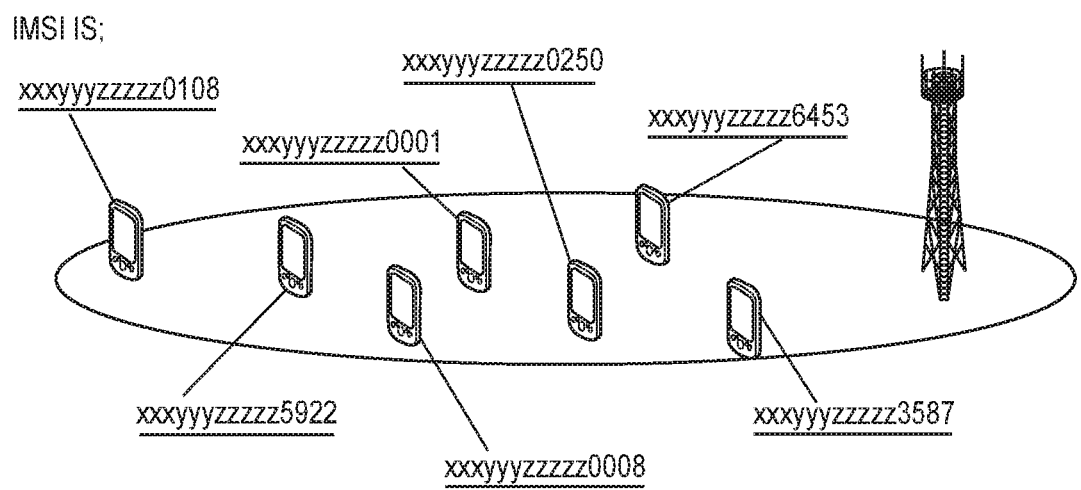
FIG. 19 is a diagram according to the additional remark of the embodiment.

The randomization scheme should fulfil the requirement "to re-distribute [ . . . ] a fraction of users currently camped on these carriers". UE-based randomization relies on random value generated by the UE, which allows a fraction of Idle UEs to move to another frequency with a probability at any time. So, it's worth considering whether NW-based approach can achieve similar effect. Considering many UEs are located in an area, it could be assumed that the IMSIs of UEs are also randomly distributed as illustrated in FIG. 19. It would be already seen as a random value.

Assuming IMSIs are sufficiently randomized in any given geographical area, NW-based approach could perform randomization by means of RRC signalling. The two possibilities could be considered as follows.

Option 1: NW-Based Randomization with Paging Occasions

→ It was suggested to use the paging message as a trigger of load re-distribution. The paging message could be essentially the signalling towards specific/deterministic UEs, which are equal to "a fraction of users". Since the paging frame/occasion of each UE is determined by IMSI, the eNB can control the probability that UEs move to another frequency, e.g., if the eNB pages at 1/10 occasions of all paging occasions in the default DRX cycle then 10% of UEs are triggered for load re-distribution.

→ It is necessary to add an indication into the paging message to notify the UEs of the load re-distribution. But it would be 1-bit.

Option 2: NW-Based Randomization with Modulo Calculation

→ It could be also possible to determine specific/deterministic UEs with modulo calculation of IMSI. For example, the UE could perform the load re-distribution if "(IMSI mod Np)=Nr" is fulfilled, wherein Np and Nr configured based on the expected probability and fairness among UEs. If Np and Nr are configured with 10 and 0 respectively, the probability of fulfilling the equation is 10%.

→ The parameters, i.e., Np and Nr in the example, may be provided in the broadcast signalling.

In comparison with the UE-based mechanisms, these options have the same advantage in terms of controlling Idle UEs and use of random value and/or probability. The most significant benefit with the options is that it is no longer necessary consider when the UE should stop the load re-distribution process since the NW selects specific/deterministic set of UEs as a fraction of all UEs, whereby once the re-distribution is performed the UEs are no longer on the serving frequency. Although these NW-based options can be readily seen as applicable to a one-shot mechanism, they may also be extended to a continuous distribution mechanism.

Note that these options can work even if all UEs (all IMSIs) are not on a frequency/cell as normally assumed.

Proposal 2: It is beneficial for the network to select a fraction of users based on UE's IMSI for load re-distribution to achieve randomization for targeted UEs.

Comparing the options, the accuracy of control is similar but the signalling overhead and impacts on the existing specification would increase with Option 2. In addition, Option 2 may need SI Update to trigger the load re-distribution. So, Option 1 with the paging message is preferable.

Proposal 3: When the UE receives an indication in the paging message, the UE should perform the load re-distribution process.

(Load Re-Distribution Process)

The load re-distribution process should fulfil the requirement "to re-distribute among the different carriers". The simplest way could be that the UE considers the current frequency as the lowest priority only when the load re-distribution is triggered. Since the lowest priority frequency is specified as "lower than the eight network configured values", the UE shall move to the other frequency as long as there is a cell fulfilling the criteria, e.g., Squal>ThreshX, HighQ. It makes sense because it could be assumed the serving cell currently suffers from heavy load.

Proposal 4: The UE should consider the current frequency to be the lowest priority frequency during the load re-distribution process after the trigger.

It was also suggested that as a requirement, it's also important to maximize user throughput when the UE transitions to Connected. But it could be solved by the continuous distribution, i.e., the existing cell reselection, without any enhancements in this WI. For example, after the UE moves to the second frequency due to the load re-distribution, if there is the same priority frequency on the third frequency layer with the second frequency currently the UE camped on then the UE should perform the equal priority inter-frequency reselection and select the best cell according to the R-criteria as it is today. So, it could be considered that the requirement to maximize user throughput is solved by the network deployment with the existing equal priority reselection.

FIG. 20 is a diagram illustrating simple example with Option 2 and combination approach with the existing mechanism.

Proposal 5: It should be assumed that the network deployment could ensure better user throughput, after the load re-distribution.

(One-Shot Mechanism and Continuous Distribution)

It was discussed whether the one-shot mechanism is beneficial, although it had been considered the enhancements in this WI was applicable continuously. The one-shot mechanism works well to normalize the network load which is suddenly increased by e.g., the start of an eMBMS session or the some special hours such as a sports event. However, it may be not sufficient to have only the one-shot mechanism. Considering continuous mobility of idle UEs, it would be true that the load imbalance cannot avoid only with the existing cell reselection mechanism in some deployment scenarios, e.g., whereby the UEs moving into the area always reselects a specific layer depending on RSRP, i.e., pathloss difference between two macro cell layers, even if the network offers the macro cell layers with equal priority. So, it's worth considering whether the solution can be applicable to both the one-shot mechanism and the continuous distribution.

The continuous distribution may be still necessary in some deployment scenarios.

If the proposals in this additional statement are agreeable, the compromise solution can be applied not only for one-shot re-distribution but also for continuous distribution. If the eNB continuously triggers the load re-distribution in a paging occasion, it could be actually the continuous distribution, i.e., a probability of UEs in an area (among all frequencies) are moved from the cell triggering the re-distribution. The compromise solution can ensure stable probability even if the load re-distribution is triggered twice or more. So, if RAN2 aims a single solution for different scenarios, it should focus on the one-shot mechanism which can be also applicable to the continuous distribution.

RAN2 should aim a single solution which offers the flexibility to be applicable to both use cases of the continuous distribution and the one-shot mechanism.

The invention claimed is:

1. A user equipment comprising:
   a memory; and
   one or more processors operatively coupled to the memory, the one or more processors configured to:
      receive from a current serving cell of the user equipment, system information indicating frequencies different from a frequency of the current serving cell;
      receive a paging message from the current serving cell of the user equipment the paging message being different from the system information;
      determine whether the received paging message includes an indication triggering a frequency redistribution procedure in which the user equipment reselects a target cell belonging to a frequency included in the frequencies indicated by the system information, to be used as a serving cell; and
   perform the frequency redistribution procedure in response to determination that the received paging message includes the indication.

2. The user equipment according to claim 1, wherein the paging message is transmitted from the current serving cell at a DRX cycle assigned to the user equipment.

3. A method performed by a user equipment, comprising:
   receiving from a current serving cell of the user equipment, system information indicating frequencies different from a frequency of the current serving cell;
   receiving a paging message from the current serving cell of the user equipment, the paging message being different from the system information;
   determining whether the received paging message includes an indication triggering a frequency redistribution procedure in which the user equipment reselects a target cell belonging to a frequency included in the frequencies indicated by the system information, to be used as a serving cell; and
   performing the frequency redistribution procedure in response to determination that the received paging message includes the indication.

4. A chipset provided in a user equipment, comprising:
a memory; and
one or more processors operatively coupled to the memory, the one or more processors configured to:
   receive from a current serving cell of the user equipment, system information indicating frequencies different from a frequency of the current serving cell;
   receive a paging message from the current serving cell of the user equipment the paging message being different from the system information;
   determine whether the received paging message includes an indication triggering a frequency redistribution procedure in which the user equipment reselects a target cell belonging to a frequency included in the frequencies indicated by the system information, to be used as a serving cell; and
   perform the frequency redistribution procedure in response to determination that the received paging message includes the indication.

\* \* \* \* \*